US012708830B2

(12) United States Patent
Watterson

(10) Patent No.: US 12,708,830 B2
(45) Date of Patent: Aug. 18, 2026

(54) VIDEO WORKOUT PROGRAMS

(71) Applicant: iFIT Inc., Logan, UT (US)

(72) Inventor: Eric S. Watterson, Logan, UT (US)

(*) Notice: Subject to any disclaimer, the term of this patent is extended or adjusted under 35 U.S.C. 154(b) by 306 days.

(21) Appl. No.: 17/684,011

(22) Filed: Mar. 1, 2022

(65) Prior Publication Data

US 2022/0280857 A1 Sep. 8, 2022

Related U.S. Application Data

(60) Provisional application No. 63/156,801, filed on Mar. 4, 2021.

(51) Int. Cl.

| | |
|---|---|
| ***A63B 71/06*** | (2006.01) |
| ***A63B 24/00*** | (2006.01) |
| ***H04N 5/222*** | (2006.01) |
| ***H04N 5/272*** | (2006.01) |
| ***H04N 5/278*** | (2006.01) |
| ***H04N 9/75*** | (2006.01) |

(52) U.S. Cl.

CPC ...... *A63B 71/0622* (2013.01); *A63B 24/0062* (2013.01); *A63B 24/0084* (2013.01); *H04N 5/2228* (2013.01); *H04N 5/272* (2013.01); *H04N 5/278* (2013.01); *H04N 9/75* (2013.01); *A63B 2024/009* (2013.01); *A63B 2071/0644* (2013.01); *A63B 2220/806* (2013.01); *A63B 2220/807* (2013.01)

(58) Field of Classification Search

None

See application file for complete search history.

(56) References Cited

U.S. PATENT DOCUMENTS

| | | |
|---|---|---|
| 3,123,646 A | 3/1964 | Easton |
| 3,579,339 A | 5/1971 | Chang et al. |
| 4,023,795 A | 5/1977 | Pauls |
| 4,300,760 A | 11/1981 | Bobroff |
| D286,311 S | 10/1986 | Martinell et al. |

(Continued)

FOREIGN PATENT DOCUMENTS

| | | |
|---|---|---|
| CN | 110139147 | 8/2019 |
| CN | 110287848 | 9/2019 |

(Continued)

OTHER PUBLICATIONS

U.S. Appl. No. 17/066,485, filed Oct. 9, 2020, Weston et al.

(Continued)

*Primary Examiner* — Shila Jalalzadeh Abyaneh
(74) *Attorney, Agent, or Firm* — Holland & Hart LLP

(57) ABSTRACT

Generating a video workout program. In one aspect of the disclosure, a method may include capturing a first video that includes a depiction of a trainer performing a workout, combining the depiction of the trainer in the first video with a second video that moves through an environment to form a combined video in which the trainer appears to move through the environment; and encoding exercise machine control commands into a subtitle stream of the combined video to create the video workout program, execution of the video workout program on a first exercise machine configured to display the combined video and continually control one or more moveable members of the first exercise machine according to the exercise machine control commands.

7 Claims, 29 Drawing Sheets

(56) References Cited

U.S. PATENT DOCUMENTS

| | | | |
|---|---|---|---|
| 4,681,318 | A | 7/1987 | Lay |
| 4,684,126 | A | 8/1987 | Dalebout et al. |
| 4,728,102 | A | 3/1988 | Pauls |
| 4,750,736 | A | 6/1988 | Watterson |
| 4,796,881 | A | 1/1989 | Watterson |
| 4,813,667 | A | 3/1989 | Watterson |
| 4,830,371 | A | 5/1989 | Lay |
| 4,844,451 | A | 7/1989 | Bersonnet et al. |
| 4,850,585 | A | 7/1989 | Dalebout |
| D304,849 | S | 11/1989 | Watterson |
| 4,880,225 | A | 11/1989 | Lucas et al. |
| 4,883,272 | A | 11/1989 | Lay |
| D306,468 | S | 3/1990 | Watterson |
| D306,891 | S | 3/1990 | Watterson |
| 4,913,396 | A | 4/1990 | Dalebout et al. |
| D307,614 | S | 5/1990 | Bingham et al. |
| D307,615 | S | 5/1990 | Bingham et al. |
| 4,921,242 | A | 5/1990 | Watterson |
| 4,932,650 | A | 6/1990 | Bingham et al. |
| D309,167 | S | 7/1990 | Griffin |
| D309,485 | S | 7/1990 | Bingham et al. |
| 4,938,478 | A | 7/1990 | Lay |
| D310,253 | S | 8/1990 | Bersonnet et al. |
| 4,955,599 | A | 9/1990 | Bersonnet et al. |
| 4,971,316 | A | 11/1990 | Dalebout et al. |
| D313,055 | S | 12/1990 | Watterson |
| 4,974,832 | A | 12/1990 | Dalebout |
| 4,979,737 | A | 12/1990 | Kock |
| 4,981,294 | A | 1/1991 | Dalebout et al. |
| D315,765 | S | 3/1991 | Measom et al. |
| 4,998,725 | A | 3/1991 | Watterson et al. |
| 5,000,442 | A | 3/1991 | Dalebout et al. |
| 5,000,443 | A | 3/1991 | Dalebout et al. |
| 5,000,444 | A | 3/1991 | Dalebout et al. |
| D316,124 | S | 4/1991 | Dalebout et al. |
| 5,013,033 | A | 5/1991 | Watterson et al. |
| 5,014,980 | A | 5/1991 | Bersonnet et al. |
| 5,016,871 | A | 5/1991 | Dalebout et al. |
| D318,085 | S | 7/1991 | Jacobson et al. |
| D318,086 | S | 7/1991 | Bingham et al. |
| D318,699 | S | 7/1991 | Jacobson et al. |
| 5,029,801 | A | 7/1991 | Dalebout et al. |
| 5,034,576 | A | 7/1991 | Dalebout et al. |
| 5,058,881 | A | 10/1991 | Measom |
| 5,058,882 | A | 10/1991 | Dalebout et al. |
| D321,388 | S | 11/1991 | Dalebout |
| 5,062,626 | A | 11/1991 | Dalebout et al. |
| 5,062,627 | A | 11/1991 | Bingham |
| 5,062,632 | A | 11/1991 | Dalebout et al. |
| 5,062,633 | A | 11/1991 | Engel et al. |
| 5,067,710 | A | 11/1991 | Watterson et al. |
| 5,072,929 | A | 12/1991 | Peterson et al. |
| D323,009 | S | 1/1992 | Dalebout et al. |
| D323,198 | S | 1/1992 | Dalebout et al. |
| D323,199 | S | 1/1992 | Dalebout et al. |
| D323,863 | S | 2/1992 | Watterson |
| 5,088,729 | A | 2/1992 | Dalebout |
| 5,090,694 | A | 2/1992 | Pauls et al. |
| 5,102,380 | A | 4/1992 | Jacobson et al. |
| 5,104,120 | A | 4/1992 | Watterson et al. |
| 5,108,093 | A | 4/1992 | Watterson |
| D326,491 | S | 5/1992 | Dalebout |
| 5,122,105 | A | 6/1992 | Engel et al. |
| 5,135,216 | A | 8/1992 | Bingham et al. |
| 5,147,265 | A | 9/1992 | Pauls et al. |
| 5,149,084 | A | 9/1992 | Dalebout et al. |
| 5,149,312 | A | 9/1992 | Croft et al. |
| 5,171,196 | A | 12/1992 | Lynch |
| D332,347 | S | 1/1993 | Raadt et al. |
| 5,190,505 | A | 3/1993 | Dalebout et al. |
| 5,192,255 | A | 3/1993 | Dalebout et al. |
| 5,195,937 | A | 3/1993 | Engel et al. |
| 5,203,826 | A | 4/1993 | Dalebout |
| D335,511 | S | 5/1993 | Engel et al. |
| D335,905 | S | 5/1993 | Cutter et al. |
| D336,498 | S | 6/1993 | Engel et al. |
| 5,217,487 | A | 6/1993 | Engel et al. |
| D337,361 | S | 7/1993 | Engel et al. |
| D337,666 | S | 7/1993 | Peterson et al. |
| D337,799 | S | 7/1993 | Cutter et al. |
| 5,226,866 | A | 7/1993 | Engel et al. |
| 5,244,446 | A | 9/1993 | Engel et al. |
| 5,247,853 | A | 9/1993 | Dalebout |
| 5,259,611 | A | 11/1993 | Dalebout et al. |
| D342,106 | S | 12/1993 | Campbell et al. |
| 5,279,528 | A | 1/1994 | Dalebout et al. |
| D344,112 | S | 2/1994 | Smith |
| D344,557 | S | 2/1994 | Ashby |
| 5,282,776 | A | 2/1994 | Dalebout |
| 5,295,931 | A | 3/1994 | Dreibelbis et al. |
| 5,302,161 | A | 4/1994 | Loubert et al. |
| D347,251 | S | 5/1994 | Dreibelbis et al. |
| 5,316,534 | A | 5/1994 | Dalebout et al. |
| D348,493 | S | 7/1994 | Ashby |
| D348,494 | S | 7/1994 | Ashby |
| 5,328,164 | A | 7/1994 | Soga |
| D349,931 | S | 8/1994 | Bostic et al. |
| 5,336,142 | A | 8/1994 | Dalebout et al. |
| 5,344,376 | A | 9/1994 | Bostic et al. |
| D351,202 | S | 10/1994 | Bingham |
| D351,435 | S | 10/1994 | Peterson et al. |
| D351,633 | S | 10/1994 | Bingham |
| D352,534 | S | 11/1994 | Dreibelbis et al. |
| D353,422 | S | 12/1994 | Bostic et al. |
| 5,372,559 | A | 12/1994 | Dalebout et al. |
| 5,374,228 | A | 12/1994 | Buisman et al. |
| 5,382,221 | A | 1/1995 | Hsu et al. |
| 5,387,168 | A | 2/1995 | Bostic |
| 5,393,690 | A | 2/1995 | Fu et al. |
| D356,128 | S | 3/1995 | Smith et al. |
| 5,409,435 | A | 4/1995 | Daniels |
| 5,429,563 | A | 7/1995 | Engel et al. |
| 5,431,612 | A | 7/1995 | Holden |
| D360,915 | S | 8/1995 | Bostic et al. |
| 5,468,205 | A | 11/1995 | McFall et al. |
| 5,489,249 | A | 2/1996 | Brewer et al. |
| 5,492,517 | A | 2/1996 | Bostic et al. |
| D367,689 | S | 3/1996 | Wilkinson et al. |
| 5,511,740 | A | 4/1996 | Loubert et al. |
| 5,512,025 | A | 4/1996 | Dalebout et al. |
| D370,949 | S | 6/1996 | Furner |
| D371,176 | S | 6/1996 | Furner |
| 5,527,245 | A | 6/1996 | Dalebout et al. |
| 5,529,553 | A | 6/1996 | Finlayson |
| 5,540,429 | A | 7/1996 | Dalebout et al. |
| 5,549,533 | A | 8/1996 | Olson et al. |
| 5,554,085 | A | 9/1996 | Dalebout |
| 5,569,128 | A | 10/1996 | Dalebout |
| 5,591,105 | A | 1/1997 | Dalebout et al. |
| 5,591,106 | A | 1/1997 | Dalebout et al. |
| 5,595,556 | A | 1/1997 | Dalebout et al. |
| 5,607,375 | A | 3/1997 | Dalebout et al. |
| 5,611,539 | A | 3/1997 | Watterson et al. |
| 5,622,527 | A | 4/1997 | Watterson et al. |
| 5,626,538 | A | 5/1997 | Dalebout et al. |
| 5,626,542 | A | 5/1997 | Dalebout et al. |
| D380,024 | S | 6/1997 | Novak et al. |
| 5,637,059 | A | 6/1997 | Dalebout |
| D380,509 | S | 7/1997 | Wilkinson et al. |
| 5,643,153 | A | 7/1997 | Nylen et al. |
| 5,645,509 | A | 7/1997 | Brewer et al. |
| D384,118 | S | 9/1997 | Deblauw |
| 5,662,557 | A | 9/1997 | Watterson et al. |
| 5,669,857 | A | 9/1997 | Watterson et al. |
| 5,672,140 | A | 9/1997 | Watterson et al. |
| 5,674,156 | A | 10/1997 | Watterson et al. |
| 5,674,453 | A | 10/1997 | Watterson et al. |
| 5,676,624 | A | 10/1997 | Watterson et al. |
| 5,683,331 | A | 11/1997 | Dalebout |
| 5,683,332 | A | 11/1997 | Watterson et al. |
| D387,825 | S | 12/1997 | Fleck et al. |
| 5,695,433 | A | 12/1997 | Buisman |
| 5,695,434 | A | 12/1997 | Dalebout et al. |
| 5,695,435 | A | 12/1997 | Dalebout et al. |

(56) References Cited

U.S. PATENT DOCUMENTS 5,702,325 A 12/1997 Watterson et al.
5,704,879 A 1/1998 Watterson et al.
5,718,657 A 2/1998 Dalebout et al.
5,720,200 A 2/1998 Anderson et al.
5,720,698 A 2/1998 Dalebout et al.
D392,006 S 3/1998 Dalebout et al.
5,722,922 A 3/1998 Watterson et al.
5,733,229 A 3/1998 Dalebout et al.
5,743,833 A 4/1998 Watterson et al.
5,762,584 A 6/1998 Daniels
5,762,587 A 6/1998 Dalebout et al.
5,772,560 A 6/1998 Watterson et al.
5,810,698 A 9/1998 Hullett et al.
5,827,155 A 10/1998 Jensen et al.
5,830,114 A 11/1998 Halfen et al.
5,860,893 A 1/1999 Watterson et al.
5,860,894 A 1/1999 Dalebout et al.
5,899,834 A 5/1999 Dalebout et al.
D412,953 S 8/1999 Armstrong
D413,948 S 9/1999 Dalebout
5,951,441 A 9/1999 Dalebout et al.
5,951,448 A 9/1999 Bolland
D416,596 S 11/1999 Armstrong
6,003,166 A 12/1999 Hald et al.
6,019,710 A 2/2000 Dalebout et al.
6,027,429 A 2/2000 Daniels
6,033,347 A 3/2000 Dalebout et al.
D425,940 S 5/2000 Halfen et al.
6,059,692 A 5/2000 Hickman
D428,949 S 8/2000 Simonson
6,123,646 A 9/2000 Colassi
6,142,913 A 11/2000 Ewert
6,171,217 B1 1/2001 Cutler
6,171,219 B1 1/2001 Simonson
6,174,267 B1 1/2001 Dalebout et al.
6,193,631 B1 2/2001 Hickman
6,228,003 B1 5/2001 Hald et al.
6,238,323 B1 5/2001 Simonson
6,251,052 B1 6/2001 Simonson
6,261,022 B1 7/2001 Dalebout et al.
6,280,362 B1 8/2001 Dalebout et al.
6,296,594 B1 10/2001 Simonson
D450,872 S 11/2001 Dalebout et al.
6,312,363 B1 11/2001 Watterson et al.
D452,338 S 12/2001 Dalebout et al.
D453,543 S 2/2002 Cutler
D453,948 S 2/2002 Cutler
6,350,218 B1 2/2002 Dalebout et al.
6,387,020 B1 5/2002 Simonson
6,413,191 B1 7/2002 Harris et al.
6,422,980 B1 7/2002 Simonson
6,447,424 B1 9/2002 Ashby et al.
6,458,060 B1 10/2002 Watterson et al.
6,458,061 B2 10/2002 Simonson
6,471,622 B1 10/2002 Hammer et al.
6,563,225 B2 5/2003 Soga et al.
6,601,016 B1 7/2003 Brown et al.
6,623,140 B2 9/2003 Watterson
6,626,799 B2 9/2003 Watterson
6,652,424 B2 11/2003 Dalebout
6,685,607 B1 2/2004 Olson
6,695,581 B2 2/2004 Wasson et al.
6,701,271 B2 3/2004 Willner et al.
6,702,719 B1 3/2004 Brown et al.
6,712,740 B2 3/2004 Simonson
6,730,002 B2 5/2004 Hald et al.
6,743,153 B2 6/2004 Watterson et al.
6,746,371 B1 6/2004 Brown et al.
6,749,537 B1 6/2004 Hickman
6,761,667 B1 7/2004 Cutler et al.
6,770,015 B2 8/2004 Simonson
6,786,852 B2 9/2004 Watterson et al.
6,808,472 B1 10/2004 Hickman
6,821,230 B2 11/2004 Dalebout et al.
6,830,540 B2 12/2004 Watterson et al.
6,863,641 B1 3/2005 Brown et al.
6,866,613 B1 3/2005 Brown et al.
6,875,160 B2 4/2005 Watterson et al.
D507,311 S 7/2005 Butler et al.
6,918,858 B2 7/2005 Watterson
6,921,351 B1 7/2005 Hickman et al.
6,974,404 B1 12/2005 Watterson et al.
6,997,852 B2 2/2006 Watterson et al.
7,025,713 B2 4/2006 Dalebout et al.
D520,085 S 5/2006 Willardson et al.
7,044,897 B2 5/2006 Myers et al.
7,052,442 B2 5/2006 Watterson et al.
7,060,006 B1 6/2006 Watterson et al.
7,060,008 B2 6/2006 Watterson et al.
7,070,539 B2 7/2006 Brown et al.
7,097,588 B2 8/2006 Watterson et al.
D527,776 S 9/2006 Willardson et al.
7,112,168 B2 9/2006 Dalebout et al.
7,128,693 B2 10/2006 Brown et al.
7,164,441 B1 1/2007 Miyazaki et al.
7,166,062 B1 1/2007 Watterson et al.
7,166,064 B2 1/2007 Watterson et al.
7,169,087 B2 1/2007 Ercanbrack et al.
7,169,093 B2 1/2007 Simonson et al.
7,192,388 B2 3/2007 Dalebout et al.
7,250,022 B2 7/2007 Dalebout et al.
7,282,016 B2 10/2007 Simonson
7,285,075 B2 10/2007 Cutler et al.
7,344,481 B2 3/2008 Watterson et al.
7,377,882 B2 5/2008 Watterson et al.
7,425,188 B2 9/2008 Ercanbrack et al.
7,429,236 B2 9/2008 Dalebout et al.
7,455,622 B2 11/2008 Watterson et al.
7,482,050 B2 1/2009 Olson
D588,655 S 3/2009 Utykanski
7,510,509 B2 3/2009 Hickman
7,537,546 B2 5/2009 Watterson et al.
7,537,549 B2 5/2009 Nelson et al.
7,537,552 B2 5/2009 Dalebout et al.
7,540,828 B2 6/2009 Watterson et al.
7,549,947 B2 6/2009 Hickman et al.
7,556,590 B2 7/2009 Watterson et al.
7,563,203 B2 7/2009 Dalebout et al.
7,575,536 B1 8/2009 Hickman
7,601,105 B1 10/2009 Gipson et al.
7,604,573 B2 10/2009 Dalebout et al.
D604,373 S 11/2009 Dalebout et al.
7,618,350 B2 11/2009 Dalebout et al.
7,618,357 B2 11/2009 Dalebout et al.
7,625,315 B2 12/2009 Hickman
7,625,321 B2 12/2009 Simonson et al.
7,628,730 B1 12/2009 Watterson et al.
7,628,737 B2 12/2009 Kowallis et al.
7,637,847 B1 12/2009 Hickman
7,645,212 B2 1/2010 Ashby et al.
7,645,213 B2 1/2010 Watterson et al.
7,658,698 B2 2/2010 Pacheco et al.
7,674,205 B2 3/2010 Dalebout et al.
7,713,171 B1 5/2010 Hickman
7,713,172 B2 5/2010 Watterson et al.
7,713,180 B2 5/2010 Wickens et al.
7,717,828 B2 5/2010 Simonson et al.
7,736,279 B2 6/2010 Dalebout et al.
7,740,563 B2 6/2010 Dalebout et al.
7,749,144 B2 7/2010 Hammer
7,766,797 B2 8/2010 Dalebout et al.
7,771,329 B2 8/2010 Dalebout
7,775,940 B2 8/2010 Dalebout et al.
7,789,800 B1 9/2010 Watterson et al.
7,798,946 B2 9/2010 Dalebout et al.
7,815,550 B2 10/2010 Watterson et al.
7,857,731 B2 12/2010 Hickman et al.
7,862,475 B2 1/2011 Watterson et al.
7,862,478 B2 1/2011 Watterson et al.
7,862,483 B2 1/2011 Hendrickson et al.
D635,207 S 3/2011 Dalebout et al.
7,901,330 B2 3/2011 Dalebout et al.
7,909,740 B2 3/2011 Dalebout et al.
7,980,996 B2 7/2011 Hickman

(56) References Cited

U.S. PATENT DOCUMENTS

| | | | |
|---|---|---|---|
| 7,981,000 | B2 | 7/2011 | Watterson et al. |
| 7,985,164 | B2 | 7/2011 | Ashby |
| 8,029,415 | B2 | 10/2011 | Ashby et al. |
| 8,033,960 | B1 | 10/2011 | Dalebout et al. |
| D650,451 | S | 12/2011 | Olson et al. |
| D652,877 | S | 1/2012 | Dalebout et al. |
| 8,152,702 | B2 | 4/2012 | Pacheco |
| D659,775 | S | 5/2012 | Olson et al. |
| D659,777 | S | 5/2012 | Watterson et al. |
| D660,383 | S | 5/2012 | Watterson et al. |
| D664,613 | S | 7/2012 | Dalebout et al. |
| 8,251,874 | B2 | 8/2012 | Ashby et al. |
| 8,298,123 | B2 | 10/2012 | Hickman |
| 8,298,125 | B2 | 10/2012 | Colledge et al. |
| D671,177 | S | 11/2012 | Sip |
| D671,178 | S | 11/2012 | Sip |
| D673,626 | S | 1/2013 | Olson et al. |
| 8,690,735 | B2 | 4/2014 | Watterson et al. |
| D707,763 | S | 6/2014 | Cutler |
| 8,740,753 | B2 | 6/2014 | Olson et al. |
| 8,758,201 | B2 | 6/2014 | Ashby et al. |
| 8,771,153 | B2 | 7/2014 | Dalebout et al. |
| 8,784,270 | B2 | 7/2014 | Ashby et al. |
| 8,808,148 | B2 | 8/2014 | Watterson et al. |
| 8,814,762 | B2 | 8/2014 | Butler et al. |
| D712,493 | S | 9/2014 | Ercanbrack et al. |
| 8,840,075 | B2 | 9/2014 | Dalebout et al. |
| 8,845,493 | B2 | 9/2014 | Watterson et al. |
| 8,870,726 | B2 | 10/2014 | Watterson et al. |
| 8,876,668 | B2 | 11/2014 | Hendrickson et al. |
| 8,894,549 | B2 | 11/2014 | Colledge |
| 8,894,555 | B2 | 11/2014 | Colledge et al. |
| 8,911,330 | B2 | 12/2014 | Watterson et al. |
| 8,920,288 | B2 | 12/2014 | Dalebout et al. |
| 8,986,165 | B2 | 3/2015 | Ashby |
| 8,992,364 | B2 | 3/2015 | Law et al. |
| 8,992,387 | B2 | 3/2015 | Watterson et al. |
| D726,476 | S | 4/2015 | Ercanbrack |
| 9,028,368 | B2 | 5/2015 | Ashby et al. |
| 9,028,370 | B2 | 5/2015 | Watterson et al. |
| 9,039,578 | B2 | 5/2015 | Dalebout |
| D731,011 | S | 6/2015 | Buchanan |
| 9,072,930 | B2 | 7/2015 | Ashby et al. |
| 9,119,983 | B2 | 9/2015 | Rhea |
| 9,123,317 | B2 | 9/2015 | Watterson et al. |
| 9,126,071 | B2 | 9/2015 | Smith |
| 9,126,072 | B2 | 9/2015 | Watterson |
| 9,138,615 | B2 | 9/2015 | Olson et al. |
| 9,142,139 | B2 | 9/2015 | Watterson et al. |
| 9,144,703 | B2 | 9/2015 | Dalebout et al. |
| 9,149,683 | B2 | 10/2015 | Watterson et al. |
| 9,186,535 | B2 | 11/2015 | Ercanbrack |
| 9,186,549 | B2 | 11/2015 | Watterson et al. |
| 9,254,409 | B2 | 2/2016 | Dalebout et al. |
| 9,254,416 | B2 | 2/2016 | Ashby |
| 9,278,248 | B2 | 3/2016 | Tyger et al. |
| 9,278,249 | B2 | 3/2016 | Watterson |
| 9,278,250 | B2 | 3/2016 | Buchanan |
| 9,289,648 | B2 | 3/2016 | Watterson |
| 9,339,691 | B2 | 5/2016 | Brammer |
| 9,352,185 | B2 | 5/2016 | Hendrickson et al. |
| 9,352,186 | B2 | 5/2016 | Watterson |
| 9,375,605 | B2 | 6/2016 | Tyger et al. |
| 9,381,394 | B2 | 7/2016 | Mortensen et al. |
| 9,387,387 | B2 | 7/2016 | Dalebout |
| 9,393,453 | B2 | 7/2016 | Watterson |
| 9,403,047 | B2 | 8/2016 | Olson et al. |
| 9,403,051 | B2 | 8/2016 | Cutler |
| 9,421,416 | B2 | 8/2016 | Mortensen et al. |
| 9,457,219 | B2 | 10/2016 | Smith |
| 9,457,220 | B2 | 10/2016 | Olson |
| 9,457,222 | B2 | 10/2016 | Dalebout |
| 9,460,632 | B2 | 10/2016 | Watterson |
| 9,463,356 | B2 | 10/2016 | Rhea |
| 9,468,794 | B2 | 10/2016 | Barton |
| 9,468,798 | B2 | 10/2016 | Dalebout |
| 9,480,874 | B2 | 11/2016 | Cutler |
| 9,492,704 | B2 | 11/2016 | Mortensen et al. |
| 9,498,668 | B2 | 11/2016 | Smith |
| 9,517,378 | B2 | 12/2016 | Ashby et al. |
| 9,521,901 | B2 | 12/2016 | Dalebout |
| 9,533,187 | B2 | 1/2017 | Dalebout |
| 9,539,461 | B2 | 1/2017 | Ercanbrack |
| 9,579,544 | B2 | 2/2017 | Watterson |
| 9,586,086 | B2 | 3/2017 | Dalebout et al. |
| 9,586,090 | B2 | 3/2017 | Watterson et al. |
| 9,604,099 | B2 | 3/2017 | Taylor |
| 9,616,276 | B2 | 4/2017 | Dalebout et al. |
| 9,616,278 | B2 | 4/2017 | Olson |
| 9,623,281 | B2 | 4/2017 | Hendrickson et al. |
| 9,636,567 | B2 | 5/2017 | Brammer et al. |
| 9,675,839 | B2 | 6/2017 | Dalebout et al. |
| 9,682,307 | B2 | 6/2017 | Dalebout |
| 9,694,234 | B2 | 7/2017 | Dalebout et al. |
| 9,694,242 | B2 | 7/2017 | Ashby et al. |
| 9,737,755 | B2 | 8/2017 | Dalebout |
| 9,757,605 | B2 | 9/2017 | Olson et al. |
| 9,764,186 | B2 | 9/2017 | Dalebout et al. |
| 9,767,785 | B2 | 9/2017 | Ashby et al. |
| 9,795,822 | B2 | 10/2017 | Smith et al. |
| 9,808,672 | B2 | 11/2017 | Dalebout |
| 9,849,326 | B2 | 12/2017 | Smith |
| 9,878,210 | B2 | 1/2018 | Watterson |
| 9,889,334 | B2 | 2/2018 | Ashby et al. |
| 9,889,339 | B2 | 2/2018 | Douglass |
| 9,937,376 | B2 | 4/2018 | Mcinelly et al. |
| 9,937,377 | B2 | 4/2018 | Mcinelly et al. |
| 9,937,378 | B2 | 4/2018 | Dalebout et al. |
| 9,937,379 | B2 | 4/2018 | Mortensen et al. |
| 9,943,719 | B2 | 4/2018 | Smith et al. |
| 9,943,722 | B2 | 4/2018 | Dalebout |
| 9,948,037 | B2 | 4/2018 | Ashby |
| 9,968,816 | B2 | 5/2018 | Olson et al. |
| 9,968,821 | B2 | 5/2018 | Finlayson et al. |
| 9,968,823 | B2 | 5/2018 | Cutler |
| 10,010,755 | B2 | 7/2018 | Watterson |
| 10,010,756 | B2 | 7/2018 | Watterson |
| 10,029,145 | B2 | 7/2018 | Douglass |
| D826,350 | S | 8/2018 | Hochstrasser |
| 10,046,196 | B2 | 8/2018 | Ercanbrack et al. |
| D827,733 | S | 9/2018 | Hochstrasser |
| 10,065,064 | B2 | 9/2018 | Smith et al. |
| 10,071,285 | B2 | 9/2018 | Smith et al. |
| 10,085,586 | B2 | 10/2018 | Smith et al. |
| 10,086,254 | B2 | 10/2018 | Watterson |
| 10,136,842 | B2 | 11/2018 | Ashby |
| 10,186,161 | B2 | 1/2019 | Watterson |
| 10,188,890 | B2 | 1/2019 | Olson et al. |
| 10,207,143 | B2 | 2/2019 | Dalebout et al. |
| 10,207,145 | B2 | 2/2019 | Tyger et al. |
| 10,207,147 | B2 | 2/2019 | Ercanbrack et al. |
| 10,207,148 | B2 | 2/2019 | Powell et al. |
| 10,212,994 | B2 | 2/2019 | Watterson et al. |
| 10,220,259 | B2 | 3/2019 | Brammer |
| 10,226,396 | B2 | 3/2019 | Ashby |
| 10,226,664 | B2 | 3/2019 | Dalebout et al. |
| 10,252,109 | B2 | 4/2019 | Watterson |
| 10,258,828 | B2 | 4/2019 | Dalebout et al. |
| 10,272,317 | B2 | 4/2019 | Watterson |
| 10,279,212 | B2 | 5/2019 | Dalebout et al. |
| 10,293,211 | B2 | 5/2019 | Watterson et al. |
| D852,292 | S | 6/2019 | Cutler |
| 10,343,017 | B2 | 7/2019 | Jackson |
| 10,376,736 | B2 | 8/2019 | Powell et al. |
| 10,388,183 | B2 | 8/2019 | Watterson |
| 10,391,361 | B2 | 8/2019 | Watterson |
| D864,320 | S | 10/2019 | Weston |
| D864,321 | S | 10/2019 | Weston |
| 10,426,989 | B2 | 10/2019 | Dalebout |
| 10,433,612 | B2 | 10/2019 | Ashby et al. |
| 10,441,840 | B2 | 10/2019 | Dalebout |
| 10,441,844 | B2 | 10/2019 | Powell |
| 10,449,416 | B2 | 10/2019 | Dalebout et al. |
| 10,471,299 | B2 | 11/2019 | Powell |

(56) References Cited

U.S. PATENT DOCUMENTS

D868,909 S 12/2019 Cutler et al.
10,492,519 B2 12/2019 Capell et al.
10,493,349 B2 12/2019 Watterson
10,500,473 B2 12/2019 Watterson
10,537,764 B2 1/2020 Smith et al.
10,543,395 B2 1/2020 Powell et al.
10,561,877 B2 2/2020 Workman
10,561,893 B2 2/2020 Chatterton et al.
10,561,894 B2 2/2020 Dalebout et al.
10,569,121 B2 2/2020 Watterson
10,569,123 B2 2/2020 Hochstrasser et al.
10,625,114 B2 4/2020 Ercanbrack
10,625,137 B2 4/2020 Dalebout et al.
10,661,114 B2 5/2020 Watterson et al.
10,668,320 B2 6/2020 Watterson
10,671,705 B2 6/2020 Capell et al.
10,688,346 B2 6/2020 Brammer
10,702,736 B2 7/2020 Weston et al.
10,709,925 B2 7/2020 Dalebout et al.
10,726,730 B2 7/2020 Watterson
10,729,965 B2 8/2020 Powell
10,758,767 B2 9/2020 Olson et al.
10,786,706 B2 9/2020 Smith
10,864,407 B2 12/2020 Watterson et al.
10,918,905 B2 2/2021 Powell et al.
10,932,517 B2 3/2021 Ashby et al.
10,940,360 B2 3/2021 Dalebout et al.
10,953,268 B1 3/2021 Dalebout et al.
10,953,305 B2 3/2021 Dalebout et al.
10,967,214 B1 4/2021 Olson et al.
10,994,173 B2 5/2021 Watterson
11,000,730 B2 5/2021 Dalebout et al.
11,013,960 B2 5/2021 Watterson et al.
11,033,777 B1 6/2021 Watterson et al.
11,058,913 B2 7/2021 Dalebout et al.
11,058,914 B2 7/2021 Powell
11,058,918 B1 7/2021 Watterson et al.
11,187,285 B2 11/2021 Wrobel
11,298,577 B2 4/2022 Watterson
11,326,673 B2 5/2022 Buchanan
11,338,169 B2 5/2022 Dalebout et al.
11,338,175 B2 5/2022 Watterson et al.
11,426,633 B2 8/2022 Watterson et al.
11,451,108 B2 9/2022 Tinney
11,452,903 B2 9/2022 Watterson
11,511,152 B2 11/2022 Powell et al.
11,534,651 B2 12/2022 Ercanbrack et al.
11,534,654 B2 12/2022 Silcock et al.
11,534,655 B2 12/2022 Dalebout et al.
11,565,148 B2 1/2023 Dalebout et al.
11,596,830 B2 3/2023 Dalebout et al.
11,642,564 B2 5/2023 Watterson
11,673,036 B2 6/2023 Dalebout et al.
11,680,611 B2 6/2023 Wrobel
11,700,905 B2 7/2023 Ashby et al.
11,708,874 B2 7/2023 Wrobel
2001/0001303 A1* 5/2001 Ohsuga ................. A63F 13/816 482/8
2005/0075213 A1* 4/2005 Arick ..................... A63B 24/00 482/902
2008/0051256 A1 2/2008 Ashby et al.
2010/0022354 A1* 1/2010 Fisher ................ A63B 71/0622 482/8
2010/0160115 A1* 6/2010 Morris ............... A63B 22/0235 482/4
2011/0164044 A1* 7/2011 Huang ............... A63B 24/0087 345/473
2014/0135173 A1 5/2014 Watterson
2015/0251055 A1 9/2015 Ashby
2016/0058335 A1 3/2016 Ashby
2016/0325170 A1* 11/2016 Ro ..................... A63B 69/3623
2016/0346595 A1 12/2016 Dalebout et al.
2017/0124912 A1 5/2017 Ashby et al.
2017/0193578 A1 7/2017 Watterson
2017/0266489 A1 9/2017 Douglass et al.
2017/0270820 A1 9/2017 Ashby et al.
2018/0085630 A1 3/2018 Capell et al.
2018/0099116 A1 4/2018 Ashby
2018/0099180 A1 4/2018 Wilkinson
2018/0111034 A1 4/2018 Watterson
2019/0143193 A1* 5/2019 Kim ...................... G06F 3/1454 482/8
2019/0143194 A1* 5/2019 Evancha ............ A63B 24/0062 482/4
2019/0223612 A1 7/2019 Watterson et al.
2019/0269971 A1 9/2019 Capell et al.
2019/0351283 A1* 11/2019 Smith ................ A63B 21/0051
2020/0009417 A1 1/2020 Dalebout
2020/0009425 A1* 1/2020 Kim ....................... H04N 7/147
2020/0151595 A1* 5/2020 Jayalath ............. A63B 21/0442
2020/0254311 A1 8/2020 Watterson et al.
2020/0368575 A1 11/2020 Hays et al.
2020/0391069 A1 12/2020 Olson et al.
2021/0001177 A1 1/2021 Smith
2021/0001205 A1* 1/2021 Kim ......................... H04N 7/18
2021/0035674 A1* 2/2021 Volosin ................ A61B 5/7435
2021/0046353 A1 2/2021 Dalebout et al.
2021/0106899 A1 4/2021 Willardson et al.
2021/0110910 A1 4/2021 Ostler et al.
2021/0146221 A1 5/2021 Dalebout et al.
2021/0152753 A1* 5/2021 Zhu ........................ H04N 5/265
2021/0197023 A1* 7/2021 Liang ................. A63B 24/0087
2021/0213331 A1 7/2021 Watterson
2021/0268336 A1 9/2021 Watterson et al.
2021/0291013 A1 9/2021 Nascimento
2021/0299518 A1 9/2021 Brammer et al.
2021/0299542 A1 9/2021 Brammer et al.
2021/0339079 A1 11/2021 Dalebout et al.
2022/0062685 A1 3/2022 Ashby et al.
2022/0104992 A1 4/2022 Ashby
2022/0212052 A1 7/2022 Ercanbrack et al.
2022/0241649 A1 8/2022 Ashby
2022/0241665 A1 8/2022 Dalebout et al.
2022/0241668 A1 8/2022 Willardson et al.
2022/0249912 A1 8/2022 Watterson et al.
2022/0257994 A1 8/2022 Smith
2022/0258007 A1 8/2022 Watterson et al.
2022/0258008 A1 8/2022 Watterson et al.
2022/0266085 A1 8/2022 Dalebout et al.
2022/0280857 A1 9/2022 Watterson
2022/0309042 A1 9/2022 Archer
2022/0314078 A1 10/2022 Watterson et al.
2022/0323827 A1 10/2022 Watterson et al.
2022/0339493 A1 10/2022 Larsen
2022/0339520 A1 10/2022 Toth
2022/0342969 A1 10/2022 Watterson et al.
2022/0347516 A1 11/2022 Taylor
2022/0347548 A1 11/2022 Watterson
2022/0362613 A1 11/2022 Watterson et al.
2022/0362624 A1 11/2022 Dalebout
2022/0395729 A1 12/2022 Toth
2023/0039903 A1 2/2023 Brammer et al.
2023/0054845 A1 2/2023 Smith
2023/0122235 A1 4/2023 Ashby et al.
2023/0128721 A1 4/2023 Plummer
2023/0158358 A1 5/2023 Ercanbrack et al.
2023/0181993 A1 6/2023 Taylor et al.
2023/0191189 A1 6/2023 Taylor et al.
2023/0191197 A1 6/2023 Ashby
2023/0218975 A1 7/2023 Toles et al.
2023/0226401 A1 7/2023 Watterson

FOREIGN PATENT DOCUMENTS

DE 19537389 A1 * 4/1997 ................. F41J 9/14
DE 10149295 A1 * 4/2003 ........... F41G 3/2627
FR 2974731 A1 * 11/2012 ......... A63B 23/1209
KR 101571361 B1 * 11/2015
KR 20170085869 A * 7/2017
KR 101909693 B1 * 10/2018 ............ G06Q 50/10
KR 101965824 B1 * 4/2019

(56) References Cited

FOREIGN PATENT DOCUMENTS

| | | |
|---|---|---|
| TW | I683687 B | 2/2020 |
| TW | M606041 U | 1/2021 |

OTHER PUBLICATIONS

U.S. Appl. No. 17/739,819, filed May 9, 2022, Buchanan.
U.S. Appl. No. 17/841,313, filed Jun. 15, 2022, Weston et al.
U.S. Appl. No. 17/963,822, filed Oct. 11, 2022, Powell.
U.S. Appl. No. 18/091,004, filed Dec. 29, 2022, Cox.
U.S. Appl. No. 18/103,221, filed Jan. 30, 2023, Dalebout et al.
U.S. Appl. No. 18/114,758, filed Feb. 27, 2023, Cutler et al.
U.S. Appl. No. 18/117,263, filed Mar. 3, 2023, Smith et al.
U.S. Appl. No. 18/123,026, filed Mar. 17, 2023, Silcock et al.
U.S. Appl. No. 18/132,277, filed Apr. 7, 2023, Vasquez et al.
U.S. Appl. No. 18/136,535, filed Apr. 19, 2023, Ashby et al.
U.S. Appl. No. 18/141,872, filed May 1, 2023, Ashby et al.
U.S. Appl. No. 18/205,299, filed Jun. 2, 2023, Wrobel.
U.S. Appl. No. 18/207,512, filed Jun. 8, 2023, Chuang.
U.S. Appl. No. 18/210,505, filed Jun. 15, 2023, Nielsen et al.
U.S. Appl. No. 29/702,127, filed Sep. 16, 2019, Cutler et al.
U.S. Appl. No. 62/273,852, filed Dec. 31, 2015, Watterson.
U.S. Appl. No. 63/073,081, filed Sep. 1, 2021, Ashby et al.
U.S. Appl. No. 63/079,697, filed Sep. 7, 2020, Willardson et al.
U.S. Appl. No. 63/086,793, filed Oct. 20, 2020, Ashby.
U.S. Appl. No. 63/134,036, filed Jan. 5, 2021, Ercanbrack et al.
U.S. Appl. No. 63/150,066, filed Feb. 16, 2021, Smith.
U.S. Appl. No. 63/156,801, filed Mar. 4, 2021, Watterson.
U.S. Appl. No. 63/165,498, filed Mar. 24, 2021, Archer.
U.S. Appl. No. 63/179,094, filed Apr. 23, 2021, Watterson et al.
U.S. Appl. No. 63/180,521, filed Apr. 27, 2021, Watterson et al.
U.S. Appl. No. 63/187,348, filed May 11, 2021, Dalebout et al.
U.S. Appl. No. 63/188,431, filed May 13, 2021, Plummer.
U.S. Appl. No. 63/200,903, filed Apr. 2, 2021, Watterson et al.
U.S. Appl. No. 63/211,870, filed Jun. 17, 2021, Watterson et al.
U.S. Appl. No. 63/216,313, filed Jun. 29, 2021, Watterson et al.
U.S. Appl. No. 63/229,794, filed Aug. 12, 2021, Brammer.
U.S. Appl. No. 63/235,002, filed Aug. 19, 2021, Smith.
U.S. Appl. No. 63/254,470, filed Oct. 11, 2021, Powell.
U.S. Appl. No. 63/278,714, filed Nov. 12, 2021, Taylor.
U.S. Appl. No. 63/289,997, filed Dec. 15, 2021, Taylor et al.
U.S. Appl. No. 63/290,455, filed Dec. 16, 2021, Taylor et al.
U.S. Appl. No. 63/290,557, filed Dec. 16, 2021, Ashby.
U.S. Appl. No. 63/298,170, filed Jan. 10, 2022, Ercanbrack et al.
U.S. Appl. No. 63/299,357, filed Jan. 13, 2022, Toles et al.
U.S. Appl. No. 63/305,976, filed Feb. 2, 2022, Watterson.
U.S. Appl. No. 63/329,270, filed Apr. 8, 2022, Vasquez et al.
U.S. Appl. No. 63/332,581, filed Apr. 25, 2022, Ashby et al.
U.S. Appl. No. 63/338,265, filed May 4, 2022, Ashby et al.
U.S. Appl. No. 63/350,072, filed Jun. 8, 2022, Chuang.
U.S. Appl. No. 63/352,539, filed Jun. 15, 2022, Nielsen et al.
U.S. Appl. No. 63/471,680, filed Jun. 7, 2023, Powell et al.
Taiwan Office Action with English translation issued in application 111107483 on Nov. 17, 2022, 28 pages.
Taiwan Notice of Allowance with English translation issued in application 111107483 on Mar. 10, 2023, 4 pages.
U.S. Appl. No. 63/316,890.
Office Action in Taiwanese Patent Application No. 112118629, mailed Nov. 6, 2023, 17 pages.
International Preliminary Report on Patentability received in PCT Application No. PCT/US2022/018694, mailed Aug. 29, 2023, 10 pages.
Held, "The Black Art of Bluescreening", Create Motion, www.macworld.com, May 1998, pp. 111-114.
International Search Report on PCT/US2022/018694 dated Jul. 22, 2022.
Taiwan Decision of Allowance with English translation issued in Application No. 112118629 on Mar. 26, 2024, 4 pages.

* cited by examiner 100
102
104
106a
106b
107
108
109
110
111a
111b
112
113
114
115
116
Network
118
119
120a
120b
120c
120d
122a
122b
122c
122d
124
126a
126b
126c
126d
126e
126f
126g
126h
126i
126j
126k 309
304d
304c
107
304b
308
108
106a
113a
300a
304a
306
302
310

804
122a
1404
1406
1402
120a

VIDEO WORKOUT PROGRAMS

This application claims the benefit of and priority to U.S. Provisional Patent Application No. 63/156,801 filed Mar. 4, 2021, which is incorporated herein by reference in its entirety.

BACKGROUND

Stationary exercise machines have become an increasingly popular way to exercise. To combat the boredom and burnout that is often experienced by users that exercise with these exercise machines, exercise machines are often sold with a number of different pre-programmed workout programs that are saved within the electronics of the exercise machines. For example, these workout programs may include a "fat burn" workout program, a "hills" workout program, a "performance" workout program, and/or other workout programs.

To enable a user to become more immersed in a workout performed on an exercise machine, some exercise machines are capable of executing video workout programs. A video workout program generally includes a video that depicts a trainer performing a workout to allow one or more users to mimic the workout. For example, where a trainer is running at 6 miles per hour in a video of a video workout program, each of the users may control the running belts of their respective treadmills to likewise operate at 6 miles per hour.

Video workout programs can improve users' workout experiences. Many video workout programs enjoyed by users include video of trainers performing workouts, such as running or biking, in different locations throughout the world. However, such video workout programs may require a significant amount of time and cost to produce when they involve sending trainers and camera crews to different locations arounds the world.

The subject matter claimed herein is not limited to embodiments that solve any disadvantages or that operate only in environments such as those described above. Rather, this background is only provided to illustrate one example technology area where some embodiments described herein may be practiced.

SUMMARY

In one aspect of the disclosure, a method to generate a video workout program may include capturing a first video that includes a depiction of a trainer performing a workout; combining the depiction of the trainer in the first video with a second video that moves through an environment to form a combined video in which the trainer appears to move through the environment; and encoding exercise machine control commands to accompany the combined video to create the video workout program, the video workout program configured such that execution of the video workout program on a first exercise machine displays the combined video and continually controls one or more moveable members of the first exercise machine according to the exercise machine control commands.

Another aspect of the disclosure may include any combination of the above-mentioned features and may further include the trainer performing the workout using a second exercise machine, monitoring operating parameters of the second exercise machine during performance of the workout by the trainer; and generating the exercise machine control commands to correspond to the depiction of the workout by the trainer, including generating the exercise machine control commands to cause the first exercise machine to implement at least some of the operating parameters of the second exercise machine during execution of the video workout program on the first exercise machine.

Another aspect of the disclosure may include any combination of the above-mentioned features and may further include the trainer performing the workout using a second exercise machine, the second video that moves through the environment including a rendered video that moves through a virtual environment, monitoring a speed of the second exercise machine during performance of the workout by the trainer; and synchronizing a speed at which the rendered video moves through the virtual environment with the speed of the second exercise machine.

Another aspect of the disclosure may include any combination of the above-mentioned features and may further include the capturing of the first video that includes the depiction of the trainer performing the workout including capturing the first video of the trainer performing the workout on a second exercise machine in front of a chroma key screen of a stage or set.

Another aspect of the disclosure may include any combination of the above-mentioned features and may further include displaying the second video in view of a camera that captures the first video of the trainer performing the workout, the combining of the depiction of the trainer in the first video with the second video including capturing the first video of both the trainer performing the workout and the second video displayed in the view of the camera.

Another aspect of the disclosure may include any combination of the above-mentioned features and may further include receiving input effective to at least one of: control weather or natural phenomena depicted in the second video or add, delete, move, or resize an object in the environment.

Another aspect of the disclosure may include any combination of the above-mentioned features and may further include the combining of the depiction of the trainer in the first video with the second video including combining the depiction of the trainer in the first video with the second video in real-time as the trainer performs the workout, streaming the combined video live to the first exercise machine; reaching a branch point in a path traveled in the second video, the path splitting into multiple branches at the branch point; receiving feedback from a first user of the first exercise machine including a selection by the first user of one of the multiple branches of the path to travel down from the branch point; and causing the second video in real-time to travel down the selected branch from the branch point such that the trainer appears to travel down the selected path from the branch point.

Another aspect of the disclosure may include any combination of the above-mentioned features and may further include reaching a branch point in a path traveled in the second video, the path splitting into a first branch and a second branch at the branch point, the combining of the depiction of the trainer in the first video with the second video including combining the depiction of the trainer in the first video with the second video as the second video travels along the first branch to form a first selectable portion of the combined video; and combining the depiction of the trainer in the first video with the second video as the second video travels along the second branch to form a second selectable portion of the combined video.

Another aspect of the disclosure may include any combination of the above-mentioned features and may further include encoding environmental control commands into the subtitle stream of the combined video, the environmental control commands configured to control one or more environmental control devices in a vicinity of the first exercise machine.

Another aspect of the disclosure may include any combination of the above-mentioned features and may further include, or may stand alone by including, a method to alter a virtual background of a user on an exercise machine. The method may include capturing, by a camera, a first image or video of a user of an exercise machine with a chroma key screen as an actual background for the user of the exercise machine; combining a depiction of the user in the first image or video with a second image or video to form a combined image or video with a virtual background in place of the actual background; and displaying the combined image or video to at least one of the user or a viewer.

Another aspect of the disclosure may include any combination of the above-mentioned features and may further include the combined image or video being the combined video, establishing a video conference between the user of the exercise machine and another user of another exercise machine, and the displaying of the combined video to the at least one of the user or the viewer including displaying the combined video to the user and the other user.

Another aspect of the disclosure may include any combination of the above-mentioned features and may further include displaying a leaderboard with an entry for the user and another entry for another user, the leaderboard ranking performance indicators of the user and the other user with respect to performance of a workout by the user and the other user, the displaying of the combined image or video to the at least one of the user or the viewer including displaying the combined image or video within the entry of the user in the leaderboard.

Another aspect of the disclosure may include any combination of the above-mentioned features and may further include executing, at the exercise machine, a video workout program to enable the user to perform a workout on the exercise machine, including displaying a workout video to the user that depicts an environment, the second image or video depicting the environment; and the combined image or video showing the user in the environment.

Another aspect of the disclosure may include any combination of the above-mentioned features and may further include receiving input from the user effective to interact with the environment; and altering the environment in the workout video or the combined image or video responsive to the input.

Another aspect of the disclosure may include any combination of the above-mentioned features and may further include the user performing a workout on the exercise machine and other users performing the workout on other exercise machines; displaying the combined image or video including displaying the depiction of the user and the virtual background in a first block of a multi-user grid where the virtual background displayed in the first block includes a performance indicator of the user in performing the workout; and displaying the grid with the block for the user and a different block for each of the other users, each block of the other users including a combined image or video of a depiction of the corresponding user and a corresponding virtual background, each corresponding virtual background including a performance indicator of the corresponding user performing the workout.

Another aspect of the disclosure may include any combination of the above-mentioned features and may further include the second image or video including one or more virtual beings and the combined image or video showing the one or more virtual beings chasing the user.

Another aspect of the disclosure may include any combination of the above-mentioned features and may further include, or may stand alone by including, a method to execute a video workout program at an exercise machine to enable a user to perform a workout on the exercise machine. The method may include continually controlling one or more moveable members of the exercise machine according to exercise machine control commands of the video workout program; and displaying a video to the user that depicts an environment, the video including multiple viewpoints of the environment, including: displaying a first viewpoint of the video to the user on a first display located in a first position relative to the user; and displaying a second viewpoint of the video to the user on a second display located in a second position relative to the user, the second position different than the first position.

Another aspect of the disclosure may include any combination of the above-mentioned features and may further include at least one of the first display or the second display being movable relative to the exercise machine.

Another aspect of the disclosure may include any combination of the above-mentioned features and may further include the video being a first video, capturing, by a camera, a second video of the user of the exercise machine with the second viewpoint of the first video on the second display device as a background of the user; and displaying the second video to at least one of the user or a viewer.

Another aspect of the disclosure may include any combination of the above-mentioned features and may further include the second display being located behind the user and the second viewpoint of the video includes one or more virtual beings that appear to be chasing the user.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

Throughout the drawings, identical reference numbers designate similar, but not necessarily identical, elements.

DETAILED DESCRIPTION

Figure 1:
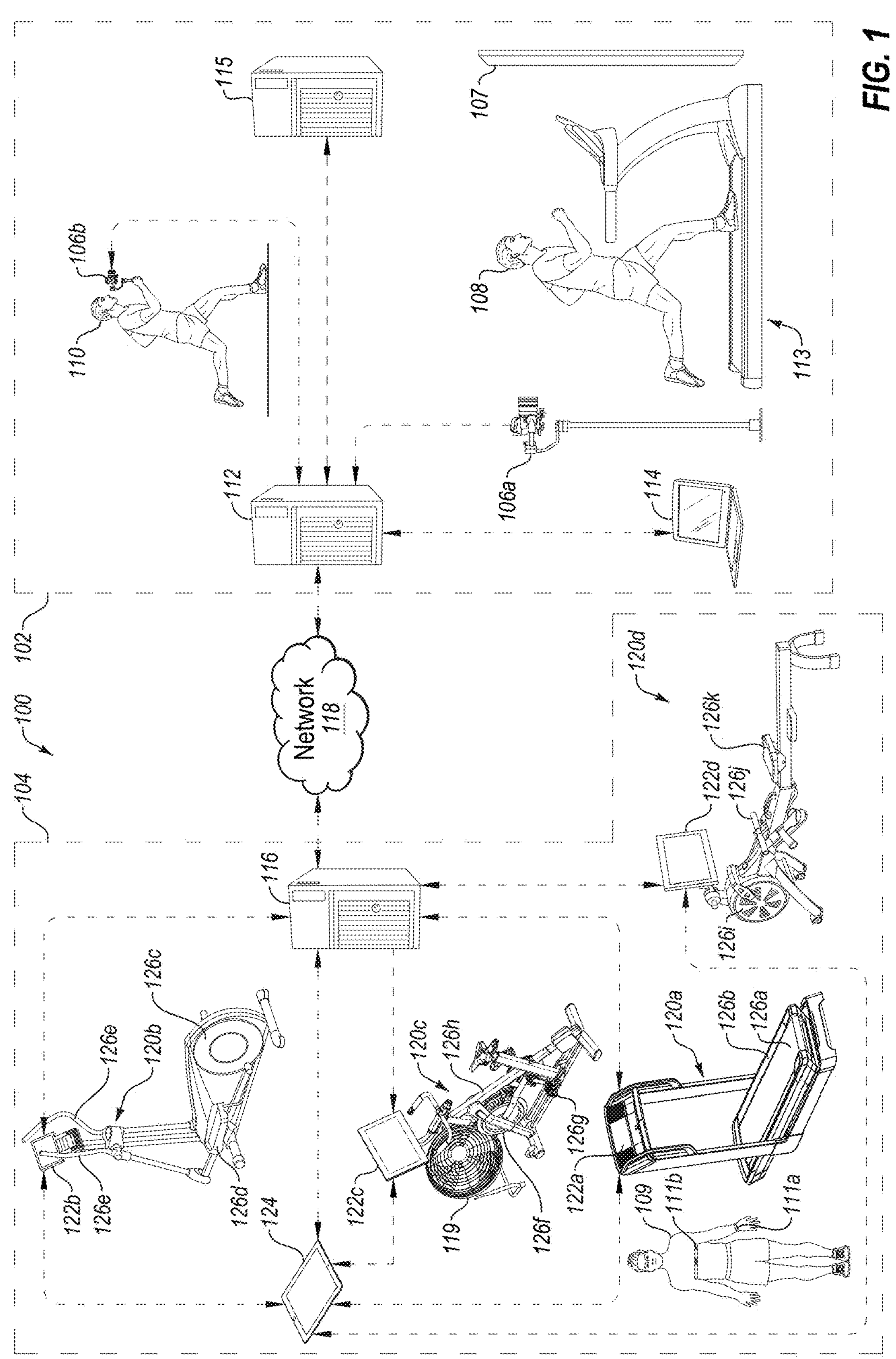
FIG. 1 illustrates a flowchart of an example exercise machine system.

While conventional stationary exercise machines generally include multiple conventional workout programs that are saved within the electronics of the exercise machines, these conventional workout programs are generally not effective at enabling a user to become immersed in workouts performed on the exercise machines. Therefore, some exercise machines are capable of being updated with video workout programs that include a video of a trainer performing a workout to allow one or more users to mimic the workout of the trainer. Video workout programs may also include corresponding control commands that control the exercise machine to mimic the workout performed by the trainer in the video. For example, where a trainer is depicted as running at 6 miles per hour in the video (either along a real-world path such as in a race setting, or on a treadmill in a class setting) of a video workout program, each user may control the running belts of their respective treadmill to likewise operate at 6 miles per hour, or the corresponding control commands may control the running belts of their respective treadmills to likewise operate at 6 miles per hour. Many video workout programs enjoyed by users include video of trainers performing workouts, such as running or biking, in different locations throughout the world. However, such video workout programs may require a significant amount of time and cost to produce when they involve sending trainers and camera crews to different locations arounds the world.

Some embodiments disclosed herein may include methods for producing video workout programs using a chroma key screen, a display panel, captured video that moves through an environment, and/or rendered video generated by a game engine. For example, a method may include capturing a first video that includes a depiction of a trainer performing a workout and combining the depiction of the trainer in the first video with a second video that moves through an environment to form a combined video. Exercise machine control commands may be encoded into a subtitle stream of the combined video to create a video workout program. Execution of the video workout program on exercise machines of users may be configured to display the combined video on a display of or at each exercise machine and continually control one or more movable members of the exercise machines according to the exercise machine control commands.

The trainer may perform the workout on an exercise machine on a stage or set in front of a chroma key screen, such as a bluescreen or a greenscreen, or in front of one or more display panels, such as a FUSE TECHNICAL GROUP LED panel, a television, a projection screen combined with a projector, or other display panel. In some embodiments, the second video may be combined with the depiction of the trainer of the first video by keying out portions of the first video that match a pre-selected color (e.g., one or more blue tones in the case of a bluescreen background) and replacing the keyed out portions in the first video with the second video. Alternatively, the second video may be combined with the depiction of the trainer of the first video by playing the second video on the one or more display panels, e.g., in the background of the trainer, such that when the first video is captured it simultaneously captures both the trainer and the second video displayed in the background. In some embodiments, performance parameters of the trainer and/or operating parameters of the exercise machine may be recorded as the trainer performs the workout. The exercise machine control commands encoded in the subtitle stream of the combined video may be based on or correspond to the performance parameters and/or the operating parameters. For example, the exercise machine control commands may be configured to cause a user's exercise machine speed and/or incline to be adjusted to match those of the trainer's exercise machine as the workout progresses.

The second video may include a captured video, a rendered video, or a combination of the two. As used herein, a captured video refers to a video captured by a camera filming in the real world. For example, a videographer with a camera may move (e.g., walk, run, bike, row) along a real world route through a real world environment to capture the second video that moves through the environment. The captured video may be captured by the videographer while, e.g., rowing across Lake Bled in Slovenia, rowing the Charles River in Massachusetts, cycling the Slickrock trail in Moab, Utah, cycling one or more stages of the Tour de France, running to the summit of Mount Elbert in Colorado, running the Boston marathon, climbing one or more sections of the Great Wall of China, or other environment in the real world. In some embodiments, performance parameters may be recorded as the videographer moves along the route, such as speed, cadence, heart rate, incline, or other performance parameters. The exercise machine control commands encoded in the subtitle stream of the combined video may be based on or correspond to the performance parameters. For example, if the second video moves along a route with time-varying incline, the exercise machine control commands may cause an exercise machine of a user to adjust the incline of the exercise machine over time to match or substantially match the time-varying incline of the route.

A rendered video refers to a video generated by a game engine or rendering engine, such as the UNREAL ENGINE game engine, of a virtual world. For example, a game engine may render video that moves through a virtual environment in the virtual world. The virtual world in a rendered video is rendered without having been previously filmed. The virtual world may be based on or look like real world locations in the past, present, or future, such as the route of Paul Revere's 1775 midnight ride, the route of Howard Carter's 1922 exploration and entry into/discovery of King Tut's tomb (also referred to as KV62), or other real world locations in the past, present, or future, optionally with one or more virtual or real depictions of people from the past, present, or future. Alternatively or additionally, the virtual world may be based on or depict real world locations or worlds that humans are unable to easily reach, or unable to reach at all, to film, such as the Moon, the center or interior of the Earth, the Mariana Trench, Proxima b (e.g., a planet that orbits the star Proxima Centauri in the Alpha Centauri star system), or other difficult- or impossible-to-reach real world locations or worlds. Alternatively or additionally, the virtual world may be based on or depict fictional locations or worlds, such as the planet Tattoine in the Star Wars fictional universe, Hogwarts School of Witchcraft and Wizardry in the Harry Potter fictional universe, or other fictional locations or worlds.

Accordingly, some embodiments described herein may generate the video workout program with the combined video in which the trainer appears to move through the environment of the second video despite the trainer not actually being in the environment. Producing combined video for video workout programs in this manner may be significantly less expensive and/or require less time than on-location filming of video for video workout programs. For instance, some embodiments described herein do not require any travel time or expense for the trainer or crew, or can limit travel time and expense to a skeleton crew of, e.g., the videographer alone or fewer than the crew required to film the trainer on location.

Alternatively or additionally, some users may get greater enjoyment from workouts of video workout programs when the experience is more immersive. Some embodiments described herein may make video workout programs more immersive by generating images or video of users with virtual backgrounds, providing multiple viewpoints in video of video workout programs that may be displayed on different displays positioned at different locations relative to a given user, and/or by generating and providing custom in-workout messages to users via deepfake depictions of trainers.

Turning now to the drawings, FIG. 1 illustrates a flowchart of an example exercise machine system 100. The exercise machine system 100 may include a remote location 102 and a local location 104 connected by a network 118.

In some embodiments, the network 118 may be configured to communicatively couple any two devices in the exercise machine system 100 to one another, and/or to other devices. In some embodiments, the network 118 may be any wired or wireless network, or combination of multiple networks, configured to send and receive communications between systems and devices. In some embodiments, the network 118 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 118 may also be coupled to, or may include, portions of a telecommunications network, including telephone lines, for sending data in a variety of different communication protocols, such as a cellular network or a Voice over IP (VoIP) network.

In the remote location 102, the exercise machine system 100 may include a video camera 106*a* that may be employed to capture a first video of a trainer 108 performing a workout on a stage or set with one or more chroma key screens or display panels 107 as background. The chroma key screens or display panels 107 may cover all or a portion of one or more walls, the floor, and/or the ceiling of the stage or set. The chroma key screen or display panel 107 is hereinafter referred to as "backdrop 107" for convenience. The backdrop 107 may include a bluescreen, a greenscreen, or other color screen for chroma key image or video production. Alternatively or additionally, the backdrop 107 may include a display panel on which a second video may be displayed or played as the trainer 108 performs the workout. The trainer 108 may perform the workout on an exercise machine 113 which is illustrated as a treadmill in FIG. 1. More generally, the exercise machine 113 may include any suitable exercise machine, such as a treadmill, a stationary bike, an elliptical, a rower machine, a stair stepper, or other exercise machine. In some embodiments, performance parameters of the trainer 108 and/or operating parameters of the exercise machine 113 may be monitored and used to generate exercise machine control commands.

In some embodiments, the exercise machine system 100 may also include a video camera 106*b* that may be employed to capture a second video that moves through an environment in the real world. The video camera 106*b* may include stabilization capabilities to avoid the captured video from being unduly shaky. The video camera 106*b* may be employed by a videographer 110 to capture the second video of the environment in the real world that the videographer 110 moves through while performing a workout. The workout performed by the videographer 110 may be of the same type as the workout performed by trainer 108 but without use of an exercise machine. For example, if the workout of the trainer 108 is a session on a stair stepper, a run on a treadmill, or a ride on a stationary bike, the videographer 110 may film with the video camera 106*b* while respectively ascending a mountain trail or a staircase, running, or cycling. In some embodiments, performance parameters of the videographer 110 may be monitored and used to generate exercise machine control commands.

In some embodiments, the exercise machine system 100 may also include a game engine 115 that may be employed to render a second video that moves through a virtual environment in a virtual world. As an example, the game engine 115 may include the UNREAL ENGINE 5 game engine, the UNREAL ENGINE 4 game engine, other version of the UNREAL ENGINE, a real-time engine, or other game engine. In some embodiments, the game engine 115 includes a real-time engine and editor that features photorealistic rendering, dynamic physics and effects, lifelike animation, robust data translation, or other features. The game engine 115 may allow a content creator to choose and/or switch between virtual environments for the second video, may use artificial intelligence (AI) to create and/or control content within virtual environments (e.g., clouds, wind, volcano, weather, etc.), or have other features or functionality. In some embodiments, a camera angle of the video camera 106*a* relative to the trainer 108, performance parameters of the trainer 108, and/or operating parameters of the exercise machine 113 may be piped into the game engine 115 as one or more inputs in control of one or more aspects of the second video. For example, the game engine 115 may synchronize a speed at which the second video moves through the virtual environment to a speed of the exercise machine 113. As another example, the game engine 115 may synchronize a view angle of the virtual environment to the camera angle of the video camera 106*a*.

The first video captured by the video camera 106*a* may be combined with the second video captured by the video camera 106*b* or the second video rendered by the game engine 115. Where the backdrop 107 includes a chroma key screen, the remote server 112 may combine the second video with the first video by keying out portions of the first video that match a pre-selected color, e.g., of the backdrop 107, and replacing the keyed out portions with the second video to create the combined video. Where the backdrop 107 includes an LED panel or other display, the second video may be combined with the first video by displaying the second video on the backdrop 107 while the first video is captured such that the first video captures both the trainer 108 performing the workout and the second video displayed on an opposite side of the trainer 108 from the video camera 106*a* while the trainer 108 performs the workout. The exercise machine 113 of the trainer 108 may appear in the combined video, may be obscured or disguised, or may be removed (e.g., in post processing of the first video and/or the combined video).

The second video may be captured or rendered before, simultaneous with, or after the first video is captured. The combined video may be generated simultaneous with or after both the first and second videos are available for combining. The first video captured by the video camera 106*a*, the second video captured by the video camera 106*b* or rendered by the game engine 115, and/or the combined video may be sent to the remote server 112 for further processing. The first video, the second video, and/or the combined video may be formatted in any one of multiple video formats, at least some of which being capable of supporting a subtitle stream. Some example formats may include MPEG-4, Dynamic Adaptive Streaming over HTTP (MPEG-DASH), and HTTP Live Streaming (HLS).

Next, a producer (not shown) or other user may utilize a computer 114 to input exercise machine control commands for the combined video into a video workout program, which may be encoded into a subtitle stream of the combined video, or may be encoded separately from the combined video, such as in separate data packets. For example, where the combined video is being produced to be utilized as a live video workout program, the producer may input the exercise machine control commands using the computer 114 synchronously or substantially synchronously with the video camera 106*a* capturing the first video of the trainer 108 performing the workout (e.g., during a live event) and/or with generation of the combined video. In this example, the producer may also give corresponding instructions to the trainer 108, such as through an earpiece worn by the trainer 108, to help the trainer 108 and the producer be in sync following a common script or plan for the workout. Alternatively, where the combined video is produced to be utilized in a pre-recorded or archived video workout program, the producer may input exercise machine control commands using the computer 114 subsequent to the capture of the first video and/or generation of the combined video (e.g., minutes, hours, or days after the live event).

In some embodiments, the producer may utilize the computer 114 to input environmental control commands into the video workout program, which may be encoded into the subtitle stream of the combined video or may be encoded separately from the combined video, such as in separate data packets. The environmental control commands may be input synchronously or substantially synchronously with the video camera 106*a* capturing the first video of the trainer 108 performing the workout and/or with generation of the combined video. The environmental control commands may control operation of one or more environmental control devices integrated with and/or in a vicinity of an exercise machine on which the video workout program is executed so as to control or affect an environment of a user of the exercise machine. Such environmental control devices may include heat lamps, fans, oil diffusers, scent dispensers, lights, humidifiers, mist dispensers, or other environmental control device. The environmental control devices may be smart devices, may be communicatively coupled to a corresponding exercise machine, and/or may be communicatively coupled to the network 118, to receive the environmental control commands in the video workout program. An example environmental control device is depicted in FIG. 1 as a fan 119 in a vicinity of an exercise machine 120*c*.

In some embodiments, the video workout program, including the combined video and the control commands (which may be encoded in the subtitle stream of the combined video, or may be encoded separately from the combined video) may then be transmitted over the network 118 from the remote server 112 in the remote location 102 to a local server 116 in the local location 104.

The video workout program may then be transmitted from the local server 116 to be used in connection with an exercise machine 120*a*, 120*b*, 120*c*, or 120*d*. For example, the video workout program may be transmitted from the local server 116 to a console 122*a*, 122*b*, 122*c*, or 122*d* of the exercise machine 120*a*, 120*b*, 120*c*, or 120*d*, which may include a display, such as a touchscreen display. Alternatively or additionally, a separate tablet 124 may function as a console, or may function in connection with a console, of the exercise machine 120*a*, 120*b*, 120*c*, or 120*d*, and may also include a display, such as a touchscreen display. The tablet 124 may communicate with the console 122*a*, 122*b*, 122*c*, or 122*d*, and/or with the exercise machine 120*a*, 120*b*, 120*c*, or 120*d*, via a network connection, such as a Bluetooth connection. Alternatively or additionally, one or more other displays may be positioned in front of, behind, to the sides of, or in other locations relative to the exercise machine 120*a*, 120*b*, 120*c*, or 120*d* and may be in communication with the console 122*a*, 122*b*, 122*c*, or 122*d*. In these and other examples, the combined video and the control commands (which may be encoded in the subtitle stream of the combined video) may be decoded and/or accessed. Then, the console 122*a*, 122*b*, 122*c*, or 122*d*, the tablet 124, and/or the other display(s) may display the combined video from the video workout program (e.g., of the trainer 108 apparently performing the workout in the environment of the combined video) while simultaneously controlling one or more moveable members of the exercise machine 120*a*, 120*b*, 120*c*, or 120*d* using the exercise machine control commands and/or one or more environmental control devices in the vicinity of the exercise machine 120*a*, 120*b*, 120*c*, or 120*d* using the environmental control commands. Additional details regarding controlling an exercise machine using exercise machine control commands can be found in U.S. patent application Ser. No. 16/742,762, filed Jan. 14, 2020, which is incorporated herein by reference in its entirety for all that it discloses.

Further, during performance of a workout by a user 109 using the video workout program on the exercise machine 120*a*, 120*b*, 120*c*, or 120*d*, a heart rate of the user 109 may be monitored by the console 122*a*, 122*b*, 122*c*, or 122*d*, and/or the tablet 124. This heart rate monitoring may be accomplished by receiving continuous heart rate measurements wirelessly (such as over Bluetooth or Ant+) from a heart rate monitoring device worn by the user 109, such as a heart rate strap 111*b* or a heart rate watch 111*a*, or other wearable heart rate monitor. Alternatively, the heart rate monitoring device may be built into another device, such as being built into handlebars or handgrips of the exercise machine 120*a*, 120*b*, 120*c*, or 120*d*.

The heart rate strap 111*b* and the heart rate watch 111*a* are examples of sensors that may be used to generate and/or gather performance parameters or other information of users of the exercise machines 120*a*, 120*b*, 120*c*, and/or 120*d*. Such sensors may generally include heart rate sensors (such as may be included in the heart rate strap 111*b* and the heart rate watch 111), current sensors, speed sensors (e.g., tachometers), weight sensors, gait sensors, fingerprint sensors, biometric sensors (e.g., heart rate sensors, gait sensors, fingerprint sensors), accelerometers, or other sensors. Such sensors may be integrated with, included in, coupled to, or otherwise associated with one or more of the exercise machines 120*a*, 120*b*, 120*c*, and/or 120*d* and/or the users of the exercise machines 120*a*, 120*b*, 120*c*, and/or 120*d*.

The exercise machine 120*a* is illustrated in FIG. 1 as a treadmill. The treadmill 120*a* may include multiple different moveable members, including a running belt 126*a* and a running deck 126*b*, which may include one or more operating parameters that are selectively adjustable within a limited range. During performance of a workout using a video workout program on the treadmill 120*a*, the running belt 126*a* may rotate and the running deck 126*b* may incline. One example of an operating parameter on the treadmill 120*a* is a speed of the running belt 126*a*. The running belt 126*a* may rotate at different speeds within a limited range. An actuator (see FIG. 2), for example a belt motor, may selectively adjust the speed at which the running belt 126*a* rotates within the limited range. Another example of an operating parameter on the treadmill 120*a* is the inclination of running deck 126*b*. The running deck 126*b* may be selectively inclinable to different angles within a limited range. An actuator, for example an incline motor, may selectively adjust the incline of the running deck 126*b* within the limited range.

The exercise machine 120*b* is illustrated in FIG. 1 as an elliptical machine. The elliptical machine 120*b* may include multiple different moveable members, including a flywheel 126*c*, foot rails or pedals 126*d*, and handles 126*e*, which include one or more operating parameters that are selectively adjustable within a limited range. During performance of a workout using a video workout program on the elliptical machine 120*b*, movement of the foot rails or pedals 126*d* and the handles 126*e* may cause the flywheel 126*c* to rotate. One example of an operating parameter on the elliptical machine 120*b* is the amount of resistance applied to the flywheel 126*c*. A differing amount of resistance can be applied to the flywheel 126*c* to make the movement of the foot rails or pedals 126*d* and the handles 126*e* more difficult or less difficult. An actuator, such as a brake, may be used to selectively adjust the amount of resistance that is applied to the flywheel 126*c*. Another example of an operating parameter on the elliptical machine 120*b* is the inclination of foot rails or pedals 126*d*. The foot rails or pedals 126*d* may be inclinable to different angles within a limited range. An actuator, such as an incline motor, may selectively adjust the incline of the foot rails or pedals 126*d* within the limited range. Yet another example of an operating parameter on exercise machine 120*b* is the stride length of the foot rails or pedals 126*d* and/or the handles 126*e*. The stride length of the foot rails or pedals 126*d* and/or the handles 126*e* may be adjustable to different distances within a limited range. An actuator, for example a stride length motor, may selectively adjust the stride length of the foot rails or pedals 126*d* and/or the handles 126*e* within the limited range.

The exercise machine 120*c* is illustrated in FIG. 1 as an exercise bike. The exercise bike 120*c* may include multiple different moveable members, including a flywheel 126*f*, pedals 126*g*, and a frame 126*h*, which include one or more operating parameters that are selectively adjustable within a limited range. During performance of a workout using a video workout program on the exercise bike 120*c*, movement of the pedals 126*g* may cause the flywheel 126*f* to rotate. One example of an operating parameter on the exercise bike 120*c* is the amount of resistance applied to the flywheel 126*f*. A differing amount of resistance can be applied to the flywheel 126*f* to make rotation of the pedals 126*g* more difficult or less difficult. An actuator, such as a brake, may be used to selectively adjust the amount of resistance that is applied to the flywheel 126*f* within the limited range. Another example of an operating parameter on the exercise bike 120*c* is the position of the frame 126*h*. The frame 126*h* may tilt forward, backward, or from side to side within a limited range. An actuator, such as a tilt motor, may selectively adjust the position of the frame 126*h* within the limited range.

The exercise machine 120*d* is illustrated in FIG. 1 as a rower machine. The rower machine 120*d* may include multiple different moveable members, including a flywheel 126*i*, a rowbar 126*j*, and a seat 126*k*, which include one or more operating parameters that are selectively adjustable within a limited range. During performance of a workout using a video workout program on the rower machine 120*d*, movement of the rowbar 126*j* may cause the flywheel 126*i* to rotate. One example of an operating parameter on the rower machine 120*d* is the amount of resistance applied to the flywheel 126*i*. A differing amount of resistance can be applied to the flywheel 126*i* to make pulling on the rowbar 126*j* more difficult or less difficult. An actuator, such as a brake, may be used to selectively adjust the amount of resistance that is applied to the flywheel 126*i* within the limited range.

Figure 2:
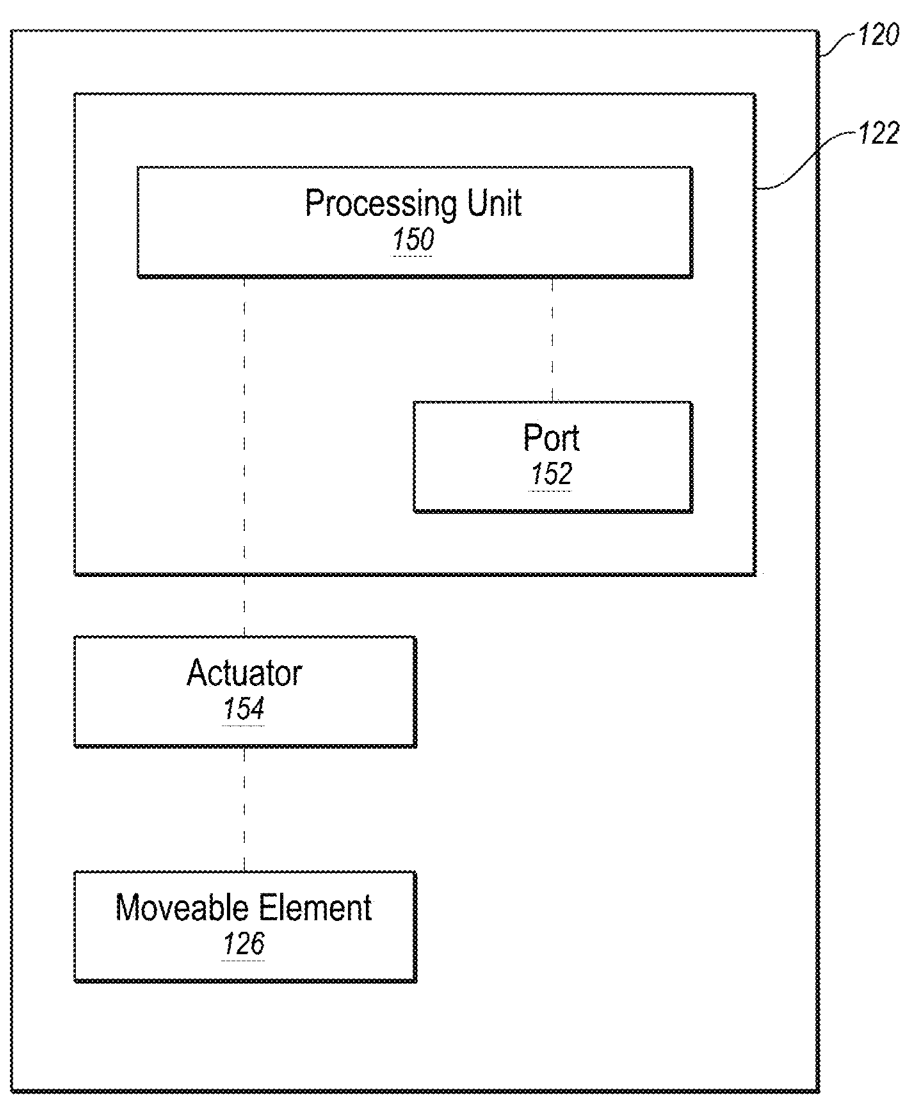
FIG. 2 illustrates a block diagram of an example exercise machine.

FIG. 2 illustrates a block diagram of an example exercise machine 120. The exercise machine 120 of FIG. 2 may represent, and may include similar components to, any of the exercise machine 120*a*, 120*b*, 120*c*, or 120*d* of FIG. 1, for example.

As disclosed in FIG. 2, the exercise machine 120 may include a processing unit 150, a receiving port 152, an actuator 154, and a moveable member 126. The moveable member 126 may be similar to any of the moveable members 126*a*-126*k* of FIG. 1, for example. The processing unit 150 may be communicatively connected to the receiving port 152 and may be included within a console 122, which may be similar to any of the consoles 122*a*, 122*b*, 122*c*, or 122*d* of FIG. 1, for example. The processing unit 150 may also be communicatively connected to the actuator 154. In response to control commands executed by the processing unit 150, the actuator 154 may selectively adjust one or more operating parameters of the moveable member 126 within a limited range.

Data, including data in a video workout program, can be received by the exercise machine 120 through the receiving port 152. As stated previously, a video workout program may include video as well as control commands. Control commands may provide control instructions to an exercise machine (such as a treadmill, an elliptical machine, an exercise bike, or a rower machine) and/or one or more associated environmental control devices. Control commands may include, for example, control commands for a belt motor, an incline motor, and other actuators. In addition to actuator control commands, control commands may further include distance control commands, time control commands, and/or heart rate zone control commands. These control commands may provide a series of actuator control commands for execution at specific times or at specific distances. For example, a control command for an actuator to be at a certain level for a specific amount of time or for a specific distance. These control commands may also provide a series of actuator control commands for execution at specific times or at specific distances based on a user's monitored heart rate or heart rate trends over time. For example, a control command for an actuator may dictate a certain heart rate zone for a certain amount of time or distance, and a difficulty level of this control command may be dynamically scaled based on a user's monitored heart rate in order to get or keep the user in the certain heart rate zone for the certain amount of time or distance. Additional details regarding dynamically scaling a difficulty level of a control command based on a user's monitored heart rate can be found in U.S. patent application Ser. No. 16/742,762, filed Jan. 14, 2020, which is incorporated herein by reference in its entirety for all that it discloses.

Using a control command, received at the receiving port 152 in a video workout program, such as a control command that is decoded from a subtitle stream of a video of a video workout program for example, the processing unit 150 may control the actuator 154 on the exercise machine 120 in the sequence and at the times or distances specified by the control command. For example, actuator control commands that provide the processing unit 150 with commands for controlling a belt motor, an incline motor, a flywheel brake, stride length motor, or another actuator may be included in the control commands received in a video workout program at the exercise machine 120.

Actuator control commands can be received for different time segments or distance segments of a workout. For example, a ten minute workout may have twenty different control commands that provide the processing unit 150 with a different control command for controlling an actuator every thirty seconds. Alternatively, a ten mile workout may have twenty different control commands that provide a processing unit with a different control command for controlling an actuator every half mile. Workouts may be of any duration or distance and different control commands may be received at any time or distance during the workout. Alternatively, a 5 minute workout may have 300 different control commands that provide the processing unit 150 with a different control command for controlling an actuator once per second.

The control commands received in a video workout program at the exercise machine 120 may be executed by the processing unit 150 in a number of different ways. For example, the control commands may be received and then stored into a read/write memory that is included in the processing unit 150. Alternatively, the control commands may be streamed to the exercise machine 120 in real-time. The control commands may also be received and/or executed from a portable memory device, such as a USB memory stick or an SD card.

Figure 3A:
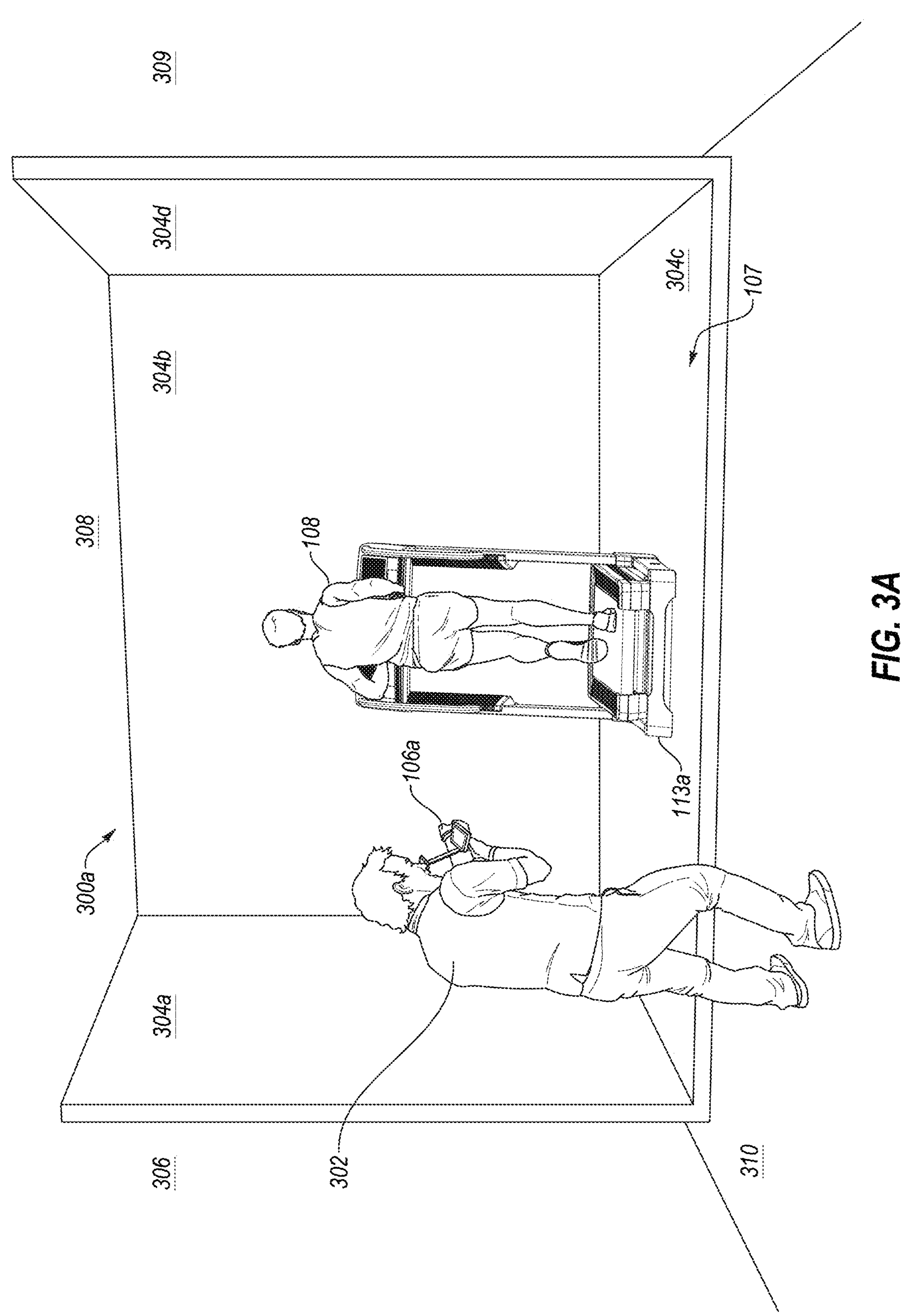
FIGS. 3A-3B illustrate example stages or sets in which a first video of a trainer performing a workout may be captured.
Figure 3B:
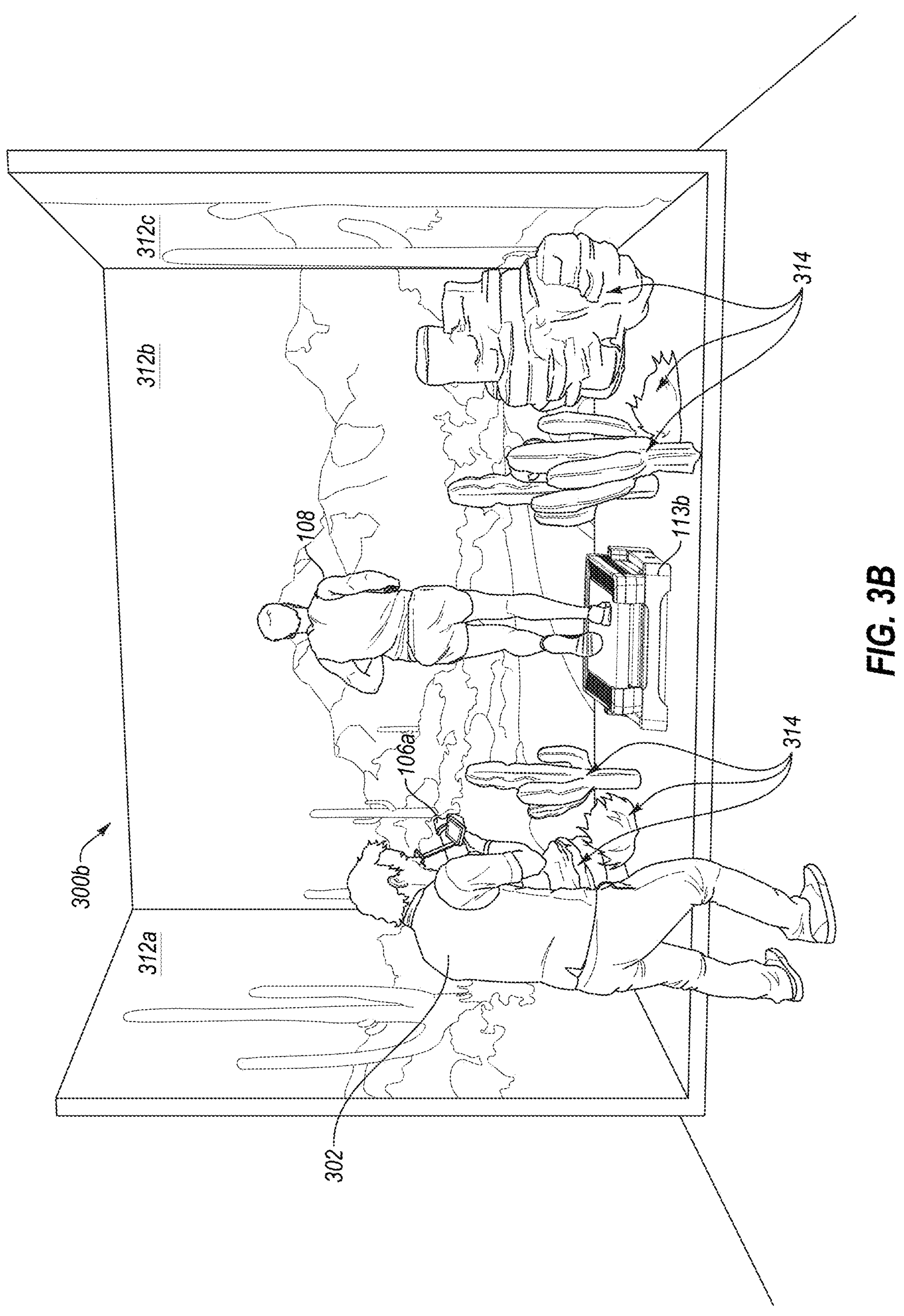

FIGS. 3A-3B illustrate example stages or sets 300*a*, 300*b* in which a first video of the trainer 108 performing a workout may be captured. A set videographer 302 may operate the video camera 106*a* in the stages or sets 300*a*, 300*b* to capture the first video of the trainer 108 performing the workout.

The trainer 108 may perform the workout on an exercise machine 113*a*, 113*b*, each of which is an example of the exercise machine 113 of FIG. 1. The exercise machine 113*a* is illustrated as a treadmill with a built-in console and handrails while the exercise machine 113*b* is illustrated as an underdesk treadmill. More generally, each of the exercise machines 113*a*, 113*b* may include a treadmill, a stationary bike, an elliptical, a rower machine, a stair stepper, or other exercise machine.

Each of the stages or sets 300*a*, 300*b* may be or include a soundstage, a silent stage, or other suitable facility or location to capture the first video of the trainer 108 performing the workout. The stage or set 300*a* includes the backdrop 107, implemented in the example of FIG. 3A as multiple chroma key screens 304*a*, 304*b*, 304*c*, 304*d*. The chroma key screens 304*a*, 304*b*, 304*c*, 304*d* may be positioned on, as part of, or spaced apart from all or a portion of one or more walls 306, 308, 309 and/or a floor 310 of the stage or set 300*a*. Each of the chroma key screens 304*a*, 304*b*, 304*c*, 304*d* may be painted on, formed on, placed on, adhered to, or otherwise provided on, as part of, or spaced apart from the corresponding one of the walls 306, 308, 309 or the floor 310. More generally, the backdrop 107 in FIG. 3A may include one or more chroma key screens, each of which covers all or portion of any surface or object in the stage or set 300*a*. Optionally, some or all of the exercise machine 113*a* may be painted or otherwise configured to have a same or similar color as the chroma key screens 304*a*, 304*b*, 304*c*, 304*d* of the backdrop 107. Portions of the first video captured by the video camera 106*a* in FIG. 3A that have a predetermined color or range of colors such as on the chroma key screens 304*a*, 304*b*, 304*c*, 304*d* of the backdrop 107 and/or optionally on the exercise machine 113 may be keyed out and replaced with a second video (which may have been captured at some other time by the videographer 110 or rendered by the game engine 115) to make the trainer 108 appear as if the trainer 108 is performing the workout in the environment of the second video despite the trainer 108 not actually being in the environment.

The stage or set 300*b* also includes the backdrop 107, implemented in this example as multiple LED panels 312*a*, 312*b*, 312*c*. In particular, the LED panel 312*a* forms a first wall, the LED panel 312*b* forms a second wall, and the LED panel 312*c* forms a third wall of the stage or set 300*b*. More generally, the backdrop 107 in FIG. 3B may include one or more LED panels or other display panels or devices positioned anywhere in the stage or set 300*b* (e.g., as or against any wall, the ceiling, the floor) so as to appear in the first video captured by the video camera 106*a*. In some embodiments, the second video (which may have been captured at some other time by the videographer 110 or rendered by the game engine 115) may be displayed on the LED panels 312*a*, 312*b*, 312*c* as the trainer 108 performs the workout so that the second video is combined with the first video when the first video is captured.

In some embodiments, one or both of the stages or sets 300*a*, 300*b* may include a practical floor with one or more props or objects that appear to belong to or blend in with the environment of the second video. For example, as illustrated in FIG. 3B, the stage or set 300*b* may include various props 314 which in this example are in the form of cactus, rocks, and sage brush that appear to belong to or blend in with a desert environment depicted in the second video displayed on the LED panels 312*a*, 312*b*, 312*c*.

Some or all of each of the exercise machines 113*a*, 113*b* may be removed from or obscured or disguised in the first video or the combined video in post-processing and/or when the combined video is generated (e.g., using chroma keying). In FIGS. 3A and 3B, while both exercise machines 113*a*, 113*b* are treadmills, the exercise machine 113*b* may be easier to remove or obscure than the exercise machine 113*a* since the exercise machine 113*b* is less visible due to the absence of any console or handrails. Thus, the exercise machine 113*b* may occupy less space in the first video captured by the video camera 106*a* than the exercise machine 113*a*. More generally, some embodiments herein may implement a special-purpose or stripped down exercise machine 113 such as the exercise machine 113*b* of FIG. 3B for the trainer 108 to reduce or minimize a visibility of the exercise machine 113 in the first video. Alternatively or additionally, the exercise machine 113 used by the trainer 108 may be a practical exercise machine that is painted, decorated, or otherwise configured to obscure or disguise its nature as an exercise machine or to blend in with an environment of the second video.

Figure 4:
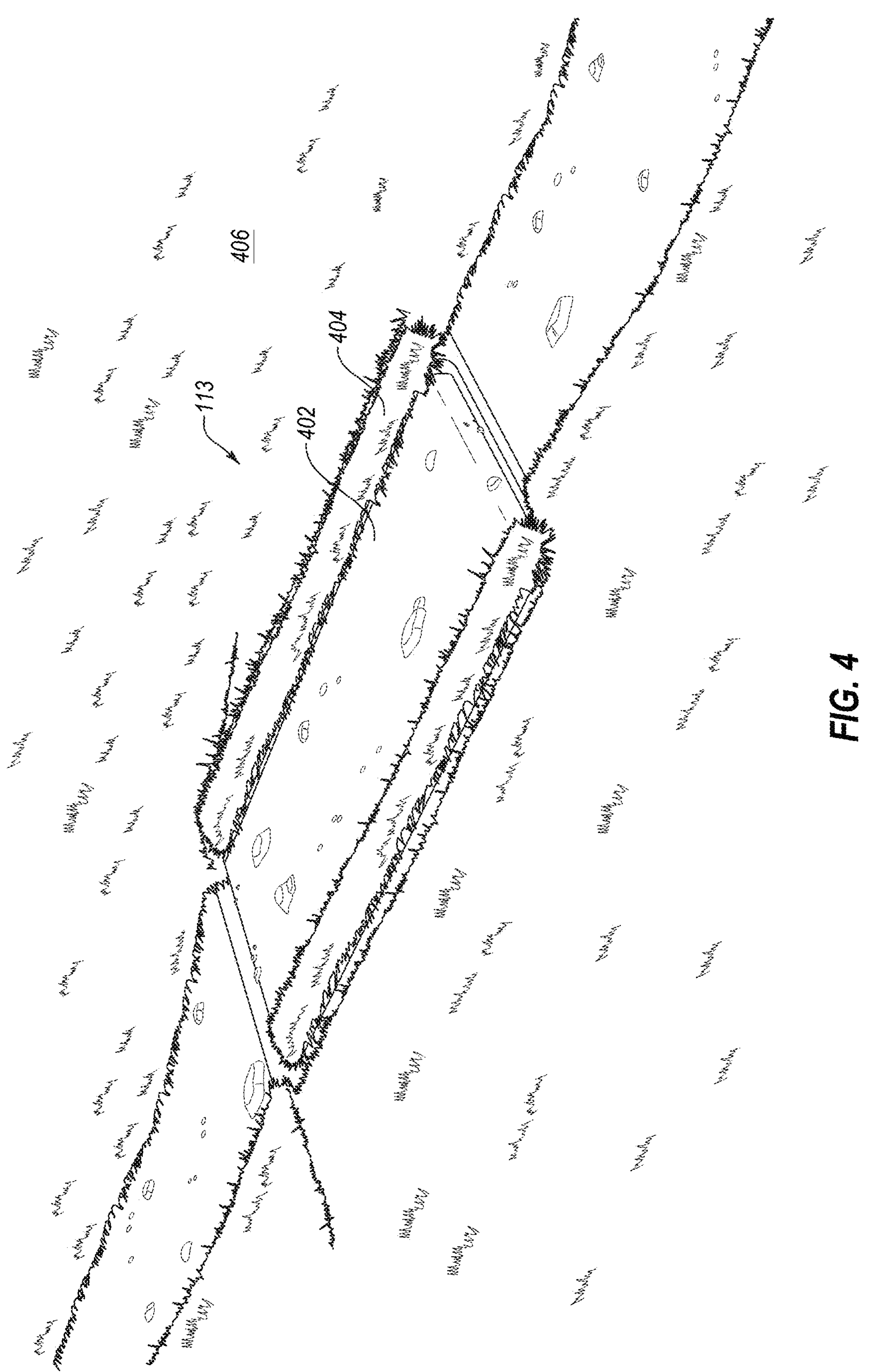
FIG. 4 illustrates an example practical exercise machine that may be used by a trainer to perform a workout for a video workout program.

FIG. 4 illustrates an example practical exercise machine 113 that may be used by the trainer 108 to perform a workout for a video workout program. The appearance of the practical exercise machine 113 may be configured to obscure its nature as an exercise machine, blend in with the environment of the second or combined video, and/or mimic an appearance or give of ground of the environment.

The practical exercise machine 113 of FIG. 4 is a treadmill that includes, among other components, a running belt 402 and siderails 404. The running belt 402 may be disguised as an outdoor running surface, e.g., by providing the running belt 402 with one or more elements or objects that look like they belong on an outdoor running surface. For example, the running belt 402 may be coated in gravel, sand, rocks, or other material. A person's stride, foot strikes, or other aspects when they run may look different when the person runs on a trail of gravel or that includes rocks than when the person runs on smooth pavement. Thus, coating the running belt 402 with gravel or rocks may cause the stride, foot strikes, or other aspects of the trainer's 108 workout (e.g., a run in the example of FIG. 4) on the practical exercise machine 113 to match the stride, foot strikes, or other aspects of the trainer 108 running outdoors on a trail with gravel or rocks. As such, the resulting combined video of the trainer 108 performing the workout on the practical exercise machine 113 may look more realistic than if the trainer 108 performed the workout on, e.g., a treadmill with a standard running belt. As another example, the running belt 402 of the practical exercise machine 113 may include a thick cushion that mimics the give of sand such that the trainer 108 appears to be running on sand when the trainer 108 is running on the running belt 402.

The siderails 404 may alternatively or additionally be disguised as an outdoor surface. In the example of FIG. 4, the running belt 402 has rocks formed thereon or coupled thereto while the siderails 404 have grass-formed thereon or coupled thereto. As a result, the exercise machine 113 may look like an outdoor running path.

In some embodiments, a stage or set 406 in which the exercise machine 113 is used while filming the first video may be disguised in the same, similar, or analogous manner as the exercise machine 113. For example, as illustrated in FIG. 4, the stage or set 406 may include a rocky path that extends in front of and behind the running belt 402 of the exercise machine 113 along with grass to either side of the gravel path.

Figure 5A:
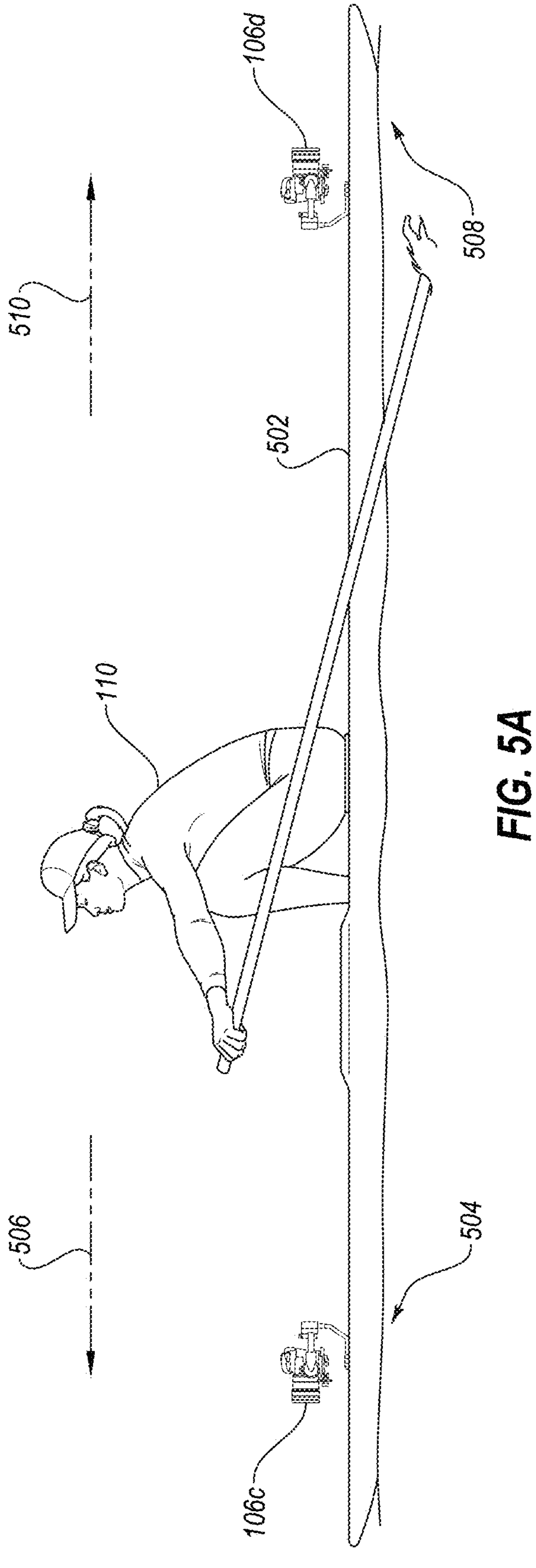
FIGS. 5A-5C illustrate examples of a videographer performing workouts in the real world to capture second video for video workout programs.
Figure 5B:
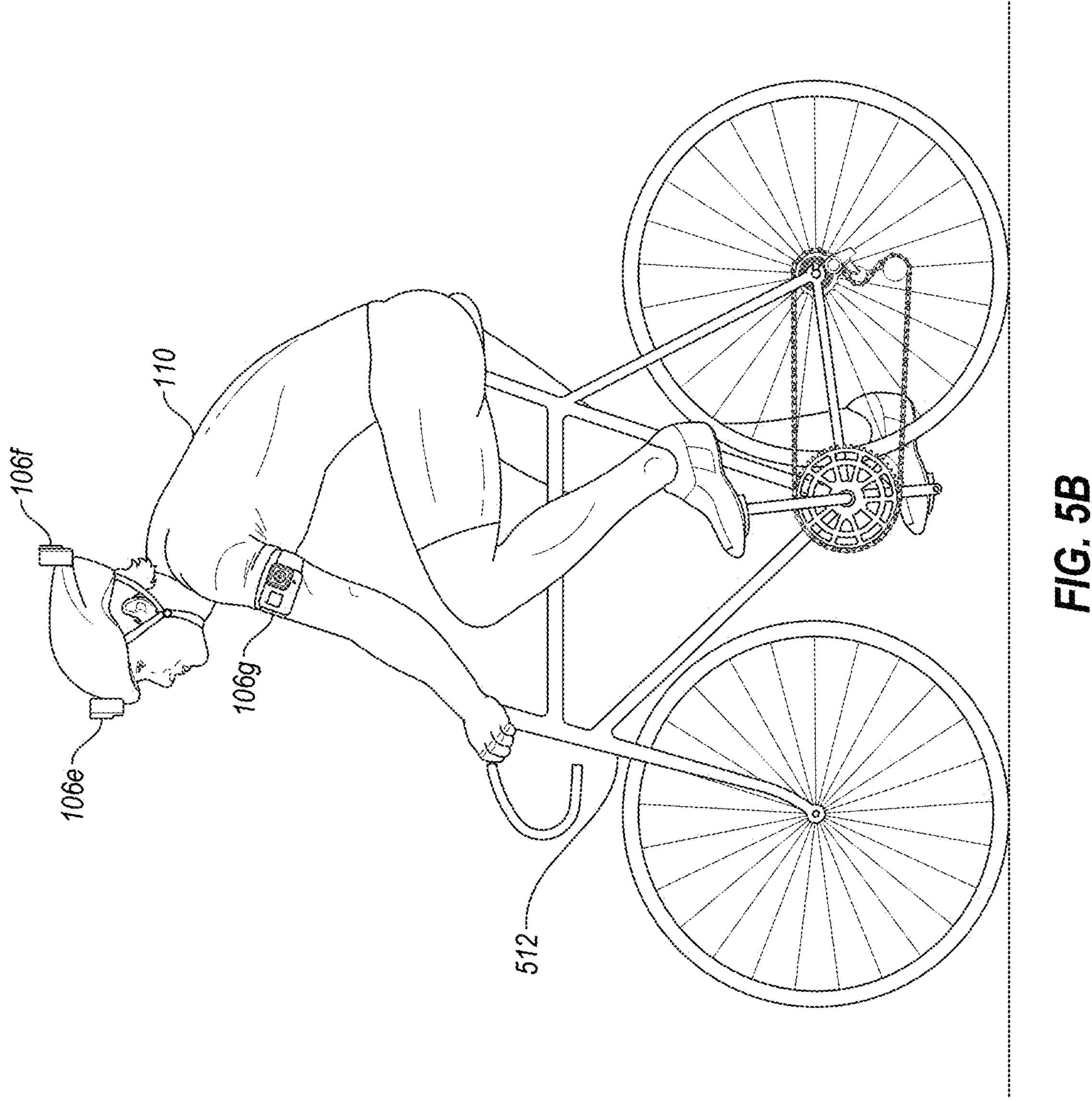
Figure 5C:

FIG. 1 illustrates an example of the videographer 110 capturing second video with the video camera 106*b* as the videographer 110 runs through a real world environment. FIGS. 5A-5C illustrate other examples of the videographer 110 performing other workouts in the real world to capture the second video for video workout programs.

In FIG. 5A, the videographer 110 is in a rowboat 502 on a body of water performing a rowing workout. The videographer 110 may use a first video camera 106*c* mounted to a first end 504 of the rowboat 502 to capture video of an environment in a first direction 506 relative to the videographer 110. Alternatively or additionally, the videographer 110 may use a second video camera 106*d* mounted to a second end 508 of the rowboat 502 to capture video of the environment in a second direction 510 relative to the videographer 110. The video captured by the first video camera 106*c* or the second video camera 106*d* may be used as the second video to be combined with first video of the trainer 108 performing a workout on, e.g., a rower machine as the exercise machine 113. One or both of the video cameras 106*c*, 106*d* may include stabilization capabilities to avoid the captured video from being unduly shaky.

In some embodiments, the second video may include both the video captured by the first video camera 106*c* and the video captured by the second video camera 106*d* as different viewpoints that may both be included in the combined video of a resulting video workout program. In some examples, only one of the viewpoints of the combined video may be displayed at a time on a given display. In some examples, multiple viewpoints of the combined video may be displayed at the same time on a given display. Alternatively or additionally, the videographer 110 may have additional video cameras pointed in different directions (e.g., one to each side of the videographer 110) to capture additional viewpoints of the environment that may be included in the combined video. A user with an exercise machine such as a rower machine and at least one display may in some embodiments choose which of the viewpoints to display on the display when the video workout program is executed. Alternatively or additionally, the user may toggle between the different viewpoints or show all of the viewpoints or multiple viewpoints together on the display while the video workout program is executed. In some embodiments, the user may have multiple displays and may display a different viewpoint on each of the displays. For example, a viewpoint captured by the video camera 106*c* may be displayed on a display in front of the user, a viewpoint captured by the video camera 106*d* may be displayed on a display behind the user, a leftward-facing viewpoint captured by a corresponding video camera (not shown in FIG. 5A) may be displayed on a display to the left of the user, and/or a rightward-facing viewpoint captured by a corresponding video camera (not shown in FIG. 5A) may be displayed on a display to the right of the user.

In FIG. 5B, the videographer 110 is on a bicycle performing a cycling workout outside in an environment of the real world with various video cameras 106*e*, 106*f*, 106*g* mounted to the body or equipment of the videographer 110. For example, the videographer 110 may use the video camera 106*e* mounted facing forward to capture video of an environment in front of the videographer 110, the video camera 106*f* facing rearward to capture video of the environment behind the videographer 110, and/or the video camera 106*g* facing leftward to capture video of the environment to the left of the videographer 110. Although not visible in FIG. 5B, the videographer 110 may use another video camera facing rightward (e.g., mounted on the right shoulder of the videographer 110) to capture video of the environment to the right of the videographer 110. The video captured by one or more of the video cameras 106*e*, 106*f*, 106*g* may be used as the second video to be combined with first video of the trainer 108 performing a workout on, e.g., a stationary bike as the exercise machine 113. One or more of the video cameras 106*e*, 106*f*, 106*g* may include stabilization capabilities to avoid the captured video from being unduly shaky.

In some embodiments, the second video may include two or more of the videos captured by the video cameras 106*e*, 106*f*, 106*g* as different viewpoints that may be included in the combined video of a resulting video workout program. A user with an exercise machine such as a stationary bike and at least one display may in some embodiments choose which of the viewpoints to display on the display when the video workout program is executed. Alternatively or additionally, the user may toggle between the different viewpoints or show all of the viewpoints or multiple viewpoints together on the display while the video workout program is executed. In some embodiments, the user may have multiple displays and may display a different viewpoint on each of the displays. For example, a forward-facing viewpoint captured by the video camera 106*e* may be displayed on a display in front of the user, a rearward-facing viewpoint captured by the video camera 106*f* may be displayed on a display behind the user, a leftward-facing viewpoint captured by the video camera 106*g* may be displayed on a display to the left of the user, and/or a rightward-facing viewpoint captured by the video camera on the right shoulder of the videographer 110 may be displayed on a display to the right of the user.

In FIG. 5C, the videographer 110 is performing a running workout outside in an environment of the real world with a video camera 106*h* mounted to the videographer 110. The video camera 106*h* in this example is a 360-degree video camera. As used herein, a 360-degree video camera is a video camera having a field of view that covers at least a full circle in a horizontal plane of the video camera. The videographer 110 may use the video camera 106*h* mounted to the head of the videographer 110 to capture video with multiple viewpoints of an environment in which the videographer 110 is running. The video captured by the video camera 106*h* may be used as the second video to be combined with first video of the trainer 108 performing a workout on, e.g., a treadmill as the exercise machine 113. The video camera 106*h* may include stabilization capabilities to avoid the captured video from being unduly shaky.

In some embodiments, the second video may include two or more viewpoints that may be included in the combined video of a resulting video workout program. A user with an exercise machine such as a treadmill and at least one display may in some embodiments choose which of the viewpoints to display on the display when the video workout program is executed. Alternatively or additionally, the user may toggle between the different viewpoints or show all of the viewpoints or multiple viewpoints side-by-side on the display while the video workout program is executed. In some embodiments, the user may have multiple displays and may display a different viewpoint on each of the displays. For example, a forward-facing viewpoint captured by the video camera 106*h* may be displayed on a display in front of the user, a rearward-facing viewpoint captured by the video camera 106*h* may be displayed on a display behind the user, a leftward-facing viewpoint captured by the video camera 106*h* may be displayed on a display to the left of the user, and/or a rightward-facing viewpoint captured by the video camera 106*h* may be displayed on a display to the right of the user.

Figure 6A:
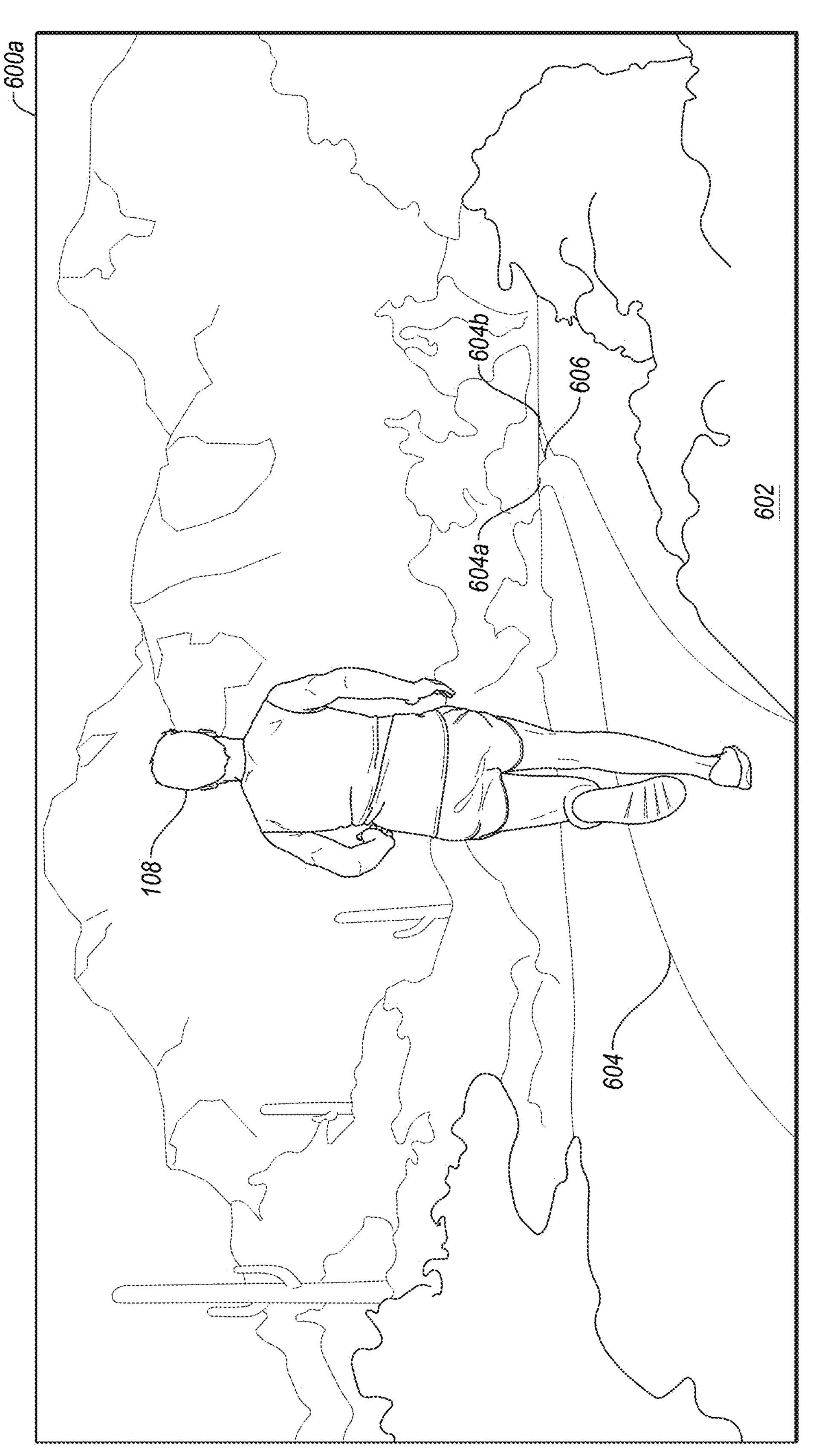
FIGS. 6A-6C illustrate video frames of a combined video for a video workout program that may be generated as described herein.
Figure 6B:
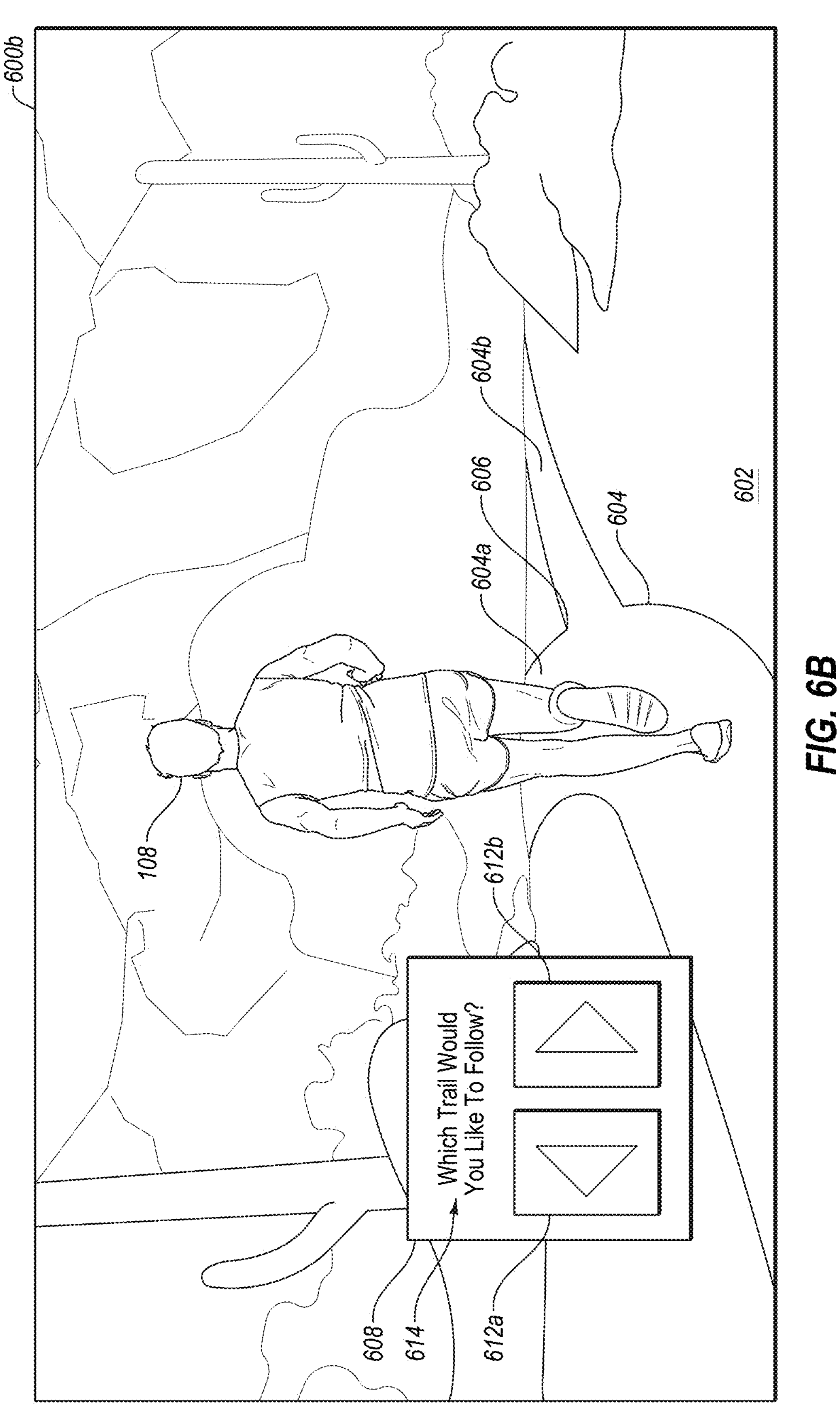
Figure 6C:
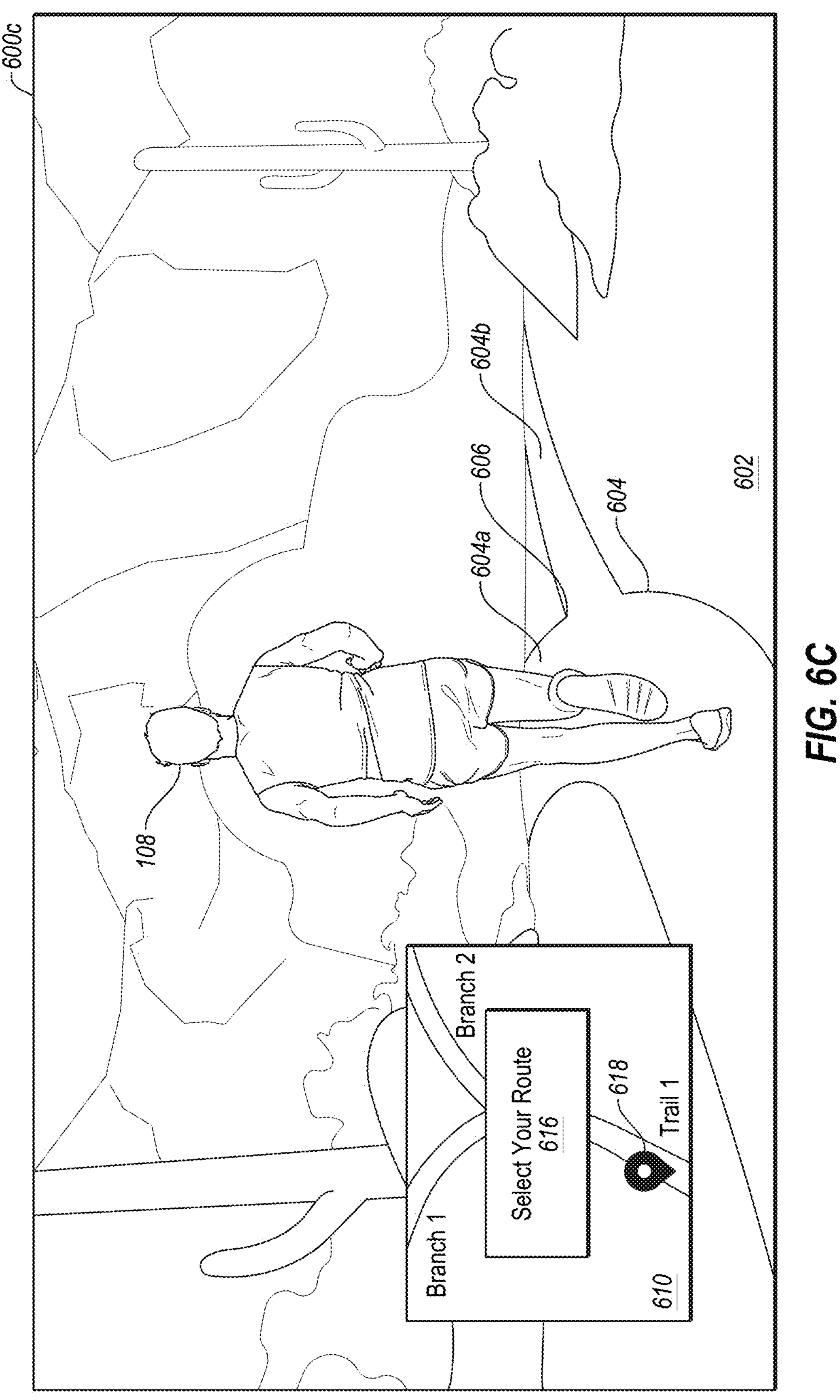

FIGS. 6A-6C illustrate video frames 600*a*, 600*b*, 600*c* of a combined video for a video workout program that may be generated as described herein. In particular, FIGS. 6A-6C illustrate frames 600*a*, 600*b*, 600*c* of the combined video generated by combining a first video of the trainer 108 performing a workout with a second video that depicts an environment 602. The second video may be captured by the videographer 110 moving through the real world with one or more video cameras, e.g., one or more of the video cameras 106*b*, 106*e*-106*h*, or may be rendered, e.g., by the game engine 115. In this example, the trainer 108 runs on a treadmill when the first video is captured and the second video (and thus the combined video) moves along a path 604. In the combined video it appears as though the trainer 108 is running on the path 604 despite the trainer 108 running on the treadmill rather than the path 604.

The path 604 includes a branch point 606 at which the path 604 splits into branches 604*a*, 604*b*. As the video workout program of FIGS. 6A-6C is executed at a user's exercise machine, the combined video and/or a user interface may provide the user with an indication that the user may select which of the two branches 604*a*, 604*b* to follow. For example, a user interface 608 (FIG. 6B) or 610 (FIG. 6C) may be displayed on a console or display of the user's exercise machine. The user interface 608 may include selectable elements 612*a*, 612*b* that respectively correspond to the branches 604*a*, 604*b* and/or a message 614 to the user instructing the user to select a desired branch. The user may operate an appropriate input device (e.g., touchscreen) to select the element 612*a* if the user desires to follow the branch 604*a* or the element 612*b* if the user desires to follow the branch 604*b*. The combined video may then proceed along the selected branch 604*a* or 604*b* after reaching the branch point 606.

The user interface 610 may include a map of the environment 602 and/or a message 616 to the user instructing the user to select a desired branch of the path 604, where the branches 604*a*, 604*b* and the path 604 are respectively labeled "Branch 1", "Branch 2", and "Trail1" in the map. Optionally, a graphical element 618 in the map may indicate a current location of the combined video on the path 604. The user interface 610 or similar user interface with the map may be automatically displayed when the combined video is within a predetermined distance or time of the branch point 606 or may be displayed in response to user input. The user may operate an appropriate input device (e.g., touchscreen) to, e.g., select the wording "Branch 1" if the user desires to follow the branch 604*a* or the wording "Branch 2" if the user desires to follow the branch 604*b*. The combined video may then proceed along the selected branch 604*a* or 604*b* after reaching the branch point 606.

In some embodiments, multiple users may be simultaneously performing the workout of the video of FIGS. 6A-6C on respective exercise machines as a group workout where video of the trainer 108 performing the workout and apparently moving along the path 604 is separately shown to each of the users on corresponding displays. Each user may select a desired branch with the trainer 108 appearing to follow one of the desired branches for the users that selected that branch and appearing to follow another of the desired branches for the users that selected the other branch. Alternatively, the users may vote on which of the branches to follow and the trainer 108 may follow the branch that receives the most votes.

Video workout programs such as those described above and elsewhere herein may be specifically designed as workouts or exercise to be performed while using an exercise machine, albeit with some entertainment value. Other video workout programs described herein may be specifically designed for entertainment while using an exercise machine, albeit with some workout or exercise value. Video workout programs herein that are specifically designed for entertainment but have some workout or exercise value may be referred to specifically as video entertainment programs. In some embodiments, video entertainment programs may or may not have a trainer or other individual such as a tour guide as part of a video included in the video entertainment program. Alternatively or additionally, video entertainment programs may or may not have any exercise machine control commands and/or environmental control commands. When a video entertainment programs lack exercise machine control commands, a user of an exercise machine at which the video entertainment program is executed may manually control one or more movable members of the user's exercise machine to a desired difficulty. When a video entertainment programs includes exercise machine control commands, the exercise machine control commands may control one or more movable members of the user's exercise machine to a relatively easy level. As in FIGS. 6A-6C, a path along which the video of a video entertainment program moves may have one or more branch points and a user may be able to select which of multiple branches to follow at each branch point in the video.

Figure 7:
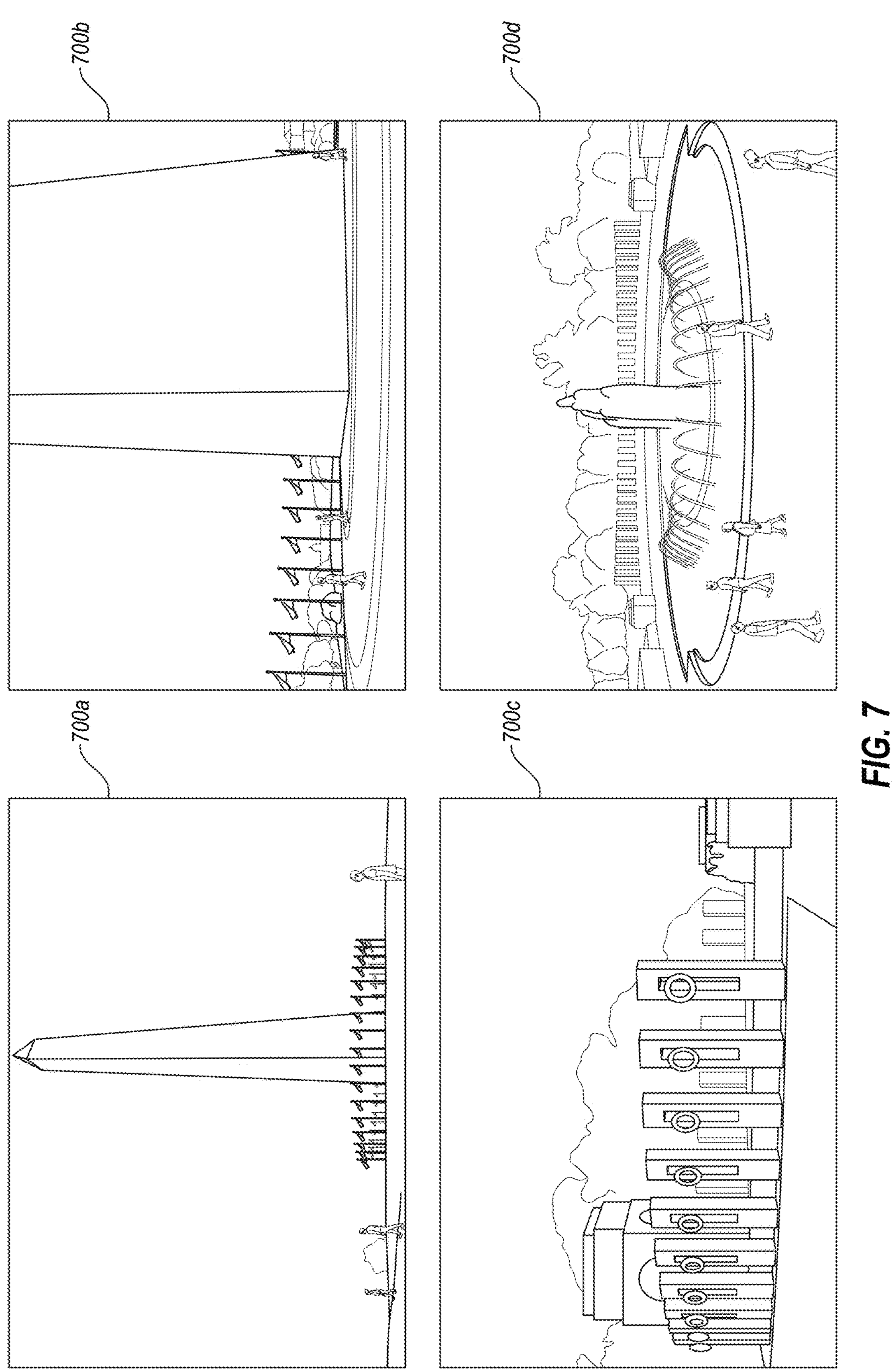
FIG. 7 illustrates video frames of a video for an example video entertainment program that may be generated as described herein.

FIG. 7 illustrates video frames 700*a*, 700*b*, 700*c*, 700*d* of a video for an example video entertainment program that may be generated as described herein. The video may include or be generated in the same or similar manner as, e.g., any of the second videos described herein, with or without being combined with a first video of a trainer or a tour guide. Alternatively or additionally, the video of this and other video entertainment programs may include audio of a tour guide, e.g., describing sights as they appear in the video, their history, or other information. The video of FIG. 7 is a video of a walking tour around the National Mall that is not combined with a first video of a trainer or tour guide. The video in this example may, at minimum, approach and pass by the Washington Monument and approach and enter the World War II Memorial with the frames 700*a*, 700*b*, 700*c*, 700*d* taken from various times in the video. For example, frame 700*a* is of the Washington Monument from afar, frame 700*b* is of the Washington Monument sometime later in the video from much closer, frame 700*c* is of the World War II Memorial sometime later in the video from outside the Memorial, and frame 700*d* is of the World War II Memorial sometime later in the video from inside the Memorial. Other video entertainment programs may include, e.g., video tours of any real or fictional sight or location, such as New York City, the Taj Mahal, the Louvre, or other sight or location.

Figure 8:
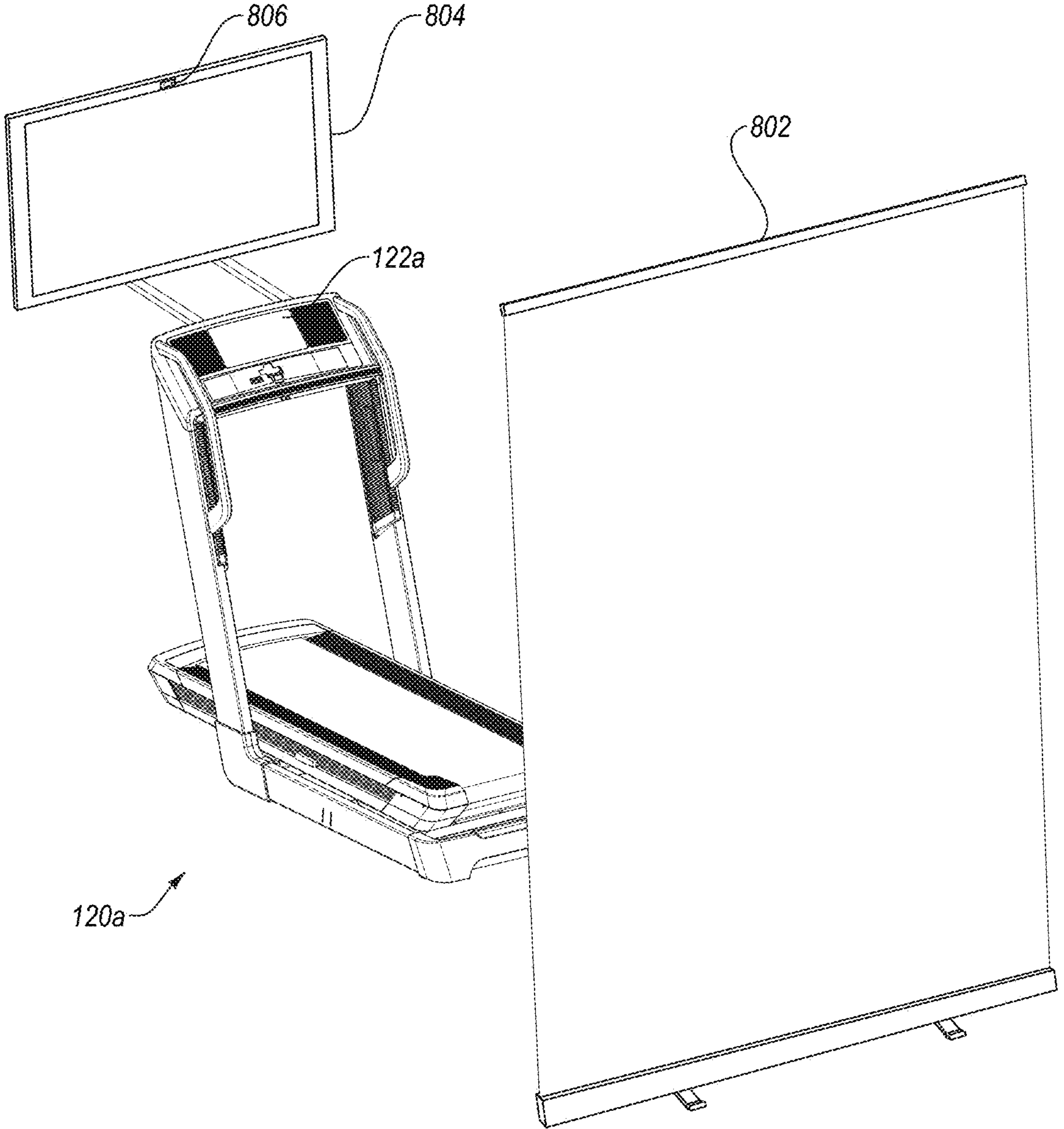
FIG. 8 illustrates an exercise machine of FIG. 1 with a chroma key screen positioned behind the exercise machine.

FIG. 8 illustrates the exercise machine 120*a* of FIG. 1 with a chroma key screen 802 positioned behind the exercise machine 120*a*. The chroma key screen 802 may be attached to a frame as illustrated, or to a wall, ceiling, or other structure so as to be positioned generally behind the exercise machine 120*a* or at another location relative to the exercise machine 120*a*. In some embodiments, the chroma key screen 802 includes a sheet of a desired color, such as a blue sheet or a green sheet, and may be shipped or included with the exercise machine 120*a*. A user of the exercise machine 120*a* or other individual may position the chroma key screen 802 behind the exercise machine 120*a*.

As previously indicated, the exercise machine 120*a* may include the console 122*a* with a display. Alternatively or additionally, the exercise machine 120*a* and other exercise machines herein may include or be coupled to an external display 804 and/or a video camera 806. The video camera 806 may be integrated with the display 804 as illustrated or may be separate therefrom. Video of a video workout program may be displayed on the display of the console 122*a* and/or the display 804.

The video camera 806 may capture a first image or video of the user, e.g., while the user performs a workout using the exercise machine 120*a* and/or while the user is otherwise in a field of view of the video camera 806. With the chroma key screen 802 as an actual background of the user, a depiction of the user from the first image or video may be combined with a second image or video to form a combined image or video with a virtual background in place of the actual background. In particular, portions of the first image or video that match a pre-selected color, such as may be included in the chroma key screen 802, may be keyed out and replaced with the second video.

In some embodiments, the combined image or video may be displayed to the user, e.g., on all or a portion of the display of the console 122*a* and/or on all or a portion of the display 804. In some embodiments, the combined image or video may be displayed to a viewer, e.g., via a corresponding display. The viewer may include another user of another exercise machine that may be performing the same workout as part of the same video workout program as the user of the exercise machine 120*a*. The viewer may include a bystander that is not performing the workout, e.g., a friend or family member of the user of the exercise machine 120*a* that may have access to the combined image or video (for example, the user may share a link to the combined image or video with the viewer).

Figure 9:
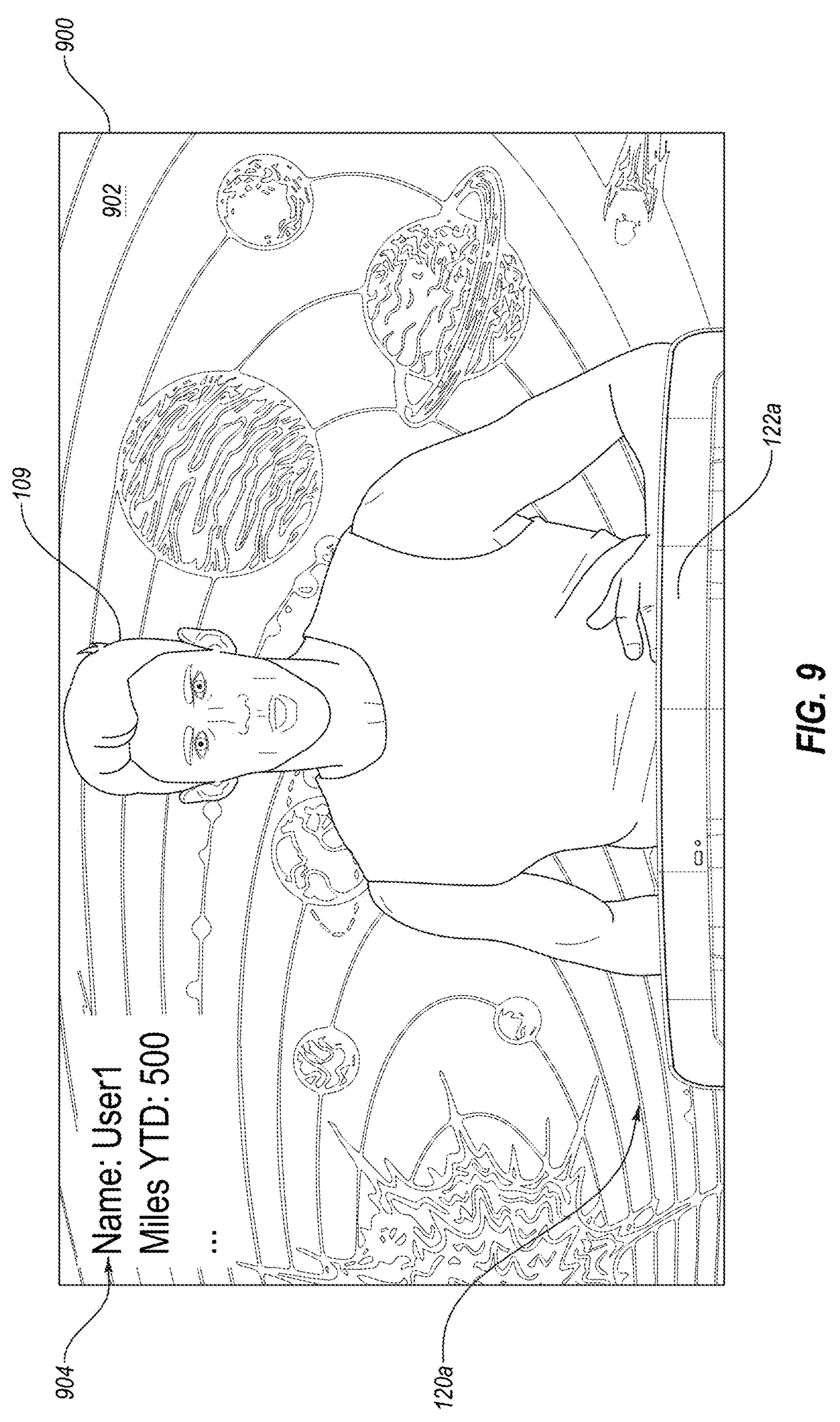
FIG. 9 illustrates an example profile image of a user that may be generated using a chroma key screen and video camera at an exercise machine.

FIG. 9 illustrates an example profile image 900 of the user 109 that may be generated using the chroma key screen 802 and the video camera 806 at the exercise machine 120*a*. Profile images for other users using other chroma key screens and video cameras at other exercise machines may similarly be generated. Referring to FIGS. 8 and 9, the video camera 806 may capture a first image of the user 109 with the chroma key screen 802 in the background. Portions of the first image that include the chroma key screen 802 may then be keyed out and replaced by a second image 902 to generate a combined image as the profile image 900. In this example, the second image 902 is an image of a portion of a solar system with various planets but more generally could be any fictional or real image, whether captured or rendered.

The profile image 900 may be used in a leaderboard to show the position or performance of the user 109 relative to other users. Alternatively or additionally, the profile image 900 may be used in a social media user profile or other user profile of the user 109. In some embodiments, information or statistics about the user 109 may be included in or added to the profile image 900, such as the name of the user 109 ("User1" in this example), a total distance run by the user 109 in a current calendar year ("500" miles in this example) on the exercise machine 120*a*, or other information or statistics.

Figure 10:
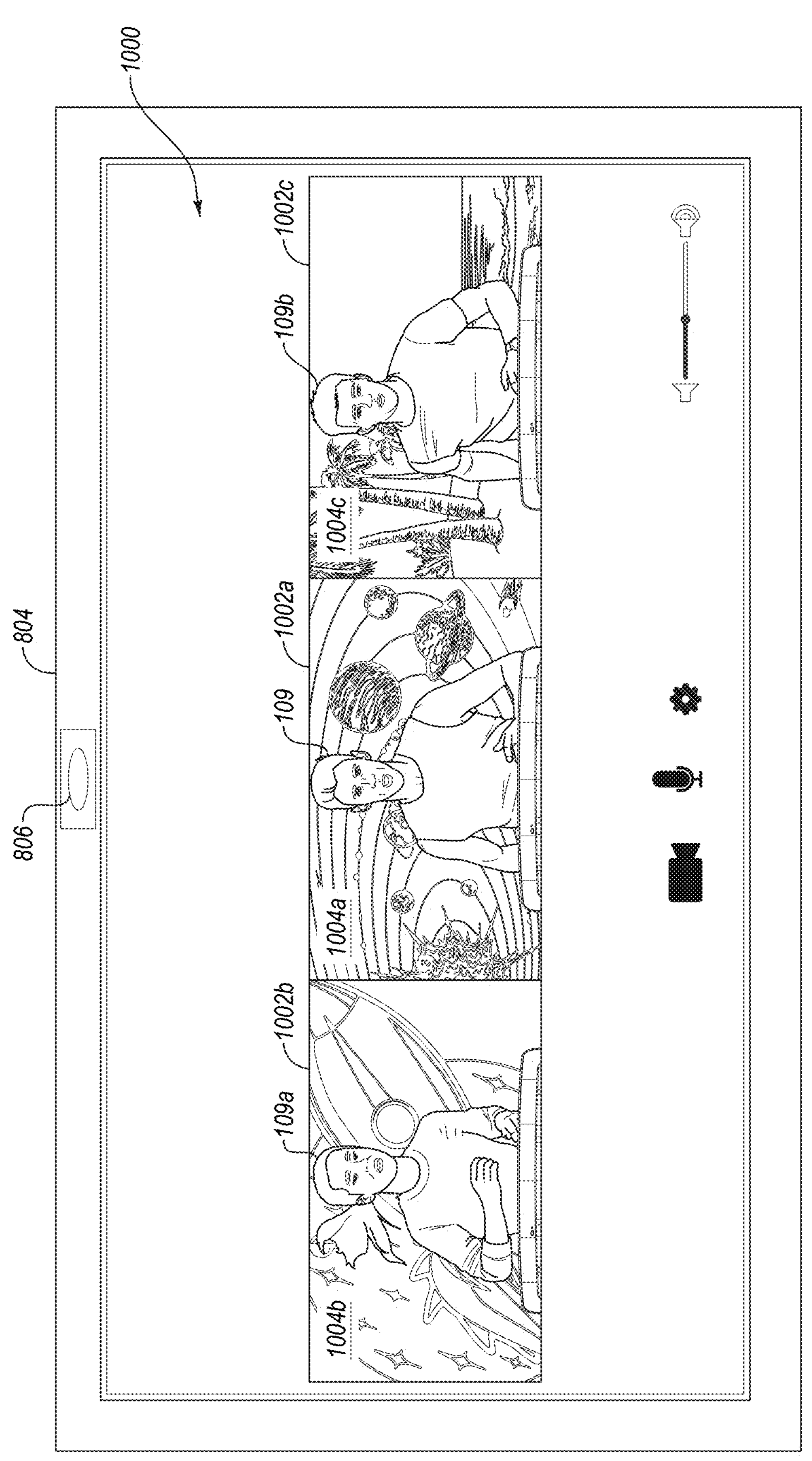
FIG. 10 illustrates an example live video chat between users of exercise machines with chroma key screens and video cameras at the exercise machines.

FIG. 10 illustrates an example live video chat 1000 between users of exercise machines with chroma key screens and video cameras at the exercise machines. The live video chat 1000 may be displayed on the display 804 or other displays described herein. The live video chat 1000 includes multiple video feeds 1002*a*, 1002*b*, 1002*c*, including one video feed for each of multiple users 109, 109*a*, 109*b* performing in the live video chat 1000. The video feed 1002*a* may be generated as follows. Referring to FIGS. 8 and 10, the video camera 806 may capture a first video of the user 109 with the chroma key screen 802 in the background. Portions of the first video that include the chroma key screen 802 may then be keyed out and replaced by a second video 1004*a* to generate a combined video as the video feed 1002*a*. The video feeds 1002*b* and 1002*c* may be generated in a similar manner using video cameras and chroma key screens at the exercise machines used by the users 109*a*, 109*b* to combine first video of the users 109*a*, 109*b* with a corresponding second video 1004*b*, 1004*c*.

In some embodiments, one or more of the users 109, 109*a*, 109*b* may select the second videos 1004*a*, 1004*b*, 1004*c* to be used as virtual backgrounds to the users 109, 109*a*, 109*b* in the video feeds 1002*a*, 1002*b*, 1002*c*. In the example of FIG. 10, the second video 1004*a* in the video feed 1002*a* of the user 109 is a video of a solar system with various planets in orbit around a star, the second video 1004*b* in the video feed 1002*b* of the user 109*a* is a video of a fantasy world, and the second video 1004*c* in the video feed 1002*c* of the user 109*c* is a video of a tropical beach. In some embodiments, the second videos 1004*a*, 1004*b*, 1004*c* may include the same second video, e.g., a rear viewpoint of a combined video in a video workout program that all of the users 109, 109*a*, 109*b* are doing at their respective exercise machine. In this example, the location of each user 109, 109*a*, 109*b* in the environment depicted in the second video may vary depending on the speed with which each user 109, 109*a*, 109*b* is performing the workout of the video workout program. For example, if the average speed of the user 109 to a given point in the workout has been faster than that of the user 109*a* and the average speed of the user 109*b* has been slower than that of the user 109*a*, the user 109 may be ahead on a path or route in the second video, the user 109*b* may be behind on the path or route in the second video, and the user 109*a* may be somewhere on the path or route in the second video between the users 109 and 109*b*. In some embodiments, the users 109, 109*a*, 109*b* may select static virtual backgrounds (e.g., second images) rather than the second videos 1004*a*, 1004*b*, 1004*c* to be combined with the first videos of the users 109, 109*a*, 109*b* to generate the video feeds 1002*a*, 1002*b*, 1002*c*. In this example, the video feeds 1002*a*, 1002*b*, 1002*c* may show the users 109, 109*a*, 109*b* performing the workout against static virtual backgrounds. In general, the second videos 1004*a*, 1004*b*, 1004*c* and/or second images in the video feeds 1002*a*, 1002*b*, 1002*c* may be any fictional or real video or image, whether captured or rendered.

Figure 11A:
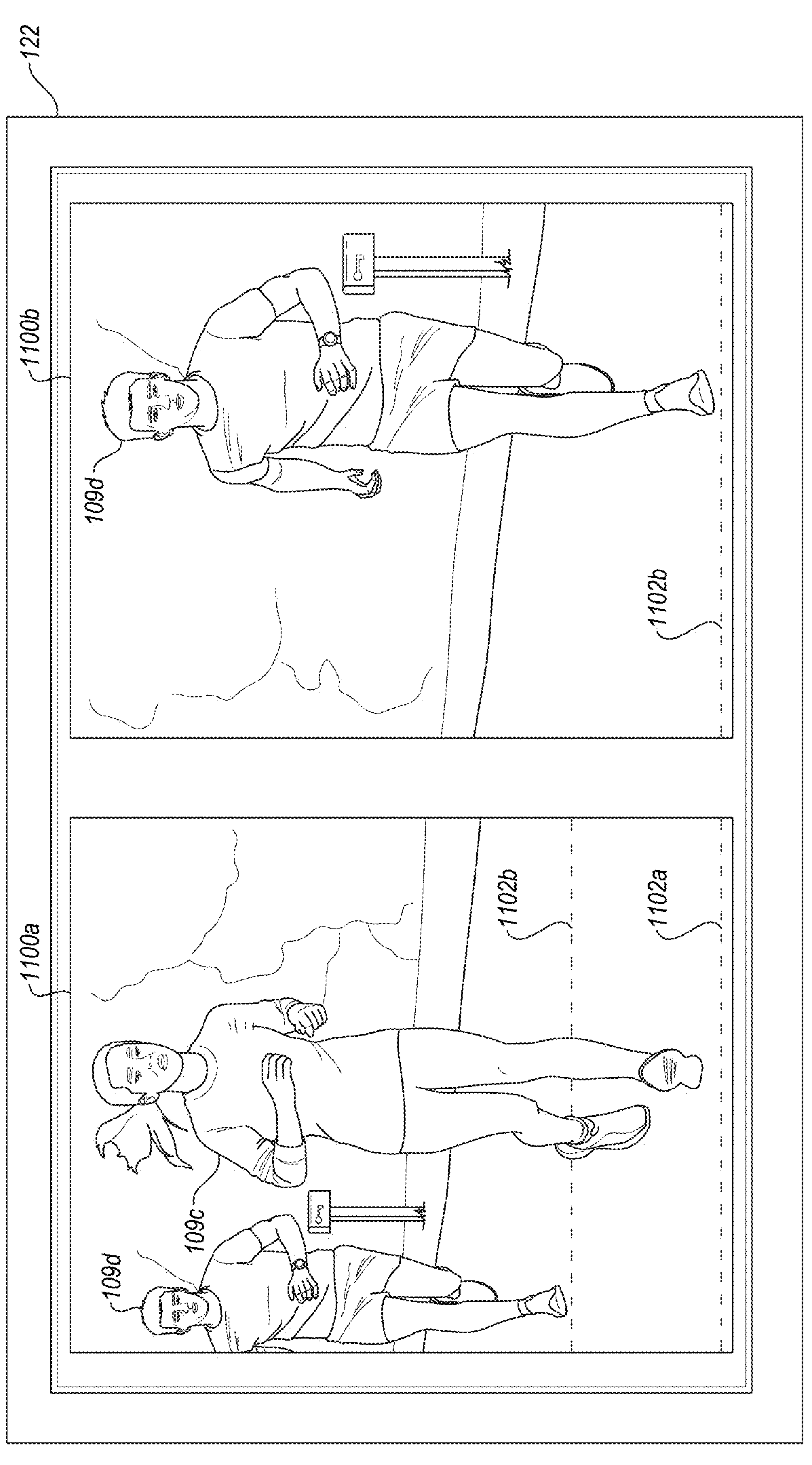
FIG. 11A illustrates example video feeds of users performing a workout of a video workout program.

FIG. 11A illustrates example video feeds 1100*a*, 1100*b* of users 109*c*, 109*d* performing a workout of a video workout program. Each of the video feeds 1100*a*, 1100*b* may be generated as described herein. For example, a video camera at the exercise machine of each user 109*c*, 109*d* may capture a corresponding first video of the user 109*c*, 109*d* with the corresponding chroma key screen in the background. Portions of each first video that include the chroma key screen may then be keyed out and replaced by a second video of the video workout program (and more particularly a rear viewpoint of the second video) to generate a corresponding combined video as the video feed 1100*a* or 1100*b* in which the users 109*c*, 109*d* appear to be performing the workout in the same environment as shown in the combined video of the video workout program.

The video feeds 1100*a*, 1100*b* may be displayed on a display of a console 122 of the exercise machine of the user 109*c* or the user 109*d*, for instance, or on a display of another user or viewer. Alternatively or additionally, the console 122 or the exercise machine may include a user interface such as described with respect to FIG. 12 that may be operated by the user 109*c*, 109*d* to select or remove video to or from the display of the console 1100*a*. Although not illustrated in FIG. 11A, the video that may be selected or removed may include the combined video of the video workout program and/or video feeds of other users that have already performed or are simultaneously performing the same workout.

In some embodiments, the users 109*c*, 109*d* may use the same exercise machine or different exercise machines to perform the same workout using the same video workout program, either simultaneously (e.g., by performing a live video workout or by performing an archived video workout with the same actual start time) or at separate times (e.g., by performing an archived video workout with different start times, but that are time shifted to have the same virtual start times).

Performance of the workout by each user 109*c*, 109*d* may be monitored and ranked, e.g., in a leaderboard. For example, the leaderboard may include entries for multiple users that have performed or are performing the same workout and the performance of the workout by each of the users relative to others may be indicated by the order of the entries in the leaderboard. As a particular example, the entries may be ordered in the leaderboard according to one or more parameters, such as average speed. Although not illustrated in FIG. 11A, the video feed 1100*a*, 1100*b* of each user 109*c*, 109*d* may be displayed as all or part of the entry for the user 109*c*, 109*d* in the leaderboard.

Alternatively or additionally, performance of the workout by each user 109*c*, 109*d* may be reflected in the video feeds 1100*a*, 1100*b*. For example, suppose after a first elapsed time of the workout (measured from the start time of each user) corresponding to frames of the video feeds 1100*a*, 1100*b* depicted in FIG. 11A, the user 109*c* has traveled a first distance to a first point 1102*a* in an environment of the combined video of the video workout program and the user 109*d* has traveled a second distance to a second point 1102*b* in the environment that is behind the first point 1102*a*. If the users 109*c*, 109*d* are performing the workout simultaneously and/or if the user 109*d* performs the workout before the user 109*c*, the user 109*d* and/or an avatar of the user 109*d* may be displayed in the video feed 1100*a* of the user 109*c* behind the user 109*c*, e.g., at the second point 1102*b* for the frame of the video feed 1100*a* depicted in FIG. 11A. In an example, this may be achieved by inserting or combining a portion of the first video of the user 109*d* (e.g., the portion that includes a depiction of the user 109*d*) or a scaled version into the video feed 1100*a*. Alternatively or additionally, and although not illustrated in FIG. 11A, if the users 109*c*, 109*d* are performing the workout simultaneously and/or if the user 109*c* performs the workout before the user 109*d*, the user 109*c* and/or an avatar of the user 109*c* may be displayed in the combined video of the video workout program ahead of the user 109*d*.

Figure 11B:
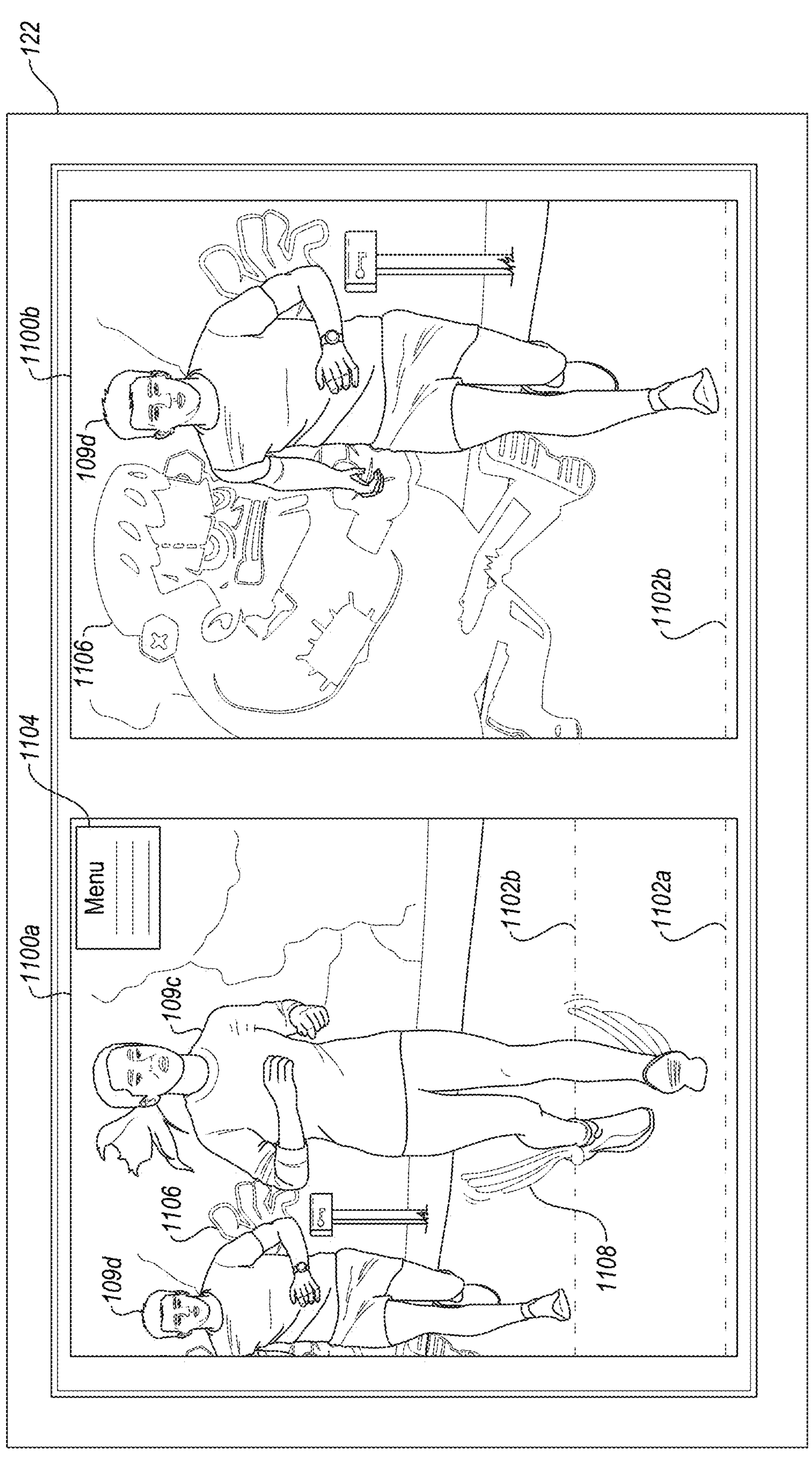
FIG. 11B illustrates the video feeds of FIG. 11A with a menu or other user interface on a console to alter the environment of the video feeds.

FIG. 11B illustrates the video feeds 1100*a*, 1100*b* of FIG. 11A with a menu 1104 or other user interface on the console 122 to alter the environment of the video feeds 1100*a*, 1100*b*. In this example, the user 109*c* is using the exercise machine that includes the console 122 and the menu 1104 appears only in the video feed 1100*a* of the user 109*c*. The user 109*c* may provide input through an appropriate input device (e.g., a touchscreen of the display of the console 122) to operate the menu 1104, in response to which the environment depicted in the video feed 1100*a*, the video feed 1100*b*, and/or the combined video of the video workout program may be altered. Example alterations may include displaying one or more virtual items in the environment to interfere with a depiction of another user or avatar of the other user, displaying a visual effect within the environment to indicate achievement by the user of a performance goal, displaying one or more virtual beings that appear to be chasing the user 109*c*, or adding other virtual object or visual effects. FIG. 11B illustrates a virtual monster 1106 that has been added by the user 109*c* to chase the user 109*c* and virtual wings 1108 that the user 109*c* has added to feet of the user 109*c* to indicate that the user 109*c* has passed a predetermined number of other users performing the same workout or completed some other goal. When the user 109*c* chooses to alter the environment to indicate completion of a goal, the user 109*c* may specify the alteration and the goal at any time and the environment may be automatically altered when the user 109*c* completes the goal, or the user may make the alteration when the user 109*c* notices that the goal has been completed. Alternatively or additionally, the user 109*c* may input alterations that do not depend on completion of a goal by the user 109*c*.

Figure 12:
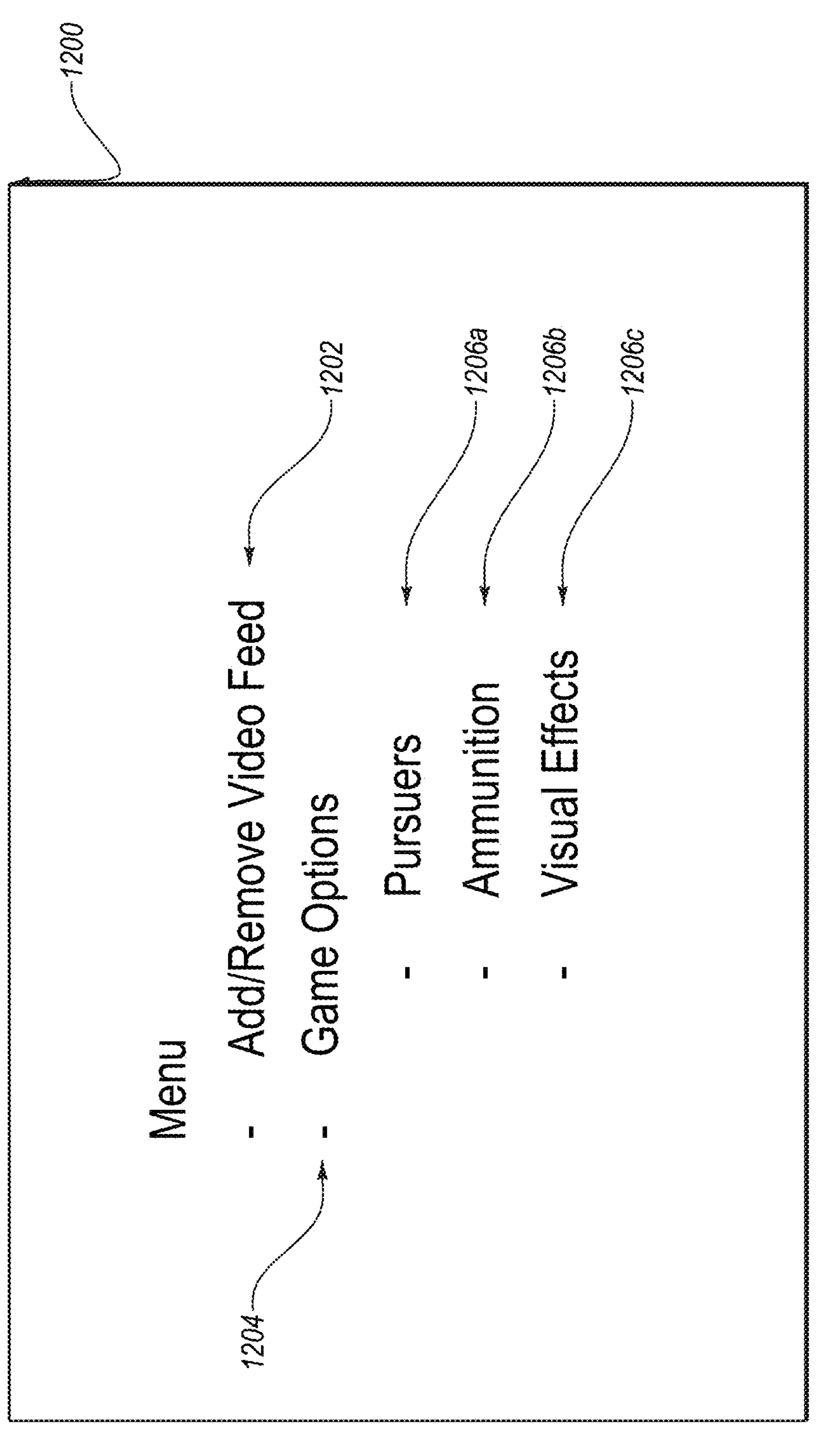
FIG. 12 illustrates an example of a user interface that may be used in some embodiments.

FIG. 12 illustrates an example of a user interface 1200 that may be used in some embodiments. The user interface 1200 or similar user interface may be opened on a display and/or console at an exercise machine in use by a user, e.g., in response to selection of the menu 1104 of FIG. 11B or in response to other suitable input. The user interface 1200 may include one or more options or menu items 1202, 1204 that may be selected to alter the environment and/or the video feeds shown in the display of the console of the exercise machine in use by the user. For example, selection of the menu item 1202 may expand the user interface 1200 between the menu items 1202, 1204, open a drop-down list, or provide some other user interface element(s) which may be operated or selected by the user to add or remove video to the display at the exercise machine in use by the user. The video that may be added or removed may include video feeds of users and/or video of a video workout program. As another example, selection of the menu item 1204 may expand the user interface 1200 following the menu item 1204 as illustrated in FIG. 12, open a drop-down list, or provide some other user interface element(s) which may be operated or selected by the user to alter the environment of one or more video feeds and/or the combined video of a video workout program being performed by the user. In this example, the expansion of the user interface 1200 includes sub-menu items 1206*a*, 1206*b*, 1206*c* which may be selected to make various alterations to the environment. For example, the sub-menu item 1206*a* may be selected to add one or more virtual beings (e.g., monsters, dragons, zombies, cougars) to the environment to chase the user. The sub-menu item 1206*b* may be selected to choose one or more virtual items (e.g., virtual burgers, virtual tacks) to throw at or in front of other users or their avatars in the environment. The sub-menu item 1206*c* may be selected to choose one or more visual effects to add to the environment, optionally contingent on completion of a goal by the user.

Figure 13:
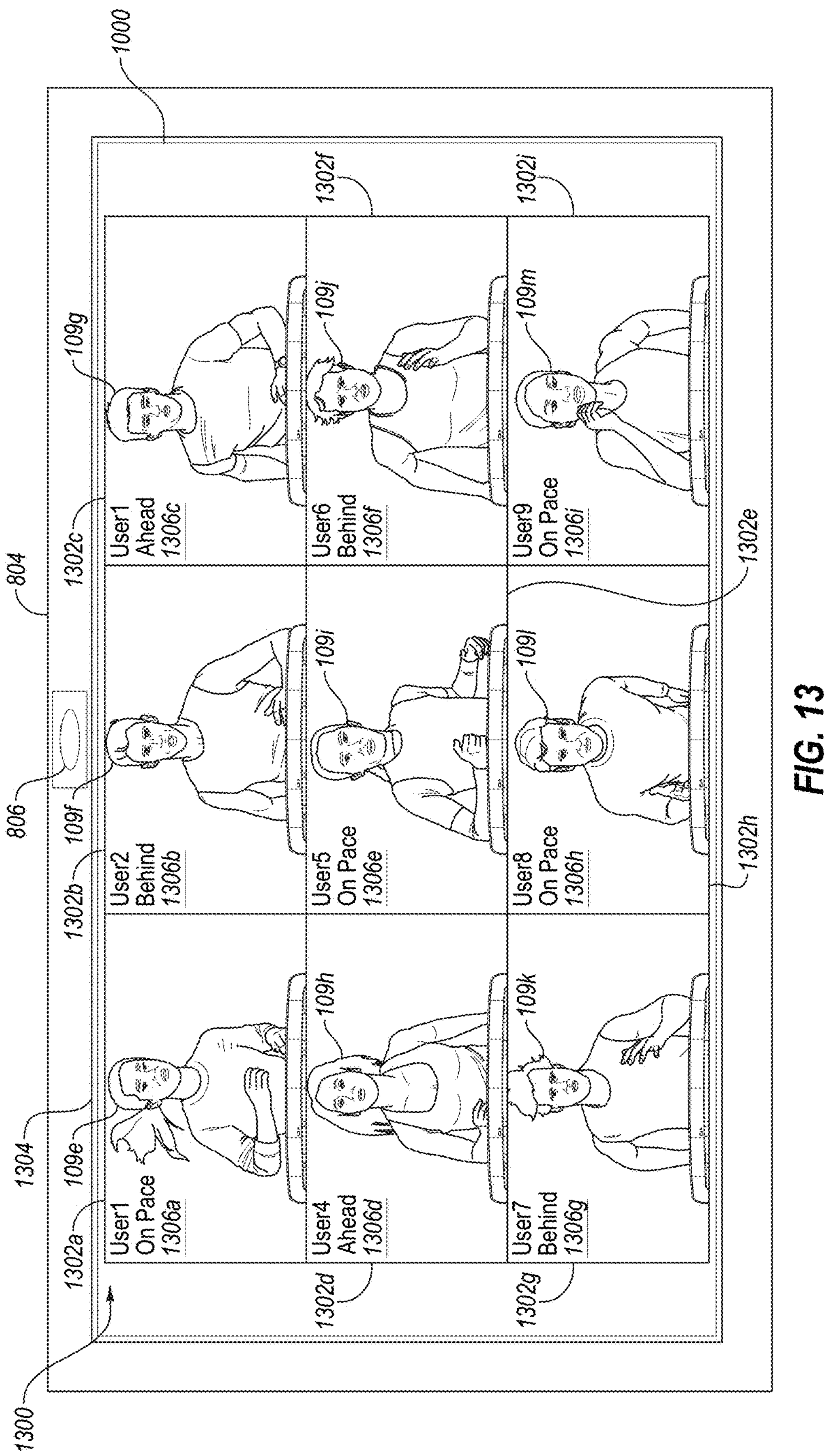
FIG. 13 illustrates an example grid of video feeds of users performing a workout of a video workout program as a competition.

FIG. 13 illustrates an example grid 1300 of video feeds 1302*a*-1302*i* of users 109*e*-109*m* performing a workout of a video workout program as a competition. The grid 1300 may be displayed on the display 804 or other displays described herein. The users 109*e*-109*m* may use the same exercise machine or different exercise machines to perform the same workout using the same video workout program, either simultaneously (e.g., by performing a live video workout or by performing an archived video workout with the same actual start time) or at separate times (e.g., by performing an archived video workout with different start times, but that are time shifted to have the same virtual start times). The video feeds 1302*a*-1302*i* may be displayed on a display 1304, e.g., of a console, at an exercise machine in use by the user to perform the workout, and/or may be displayed on one or more displays of one or more other viewers.

Each of the video feeds 1302*a*-1302*i* may be generated as described herein. For example, a video camera at the exercise machine of each user 109*e*-109*m* may capture a corresponding first video of the user 109*e*-109*m* with a corresponding chroma key screen in the background. Portions of each first video that include the chroma key screen may then be keyed out and replaced by a second video or image to generate a corresponding combined video as the video feed 1302*a*-1302*i* where the second video or image appears as a virtual background of the corresponding user 109*e*-109*m* in the corresponding video feed 1302*a*-1302*i*.

In some embodiments, the virtual background of each of the users 109*e*-109*m* in the video feeds 1302*a*-1302*i* may include a performance indicator of the user 109*e*-109*m*. For example, the average speed or other performance parameter of each user 109*e*-109*m* may be monitored and the virtual background may include a performance indicator indicative of the average speed or other performance parameter. In the illustrated example, the users 109*e*-109*m* are divided into three groups based on their average speed, the three groups including an "On Pace" group, an "Ahead" group, and a "Behind" group, where the group indicates the average speed of the user 109*e*-109*m*. The "On Pace" group may include users 109*e*, 109*i*, 109*l*, 109*m* with an average speed that is the same as (or within a predetermined range of) a target average speed. The "Ahead" group may include users 109*g*, 109*h* with an average speed that is greater than the target average speed (or the predetermined range that includes the target average speed). The "Behind" group may include users 109*f*, 109*j*, 109*k* with an average speed that is less than the target average speed (or the predetermined range that includes the target average speed). The average speed of each of the users 109*e*-109*m* is indicated in FIG. 13 by a label 1306*a*-1306*i* included in the virtual background of each user 109*e*-109*m* that may include the name of the user 109*e*-109*m* and the group to which the user 109*e*-109*m* currently belongs. In some embodiments, the label 1306*a*-1306*i* may include additional or different information, such as the user's average speed or other performance indicator instead of or in addition to the group and/or the name. Alternatively or additionally, the virtual backgrounds of the users 109*e*-109*m* may user different colors as performance indicators of the users 109*e*-109*m*, such as a yellow virtual background for the users 109*e*, 109*i*, 109*l*, 109*m* in the "On Pace" group, a green virtual background for the users 109*g*, 109*h* in the "Ahead" group, and a red virtual background for the users 109*f*, 109*j*, 109*k* in the "Behind" group. Alternatively or additionally, the video feeds 1302*a*-1302*i* may be organized, ranked, or ordered within the grid 1300 on the display 1304, similar or the same as a leaderboard, as the performance indicators of the users 109*e*-109*m*.

Figure 14A:
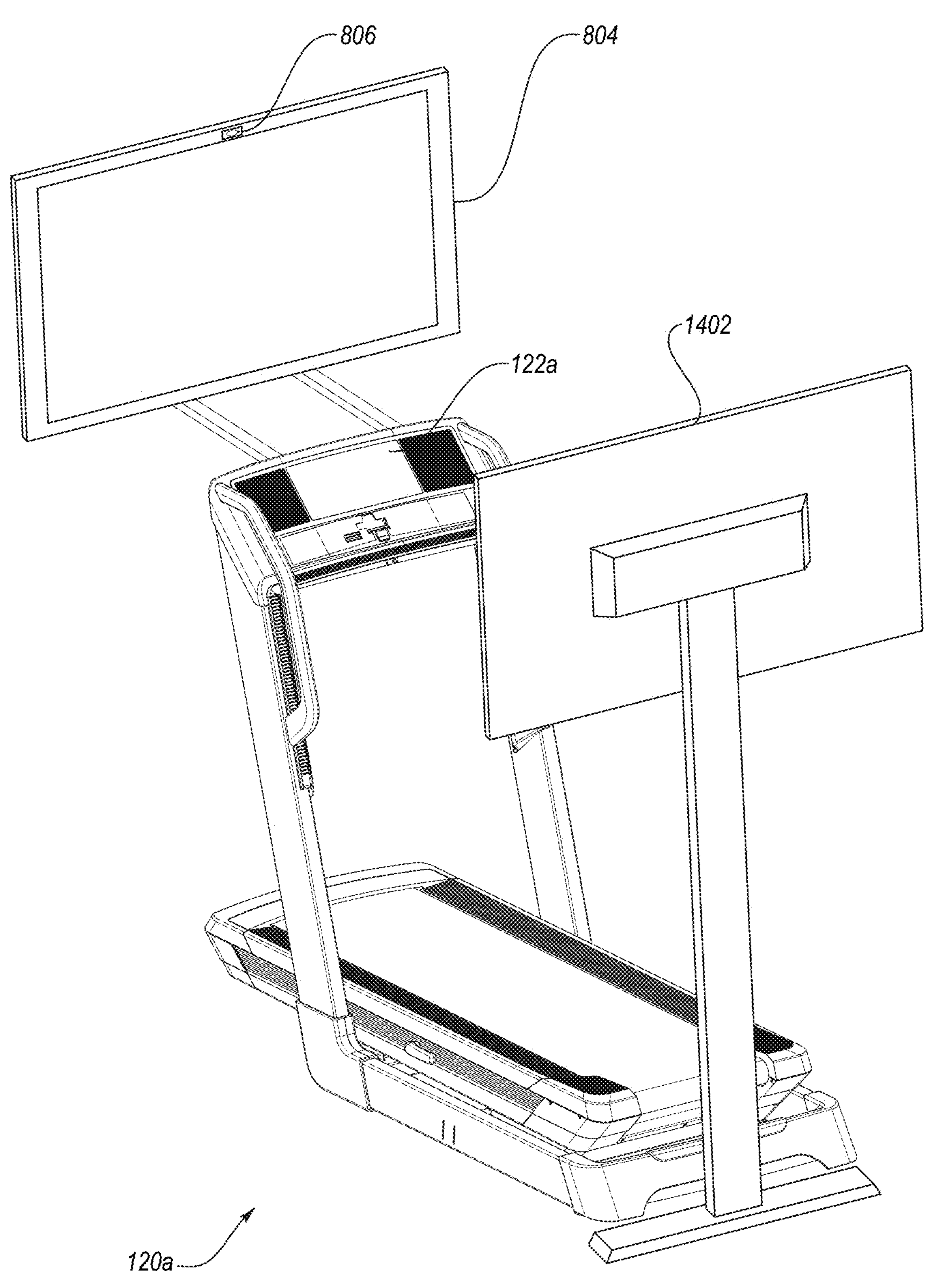
FIG. 14A illustrates an exercise machine of FIG. 1 with a display positioned behind the exercise machine.

FIG. 14A illustrates the exercise machine 120*a* of FIG. 1 with a display 1402 positioned behind the exercise machine 120*a*. The display 1402 may be attached to a frame, a wall, ceiling, or other structure so as to be positioned generally behind the exercise machine 120*a* or in another position relative to the exercise machine 120*a*. The display 1402 may include a television, an LED panel, a projection screen combined with a projector (not shown), or other device or system to display video or images to a user of the exercise machine 120*a*.

As previously indicated, the exercise machine 120*a* may include the console 122*a* with a display. Alternatively or additionally, the exercise machine 120*a* and other exercise machines herein may include or be coupled to the external display 804 and/or the video camera 806. The video camera 806 may be integrated with the display 804 as illustrated or may be separate therefrom. Video of a video workout program may be displayed on the display of the console 122*a* and/or the display 804.

The video camera 806 may capture a first image or video of the user, e.g., while the user works out using the exercise machine 120*a* and/or while the user is otherwise in a field of view of the video camera 806. With the display 1402 as an actual background of the user, a depiction of the user from the first image or video may be combined with a second image or video to form a combined image or video with a virtual background. In particular, the second image or video may be displayed on the display 1402 in the field of view of the video camera 806. The video camera 806 may capture as the combined image or video the user performing the workout or otherwise in the field of view of the video camera 806 with the second video displayed on the display 1402 behind the user. Combined images or video of the user performing the workout that are generated in this manner, e.g., using a video camera in front of the user and a display panel behind the user, may have the same or similar uses or applications as those that are generated using a video camera in front of the user and a chroma key screen behind the user. For example, such a combined image or video may be used in live video chat, as a still photo for use on a leaderboard or user profile, or for other uses or applications.

Alternatively or additionally, second video or other video may be displayed on the display 1402 while the user is performing the workout on the exercise machine 120*a* to enhance an experience of the user while performing the workout. For example, the display of the console 122*a* and/or the display 804 that is/are positioned in front of the user may provide the user with a front viewpoint of a video of a video workout program where the video moves through an environment. A rear viewpoint of the video (e.g., moving backward through the environment) may be displayed on the display 1402 behind the user. Simultaneously displaying different viewpoints of the environment of the video to the user from different displays (e.g., the display 804 and the display 1402) may enhance a feeling of immersion that the user experiences while performing the workout.

Figure 14B:
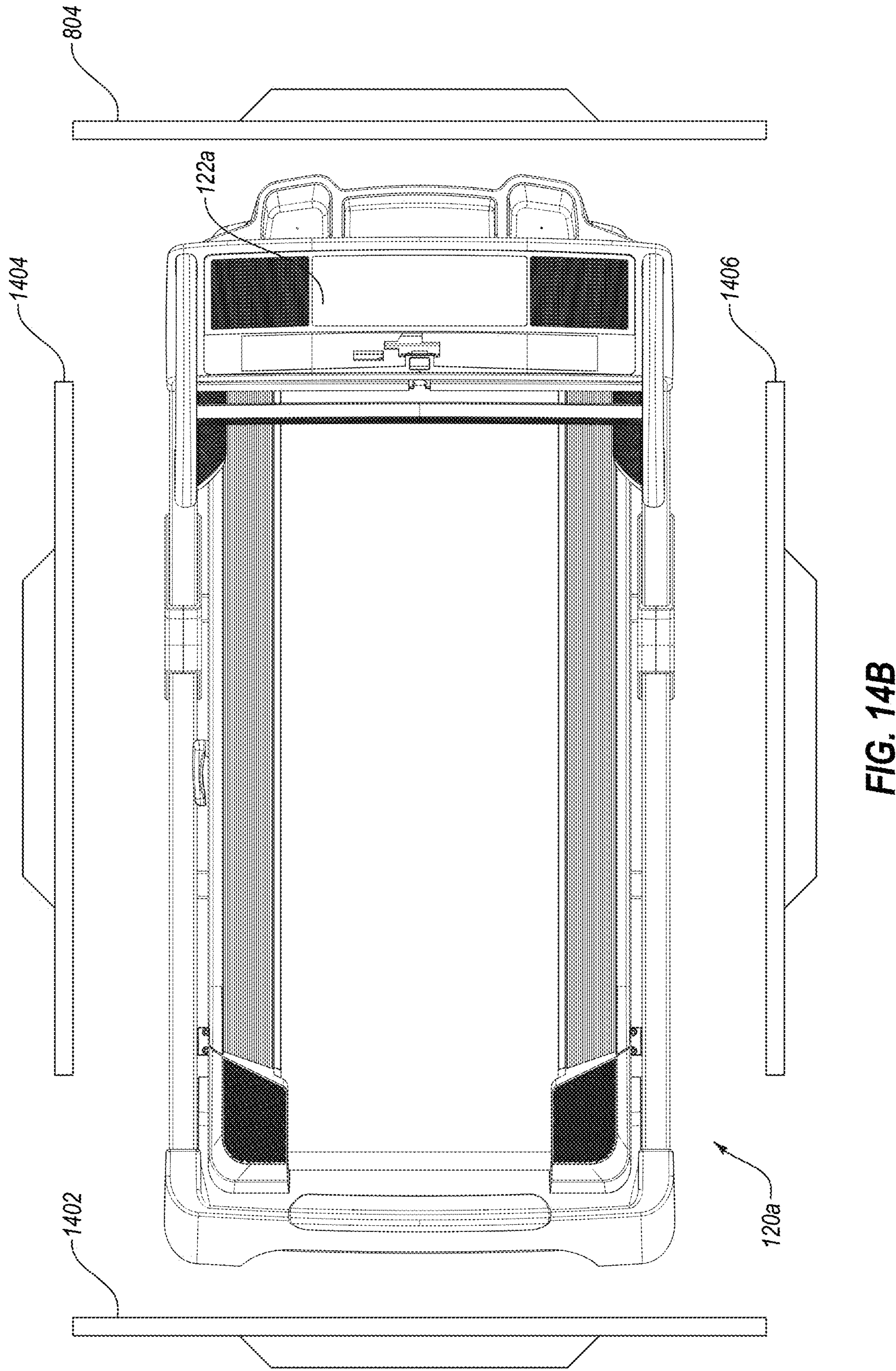
FIG. 14B illustrates an exercise machine of FIG. 1 with a display positioned behind the exercise machine and displays positioned to sides of the exercise machine.

FIG. 14B illustrates the exercise machine 120*a* of FIG. 1 with the display 1402 positioned behind the exercise machine 120*a* and displays 1404, 1406 positioned to sides of the exercise machine 120*a*. The displays 1404, 1406 may be attached to a frame, a wall, ceiling, or other structure so as to be positioned generally to the left and right, respectively, of the exercise machine 120*a*. Each of the displays 1404, 1406 may include a television, an LED panel, a projection screen combined with a projector (not shown), or other panel to display video or images to the user of the exercise machine 120*a*.

As previously indicated, the exercise machine 120*a* may include the console 122*a* with a display. Alternatively or additionally, the exercise machine 120*a* and other exercise machines herein may include or be coupled to the external display 804 and/or the video camera 806. The video camera 806 may be integrated with the display 804 as illustrated or may be separate therefrom. Video of a video workout program may be displayed on the display of the console 122*a* and/or the display 804.

The configuration, uses, and/or applications of FIG. 14B may be the same as, similar to, or different than those of FIG. 14A. The inclusion of the displays 1404, 1406 to the left and right sides of the exercise machine 120*a* may increase the feeling of immersion the user experiences when performing a workout of a video workout program on the exercise machine 120*a* of FIG. 14B. For example, a front viewpoint of a video of the video workout program may be displayed on the display 804, a rear viewpoint of the video may be displayed on the display 1402, a left viewpoint of the video may be displayed on the display 1404, and a right viewpoint of the video may be displayed on the display 1406. Simultaneous display of four different viewpoints of the environment on four different displays that substantially surround the user may further enhance the feeling of immersion that the user experiences while performing the workout.

Figure 15:
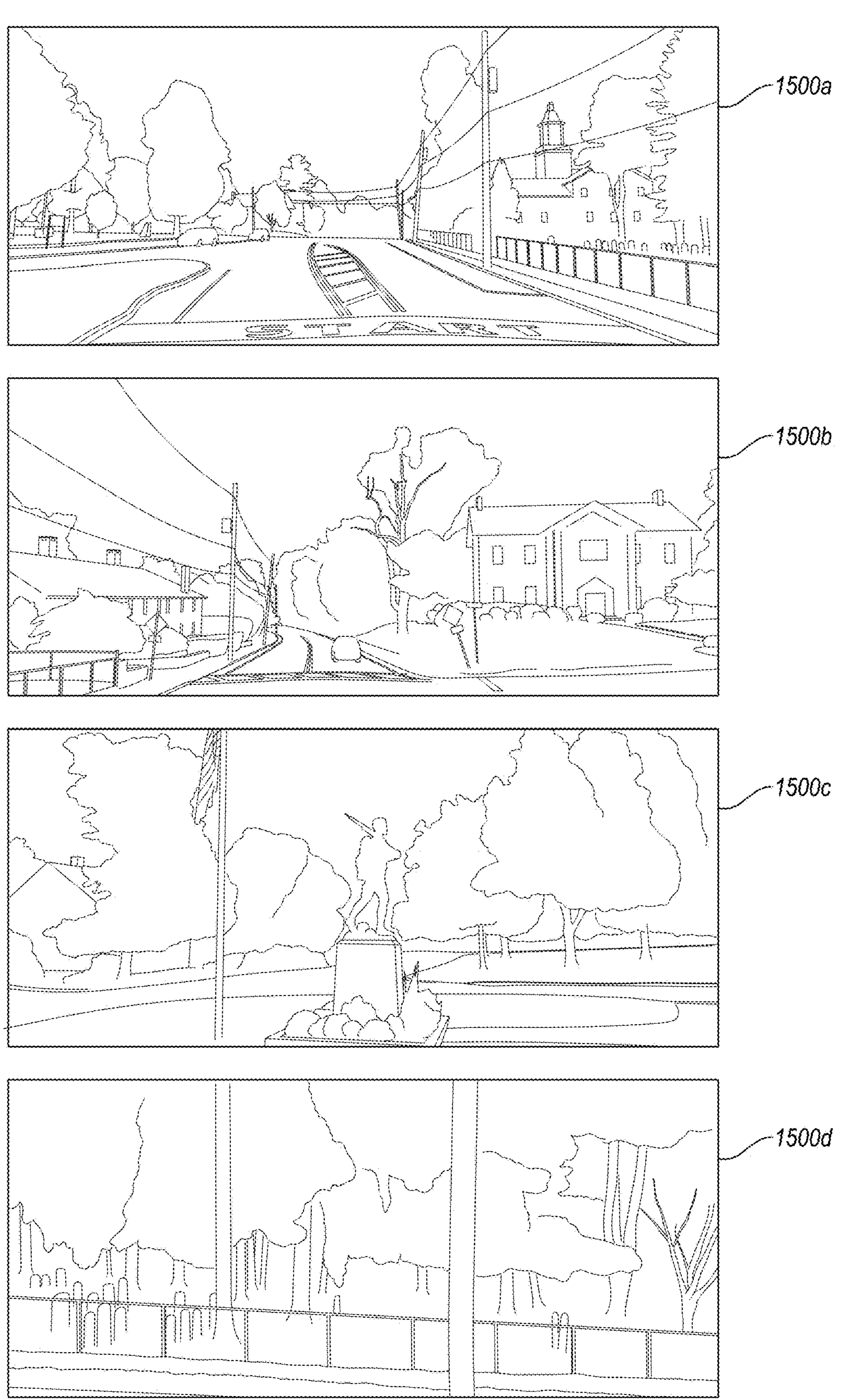
FIG. 15 illustrates four different viewpoint of a video that moves through an environment.

FIG. 15 illustrates four different viewpoints 1500*a*-1500*d* of a video that moves through an environment. The viewpoints 1500*a*-1500*d* of the video may be captured or rendered as described herein. In the illustrated embodiment, the viewpoints 1500*a*-1500*d* are from the start line of the Boston Marathon. In some embodiments, the viewpoints 1500*a*-1500*d* may be captured by a 360-degree camera moving through the environment, such as the video camera 106*h* of FIG. 5C. In some embodiments, the viewpoints 1500*a*-1500*d* may be captured by multiple cameras moving through an environment together while pointed in different directions, such as the video cameras 106*e*-106*g* (together with another video camera on a right arm of the videographer 110) of FIG. 5B. In FIG. 15, the viewpoint 1500*a* may be a front viewpoint, the viewpoint 1500*b* may be a rear viewpoint, the viewpoint 1500*c* may be a left viewpoint, and the viewpoint 1500*d* may be a right viewpoint. As such, and with combined reference to FIGS. 14B and 15, the front viewpoint 1500*a* may be displayed on the display 804 in front of the exercise machine 120*a*, the rear viewpoint 1500*b* may be displayed on the display 1402 behind the exercise machine 120*a*, the left viewpoint 1500*c* may be displayed on the display 1404 to the left of the exercise machine 120*a*, and the right viewpoint 1500*d* may be displayed on the display 1406 to the right of the exercise machine 120*a*.

Figure 16:
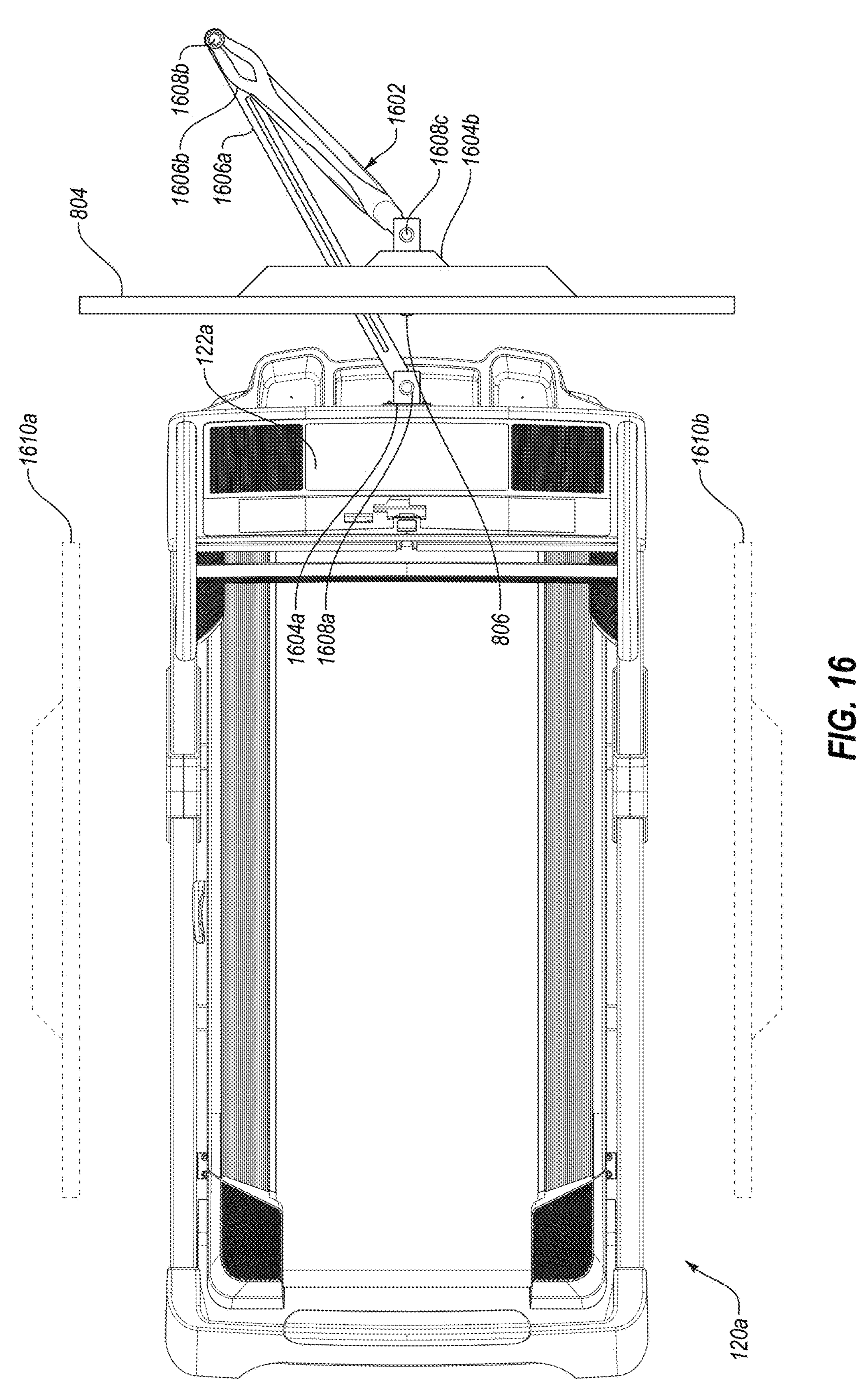
FIG. 16 illustrates an exercise machine of FIG. 1 with a display and video camera movable relative to the exercise machine.

FIG. 16 illustrates the exercise machine 120*a* of FIG. 1 with the display 804 and video camera 806 movable relative to the exercise machine 120*a*. For example, the display 804 and video camera 806 may be movably coupled to an articulating monitor arm 1602 (hereinafter "monitor arm 1602") which is coupled to a frame of the exercise machine 120*a*. Ends 1604*a*, 1604*b* of the monitor arm 1602 may be respectively attached to the frame of the exercise machine 120*a* and the display 804. The monitor arm 1602 may additionally include one or more rigid members 1606*a*, 1606*b* and joints 1608*a*, 1608*b*, 1608*c* that collectively permit the display 804 and video camera 806 to be moved relative to the exercise machine 120*a*. For example, the monitor arm 1602 may permit the display 804 and video camera 806 to be moved between positions 1610*a*, 1610*b* to the sides of the exercise machine 120*a* and the front of the exercise machine 120*a*.

The configuration of FIG. 16 may permit a user to monitor their form when performing a workout. For example, the user may position the video camera 806 to capture video or images of the user performing a workout on the exercise machine 120*a* from one or more different viewpoints, e.g., from the front of the exercise machine 120*a* as illustrated, from the position 1610*a* to the left of the exercise machine 120*a*, and/or from the position 1610*b* to the right of the exercise machine 120*a*. The video or images of the user may be displayed to the user or other viewer on the display 804, the display of the console 122*a*, and/or other display for the user to monitor the user's workout form. If the user notices any issues with their form, the user may adjust their form and/or see a specialist for assistance adjusting their form.

Figure 17:
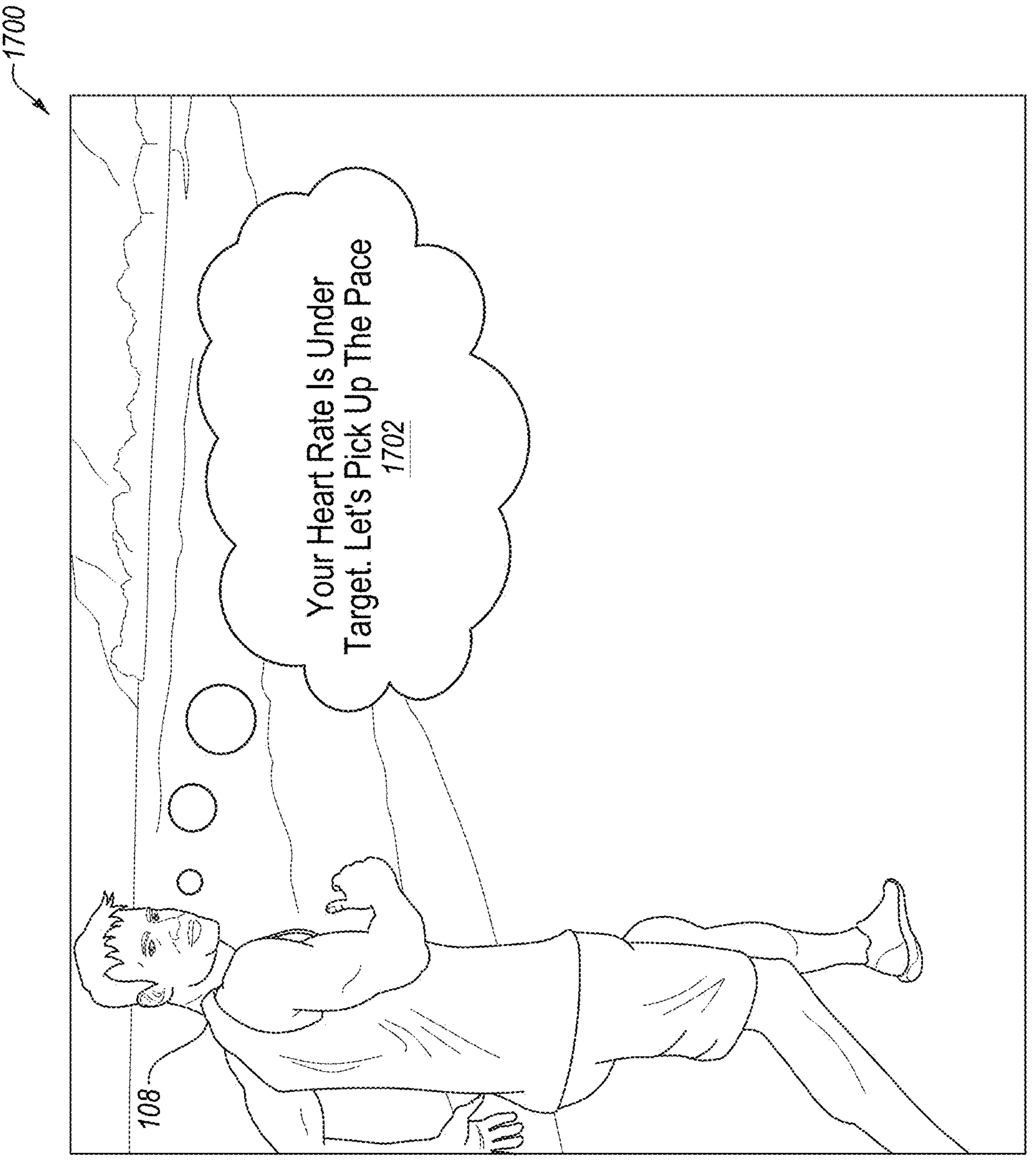
FIG. 17 illustrates a frame of a video of a personalized video workout program.

FIG. 17 illustrates a frame 1700 of a video of a personalized video workout program. The personalized video workout program may include video that moves through an environment, exercise machine control commands, and/or environmental control commands, similar to other video workout programs herein. In addition, the video of the personalized video workout program may include or be combined with a deepfake depiction of the trainer 108 with a personalized or custom in-workout message for a user of an exercise machine. The video may be generated as described herein or in any other suitable manner. A deepfake as used herein may refer to synthetic media such as an image, video, or audio generated by AI and that appears to be of a specific individual, such as the trainer 108. A deepfake may depict the specific individual doing and/or saying something that the specific individual did not actually do or say. Some deepfakes of specific individuals are at least superficially indistinguishable from real images, video, or audio of the specific individuals.

In some embodiments, the deepfake gives the user of the exercise machine a custom in-workout message such as encouragement, instructions, or other custom in-workout message. For example, the deepfake may call the user by name and/or provide an encouraging message, such as "Great job Sara!" or "Only 15 seconds left in this interval Sara, don't bail out early", assuming the user is named Sara. As another example, the deepfake may instruct the user to increase or decrease their effort, or conversely a difficulty level of the workout, or may inform the user that the difficulty level will be automatically adjusted, responsive to one or more performance parameters (e.g., heart rate or other performance parameter) of the user.

As a specific example, suppose the user is performing a heart rate training workout in which the user's heart rate is to be kept within one or more set ranges for one or more corresponding predetermined durations of time and the user's heart rate is monitored or tracked during the workout. In this example, and as illustrated in FIG. 17, if the user's heart rate is under target (e.g., below the set range), the deepfake depiction of the trainer 108 may tell the user "Your heart rate is under target. Let's pick up the pace." On the other hand, if the user's heart rate is over target, the deepfake depiction of the trainer may tell the user "Your heart rate is over target. Let's slow down." The example custom in-workout message of FIG. 17 is shown in a speech bubble 1702 for illustrative purposes. It is understood with the benefit of the present disclosure, however, that the custom in-workout message may be provided to the user as deepfake video and/or audio of the trainer 108 speaking the custom in-workout message to the user.

Where the custom in-workout message instructs the user to increase or decrease their effort, the user may manually adjust one or more movable members of the exercise machine to effect the change. Where the custom in-workout message informs the user that the difficulty level will be automatically adjusted, one or more custom exercise machine control commands may be encoded into the video in real time or substantially in real time, together with the deepfake depiction of the trainer 108, to automatically adjust one or more movable members of the exercise machine to effect the change. Alternatively or additionally, the difficulty level of the workout may be dynamically scaled or adjusted automatically based on the user's heart rate as described in U.S. patent application Ser. No. 16/742,762, filed Jan. 14, 2020, which is incorporated herein by reference in its entirety for all that it discloses.

Figure 18:
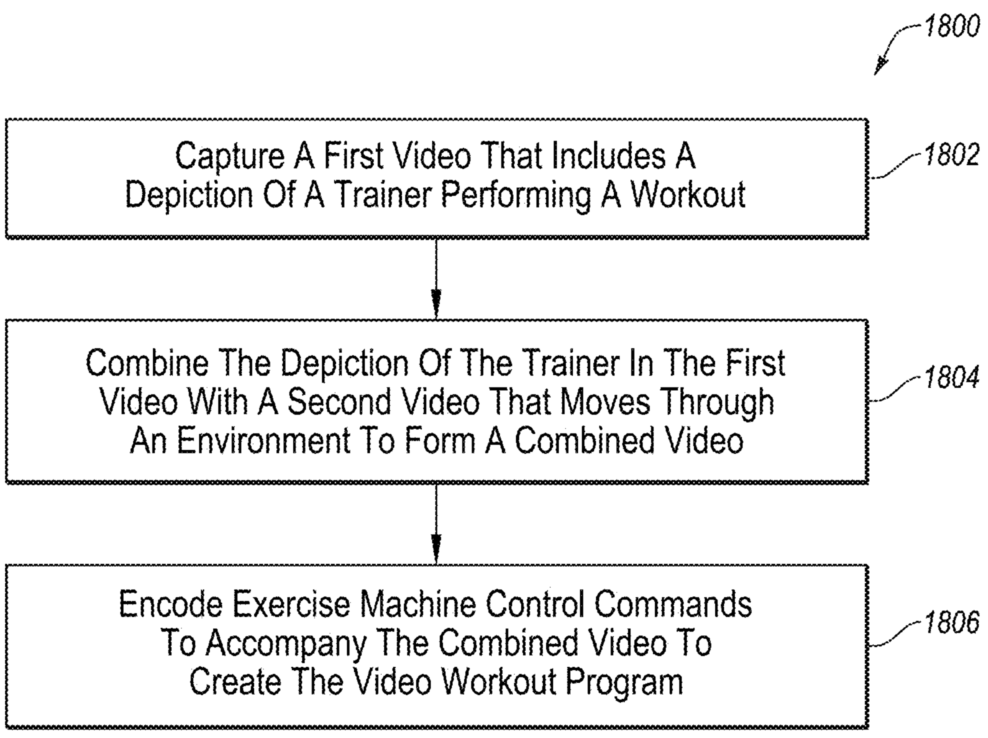
FIG. 18 illustrates a flowchart of an example method to generate a video workout program.

FIG. 18 illustrates a flowchart of an example method 1800 to generate a video workout program. The method 1800 may be performed, in some embodiments, by one or more applications, devices, or systems, such as by the video cameras 106*a*-106*h*, the computer 114, the remote server 112, the game engine 115, the local server 116, the exercise machines 120*a*-120*d*, the consoles 122*a*-122*d*, and/or the tablet 124, or some combination thereof, and/or other applications, devices, or systems herein. In these and other embodiments, the method 1800 may be performed by one or more processors based on one or more computer-readable instructions stored on one or more non-transitory computer-readable media. The method 1800 will now be described in connection with FIGS. 1, 2, 3A-3B, 4, 5A-5C, 6A-6C, 14A-14B, and 15.

The method 1800 may include, at action 1802, capturing a first video that includes a depiction of a trainer performing a workout. For example, the video camera 106*a* may capture the first video that includes the depiction of the trainer 108 performing the workout.

The method 1800 may include, at action 1804, combining the depiction of the trainer in the first video with a second video that moves through an environment to form a combined video. In the combined video, the trainer may appear to move through the environment. The trainer may appear to move through the environment despite the trainer not actually being in the environment. In some embodiments, the video camera 106*a* and/or the remote server 112 may combine the depiction of the trainer 108 in the first video with the second video. The second video may be rendered by the game engine 115 and/or captured by one or more of the video cameras 106*b*-106*h*.

The method 1800 may include, at action 1806, encoding exercise machine control commands to accompany the combined video to create the video workout program. For example, the computer 114 may encode the exercise machine control commands into the subtitle stream of the combined video to create the video workout program. As another example, the exercise machine control commands may be encoded separately from the combined video, such as in separate data packets, and may be provided together with the combined video in the video workout program. The video workout program may be configured such that execution of the video workout program on a first exercise machine, e.g., of a user, displays the combined video and continually controls one or more moveable members of the first exercise machine according to the exercise machine control commands. In some embodiments, the first exercise machine includes one or more of the exercise machines 122*a*-122*d* used by a corresponding user, such as the user 109.

In some embodiments, the trainer may perform the workout using a second exercise machine, e.g., on a stage or set. For example, the trainer 108 may perform the workout using the exercise machine 113, 113*a*, 113*b* on the stages or sets 300*a*, 300*b*.

In some embodiments, the method 1800 may further include monitoring operating parameters of the second exercise machine during performance of the workout by the trainer and generating the exercise machine control commands to correspond to the depiction of the workout by the trainer. Generating the exercise machine control commands to correspond to the depiction of the workout by the trainer may include generating the exercise machine control commands to cause the first exercise machine to implement at least some of the operating parameters of the second exercise machine during execution of the video workout program on the first exercise machine. The operating parameters of the second exercise machine may be monitored by recording the operating parameters throughout a duration of the workout by the trainer 108. As another example, the operating parameters may be monitored by the trainer 108 or other individual at the stages or sets 300*a*, 300*b* and may be adjusted by the trainer and/or the other individual responsive to instructions from the producer.

In some embodiments, the second video includes rendered video, such as may be generated by the game engine 115, that moves through a virtual environment. The method 1800 may further include monitoring a speed of the second exercise machine during performance of the workout by the trainer. The method 1800 may further include synchronizing a speed at which the rendered video moves through the virtual environment with the speed of the second exercise machine of the trainer. The method 1800 may further include monitoring a camera angle of a camera that captures the first video, e.g., the video camera 106*a* during capture of the first video. The method 1800 may further include synchronizing a view angle of the virtual environment with the camera angle.

In some embodiments, synchronizing the speed at which the rendered video moves through the virtual environment with the speed of the second exercise machine may generally include causing the speed at which the rendered video moves through the virtual environment at any given time to match the speed of the second exercise machine. For example, synchronizing the speed may include aligning a start time of the rendered video to a start time of the first video. Synchronizing the speed may further include setting a first speed at which the rendered video moves through the virtual environment at a first time that is after the start time to match a first speed of the second exercise machine at the first time. Synchronizing the speed may further include setting a second speed at which the rendered video moves through the virtual environment at a second time that is after the first time to match a second speed of the second exercise machine at the second time. The second speed at which the rendered video moves through the virtual environment may be different than the first speed.

In some embodiments, capturing the first video that includes the depiction of the trainer performing the workout at action 1802 may include capturing the first video of the trainer performing the workout on the second exercise machine, such as the exercise machine 113, 113*a*, 113*b*, in front of a chroma key screen of a stage or set, such as the backdrop 107 of FIG. 1 and/or the chroma key screens 304*a*, 304*b*, 304*c* of the stage or set 300*a* of FIG. 3A. The stage or set may include a practical floor on which the exercise machine is positioned. The practical floor may include one or more props or physical objects that blend in with the environment of the combined video, such as the props 314. The second exercise machine may include a practical exercise machine with an appearance configured to at least one of obscure its nature as an exercise machine or blend in with the environment of the combined video, such as the exercise machine 113 of FIG. 4. For example, the second exercise machine may include a treadmill such as the treadmill of FIG. 4 with a running platform configured to mimic at least one of an appearance or give of a ground of the environment of the combined video.

In some embodiments, the method 1800 may further include displaying the second video in view of a camera that captures the first video of the trainer performing the workout and in view of the trainer. For example, the second video may be displayed on one or more of the LED panels 312*a*, 312*b*, 312*c* of FIG. 3B in view of the video camera 106*a*. In some embodiments, combining the depiction of the trainer in the first video with the second video at action 1804 may include capturing the first video of both the trainer performing the workout and the second video displayed in the view of the camera. The trainer may provide commentary with respect to one or more objects depicted in the second video, such as might be done by a tour guide, when the first video is captured. Alternatively or additionally, input from a producer or other individual may be received, e.g., at the game engine 115 and/or via the computer 114 or remote server 116, that may be effective to control weather or natural phenomena depicted in the second video or to add, delete, move, or resize an object in the environment.

In some embodiments, combining the depiction of the trainer in the first video with the second video at action 1804 may include combining the depiction of the trainer in the first video with the second video in real-time as the trainer performs the workout. The method 1800 may further include streaming the combined video live to the first exercise machine in use by the user. The method 1800 may further include reaching a branch point (such as the branch point 606) in a path traveled in the second video (such as the path 604), the path splitting into multiple branches (such as the branches 604*a*, 604*b*) at the branch point. The method 1800 may further include receiving feedback from a first user (such as the user 109) of the first exercise machine including a selection by the first user of one of the multiple branches of the path to travel down from the branch point. For example, the user may provide their feedback via a user interface, such as the user interface 608, 610 of FIGS. 6B and 6C. The method 1800 may further include causing the second video in real-time to travel down the selected branch from the branch point such that the trainer appears to travel down the selected path from the branch point.

In some embodiments, the method 1800 may further include capturing the second video by a camera moving through a real-world environment, such as the video cameras 106*b*-106*h*. The environment of the second video may include a depiction of the real-world environment captured by the camera.

In some embodiments, the method 1800 may further include reaching a branch point (such as the branch point 606) in a path traveled in the second video (such as the path 604), the path splitting into a first branch and a second branch at the branch point (such as the branches 604*a*, 604*b*). In this and other embodiments, combining the depiction of the trainer in the first video with the second video at block 1804 may include combining the depiction of the trainer in the first video with the second video as the second video travels along the first branch to form a first selectable portion of the combined video and combining the depiction of the trainer in the first video with the second video as the second video travels along the second branch to form a second selectable portion of the combined video. The method 1800 may further include executing, at the first exercise machine, the video workout program to enable a first user to perform a workout on the first exercise machine, including playing the combined video to the user. The method 1800 may further include receiving a selection by the user of the first selectable portion or the second selectable portion of the combined video. For example, the user may provide their selection via a user interface, such as the user interface 608, 610 of FIGS. 6B and 6C. The method 1800 may further include, after play of the combined video reaches the branch point, playing the selected one of the first selectable portion or the second selectable portion.

In some embodiments, the method 1800 may further include executing, at the first exercise machine, the video workout program to enable a first user to perform a workout on the first exercise machine, including playing the combined video to the user. The method 1800 may further include reaching a branch point (such as the branch point 606) in a path (such as the path 604) traveled in the environment of the combined video during playback of the combined video, the path splitting into a first branch (such as the branch 604*a*) and a second branch (such as the branch 604*b*) at the branch point. The method 1800 may further include receiving a selection by the user of the first branch or the second branch of the combined video. For example, the user may provide their selection via a user interface, such as the user interface 608, 610 of FIGS. 6B and 6C. After play of the combined video reaches the branch point, play of the combined video may follow the selected one of the first branch or the second branch.

In some embodiments, the combined video displayed at the first exercise machine may move through the environment via a route selected by the user. For example, a map such as that shown in the user interface 610 may be displayed to the user and the user may select the route from among multiple routes shown in the map at the beginning of the workout or at any other time of the workout. The map may be of a real or virtual area that includes the environment of the combined video. The user may select through the route via the map. For example, the user may use a touchscreen or other input device to select the route in the map.

In some embodiments, the method 1800 may further include encoding environment control commands to accompany the combined video. For example, the computer 114 may encode the exercise machine control commands into the subtitle stream of the combined video. As another example, the environmental control commands may be encoded separately from the combined video, such as in separate data packets, and may be provided together with the combined video in the video workout program. The environmental control commands may be configured to control one or more environment control devices in a vicinity of the first exercise machine. The environmental control devices may be communicatively coupled to, e.g., the exercise machine 120*a*-120*d* in use by the user and/or to the network 118 to receive the environmental control commands. The environmental control devices may include at least one of: a heat lamp, a fan, an oil diffuser, a scent dispenser, a light, a humidifier, or a mist dispenser.

In some embodiments, the combined video of the video workout program may include multiple viewpoints such as may be generated from second video captured by the videographer 110 while performing a workout using video cameras 106*c*, 106*d* in FIG. 5A, video cameras 106*e*-106*g* in FIG. 5B, and/or video camera 106*h* in FIG. 5C. Alternatively or additionally, the combined video may include a 360-degree video. The method 1800 may further include changing from one viewpoint of the combined video to another responsive to input from the first user while the video workout program is executed at the first exercise machine. For example, the combined video may include two or more of the viewpoints 1500*a*-1500*d* of FIG. 15 and the user may toggle between any of the viewpoints 1500*a*-1500*d* on the display of the console 122*a*-122*d* or other display at the exercise machine 120*a*-120*d*. Alternatively or additionally, the method 1800 may further include displaying a first viewpoint of the combined video to the first user on a first display in front of the first user, such as the display of the console 122*a* or the display 804 of FIGS. 14A and 14B, and displaying a second viewpoint of the combined video to the first user on a second display to a side or rear of the first user, such as any of the displays 1402, 1404, 1406 of FIGS. 14A and 14B.

Figure 19:
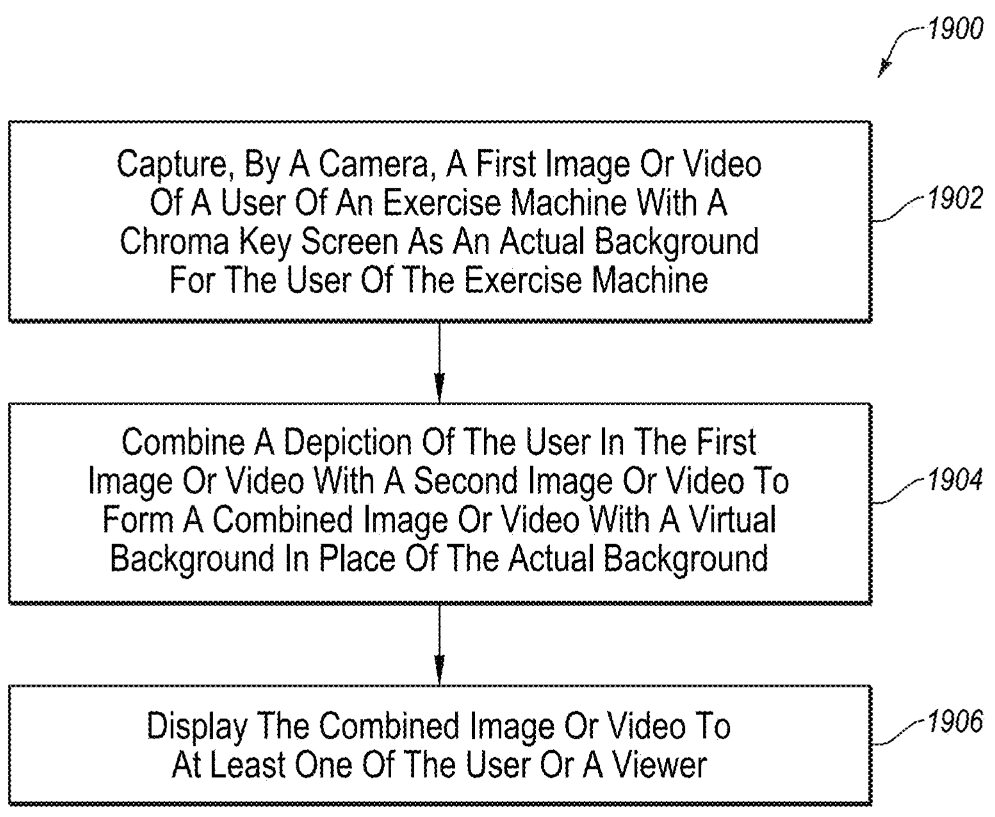
FIG. 19 illustrates a flowchart of an example method to alter a virtual background of a user on an exercise machine.

FIG. 19 illustrates a flowchart of an example method 1900 to alter a virtual background of a user on an exercise machine. The method 1900 may be performed, in some embodiments, by one or more applications, devices, or systems, such as by the video camera 806, the local server 116, the remote server 112, the exercise machines 120*a*-120*d*, the consoles 122*a*-122*d*, and/or the tablet 124, or some combination thereof, and/or other applications, devices, or systems herein. In these and other embodiments, the method 1900 may be performed by one or more processors based on one or more computer-readable instructions stored on one or more non-transitory computer-readable media. The method 1900 will now be described in connection with FIGS. 1, 2, 3A-3B, 8, 9, 10, 11A, 11B, 12, and 13.

The method 1900 may include, at action 1902, capturing, by a camera, a first image or video of a user of an exercise machine with a chroma key screen as an actual background for the user of the exercise machine. For example, the video camera 806 may capture a first image or video of the user 109 of the exercise machine 120*a* with the chroma key screen 802 as the actual background of the user 109. The chroma key screen may be provided to the user and/or shipped or packaged with the exercise machine for placement as the actual background of the exercise. In some embodiments, the chroma key screen includes a blue sheet (e.g., a blue fabric sheet), a green sheet (e.g., a green fabric sheet), or a sheet of other predetermined color that may be keyed out.

The method 1900 may include, at action 1904, combining a depiction of the user in the first image or video with a second image or video to form a combined image or video with a virtual background in place of the actual background. For example, the exercise machine 120*a*, the local server 116, the remote server 112, and/or other application, device, or system may combine the first image or video of the user 109 captured by the video camera 806 with the second image or video.

The method 1900 may include, at action 1906, displaying the combined image or video to at least one of the user or a viewer. For example, the combined image or video may be displayed to the user 109 on the display of the console 122*a*, the tablet 124, the display 804, or other display, or may be displayed to another user on a display at another exercise machine, or to another viewer on another display.

In some embodiments in which the combined image or video is the combined video, the method 1900 may further include establishing a video conference between the user of the exercise machine and another user of another exercise machine. In this and other embodiments, displaying the combined video to the at least one of the user or the viewer may include displaying the combined video to the user on the display of the console 122*a*, the tablet 124, the display 804, or other display and to the other user on a display available to the other user so that the user and the other user may have the video conference.

In some embodiments, the method 1900 may further include displaying a leaderboard with an entry for the user and another entry for another user. The leaderboard may rank performance indicators of the user and the other user with respect to performance of a workout by the user and the other user. Displaying the combined image or video to the at least one of the user or the viewer may include displaying the combined image or video within the entry of the user in the leaderboard.

In some embodiments, the method 1900 may further include executing, at the exercise machine, a video workout program to enable the user to perform a workout on the exercise machine, including displaying a workout video to the user that depicts an environment. The workout video may include a combined video such as may be generated as described with respect to, e.g., FIGS. 1, 3A, and 3B. The second image or video with which the depiction of the user in the first video is combined may depict the environment. The combined image or video may show the user in the environment. For example, FIGS. 11A and 11B depict combined images or video that depict users 109*c*, 109*d* in an environment of the second image or video with which the depiction of the corresponding user 109*c*, 109*d* in the corresponding first image or video is combined. A display on which the workout video is displayed may be positioned in front of the user, such as on the display 806 or the display of the console 122*a* in FIG. 8. The chroma key screen may be positioned behind the user, such as the chroma key screen 802 positioned behind the exercise machine 120*a*, and thus behind the user, in FIG. 8. The camera may be positioned in front of the user facing the user and the chroma key screen, such as the video camera 806 that faces the user (when using the exercise machine 120*a*) and the chroma key screen 802. The workout video may follow a route through the environment and the combined image or video may show the user passing following the same route through the environment. For example, the route in the workout video may pass one or more objects or landmarks that appear to get closer as a position of the workout video along the route approaches the one or more objects or landmarks and as the position of the workout video along the route passes and moves away from the one or more objects or landmarks, the combined image or video may show the user moving along the route and the one or more objects or landmarks receding behind the user.

In some embodiments, the method 1900 may further include receiving input from the user effective to interact with the environment and altering the environment in the workout video or the combined image or video responsive to the input. Altering the environment in the workout video or the combined image or video may include at least one of: displaying a virtual item within the environment to interfere with a depiction of another user or avatar of the other user in the workout video or the combined image or video or displaying a visual effect within the environment to indicate achievement by the user of a performance goal. An example of a visual effect that indicates achievement of a performance goal includes the virtual wings 1108 of FIG. 11B.

In some embodiments, the user performs the workout on the exercise machine and the combined image or video shows the user and one or more performance indicators in the virtual background. For example, FIG. 13 shows combined videos of various users 109*e*-109*m* as video feeds 1302*a*-1302*i* with labels 1306*a*-1306*i* on respective virtual backgrounds as performance indicators.

In some embodiments, the method 1900 may include receiving input from the user effective to select the virtual background. For example, the exercise machine 120*a*-120*d* in use by the user, the tablet 124, the local server 116, the remote server 112, and/or other application, device or system may include one or more images or videos that may be selected by the user to be the second image or video that appears as the virtual background in place of the actual background of the chroma key screen.

In some embodiments the user performs a workout on the exercise machine and other users perform the workout on other exercise machines. In this and other embodiments, displaying the combined image or video at action 1906 may include displaying the depiction of the user and the virtual background in a first block of a multi-user grid where the virtual background displayed in the first block includes a performance indicator of the user in performing the workout. The method 1900 may further include displaying the grid with the block for the user and a different block for each of the other users. Each block of the other users may include a combined image or video of a depiction of the corresponding user and a corresponding virtual background. Each corresponding virtual background may include a performance indicator of the corresponding user performing the workout. The grid may include, e.g., the grid 1300 of FIG. 13.

The second image or video that is combined with the depiction of the user or users may include a pre-recorded video of a real-world event, a rendered video of a virtual event, or other second image or video. For example, the second image or video may include the second video rendered by the game engine 115 or the second video captured by any of the video cameras 106*b*-106*h*.

In some embodiments, the second image or video may include one or more virtual beings and the combined image or video may show the one or more virtual beings chasing the user. For example, FIG. 11B shows the user 109*c* being chased by the virtual monster 1106.

Figure 20:
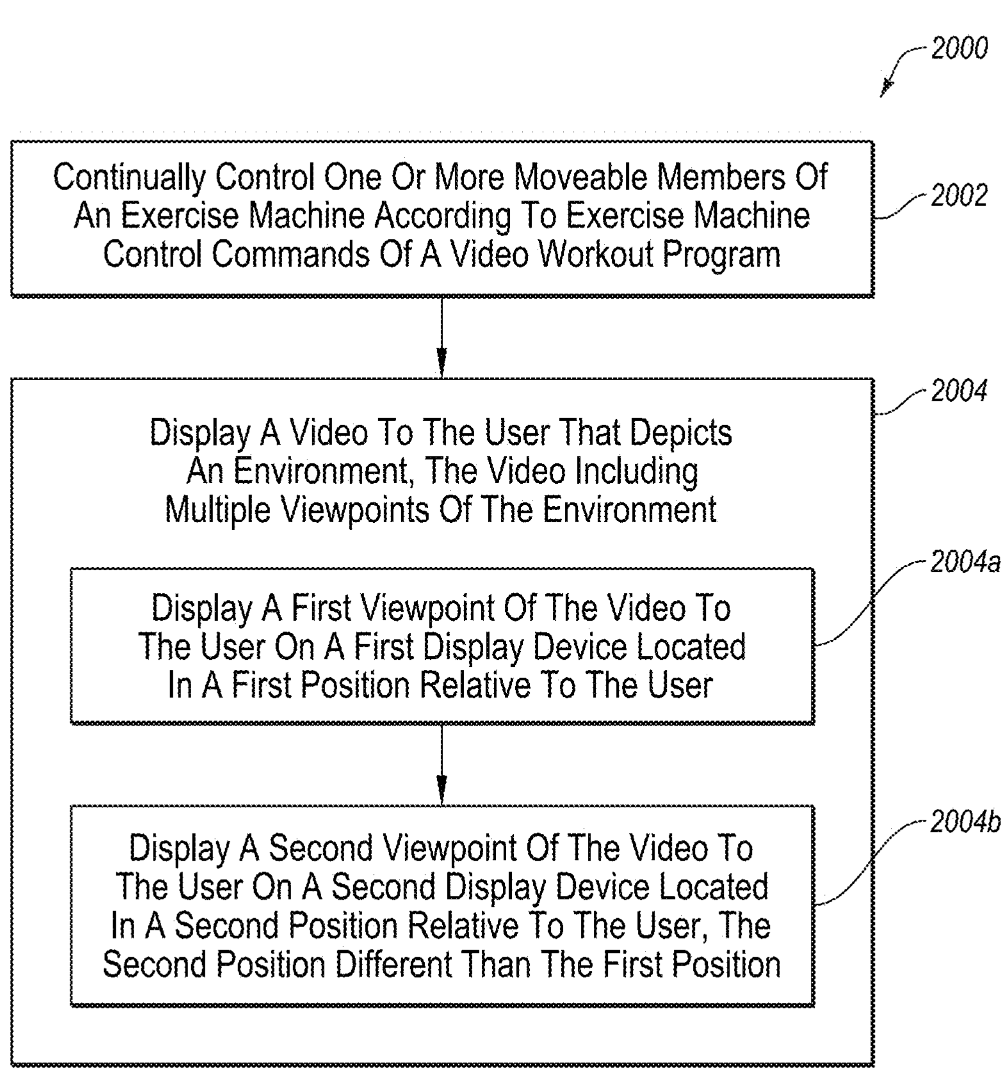
FIG. 20 illustrates a flowchart of an example method to execute a video workout program at an exercise machine to enable a user to perform a workout on the exercise machine.

FIG. 20 illustrates a flowchart of an example method 2000 to execute a video workout program at an exercise machine to enable a user to perform a workout on the exercise machine. The method 2000 may be performed, in some embodiments, by one or more applications, devices, or systems, such as by the exercise machines 120*a*-120*d*, the tablet 124, displays of the consoles 122*a*-122*d*, the displays 806, 1402, 1404, 1406, or some combination thereof, and/or other applications, devices, or systems herein. In these and other embodiments, the method 2000 may be performed by one or more processors based on one or more computer-readable instructions stored on one or more non-transitory computer-readable media. The method 2000 will now be described in connection with FIGS. 1, 2, 14A-14B, 15, and 16.

The method 2000 may include, at action 2002, continually controlling one or more moveable members of the exercise machine according to exercise machine control commands of the video workout program. The exercise machine control commands may be encoded in a closed caption stream of a video of the video workout program. In some embodiments, continually controlling the one or more moveable members at action 2002 may include continually controlling one or more of the running belt 126*a*, the running deck 126*b*, the flywheel 126*c*, the foot rails or pedals 126*d*, the handles 126*e*, the flywheel 126*f*, the pedals 126*g*, the frame 126*h*, or other moveable member(s) of the exercise machine 120*a*-120*d*.

The method 2000 may include, at action 2004, displaying a video to the user that depicts an environment, the video including multiple viewpoints of the environment. The action 2004 may include, at sub-action 2004*a*, displaying a first viewpoint of the video to the user on a first display device located in a first position relative to the user. The action 2004 may include, at sub-action 2004*b*, displaying a second viewpoint of the video to the user on a second display device located in a second position relative to the user, the second position different than the first position. As an example, displaying the first viewpoint at sub-action 2004*a* may include displaying one of the viewpoints 1500*a*-1500*d* on one of the display of the console 122*a* or the displays 804, 1402, 1404, 1406 and displaying the second viewpoint at sub-action 2004 may include displaying a different one of the viewpoints 1500*a*-1500*d* on a different one of the display of the console 122*a* or the displays 804, 1402, 1404, 1406.

In some embodiments, the first display may be located in front of the user on the exercise machine and the second display may be located behind the user. For example, the first display may include the display 804 located in front of the user on the exercise machine 120*a* and the second display may include the display 1402 located behind the user on the exercise machine 120*a*.

In some embodiments, at least one of the first display or the second display is movable relative to the exercise machine. For example, the first display or the second display may be moveably mounted to the exercise machine using a monitor arm or other structure, such as the monitor arm 1602 of FIG. 16.

In some embodiments, the method 2000 may further include capturing a depiction of the user performing the workout by a camera to monitor a form of the user in performing the workout. The camera may be integrated with the first display or the second display or may be a discrete device that is fixed or moveable relative to the exercise machine 120*a*. For example, the camera may include the video camera 806 integrated within the display 804.

In some embodiments, the video displayed to the user that depicts the environment is a first video. The method 2000 may further include capturing, by a camera, a second video of the user of the exercise machine with the second viewpoint of the first video on the second display device as a background of the user. The second video may be displayed to at least one of the user or another viewer. In an example, the second viewpoint of the first video may be displayed on the display 1402 behind the user on the exercise machine 120*a* while the user performs the workout and the video camera 806 may capture video of the user with the second viewpoint on the display 1402 as background of the video captured by the video camera 806.

In some embodiments, the second display is located behind the user and the second viewpoint of the video includes one or more virtual beings that appear to be chasing the user.

Figure 21:
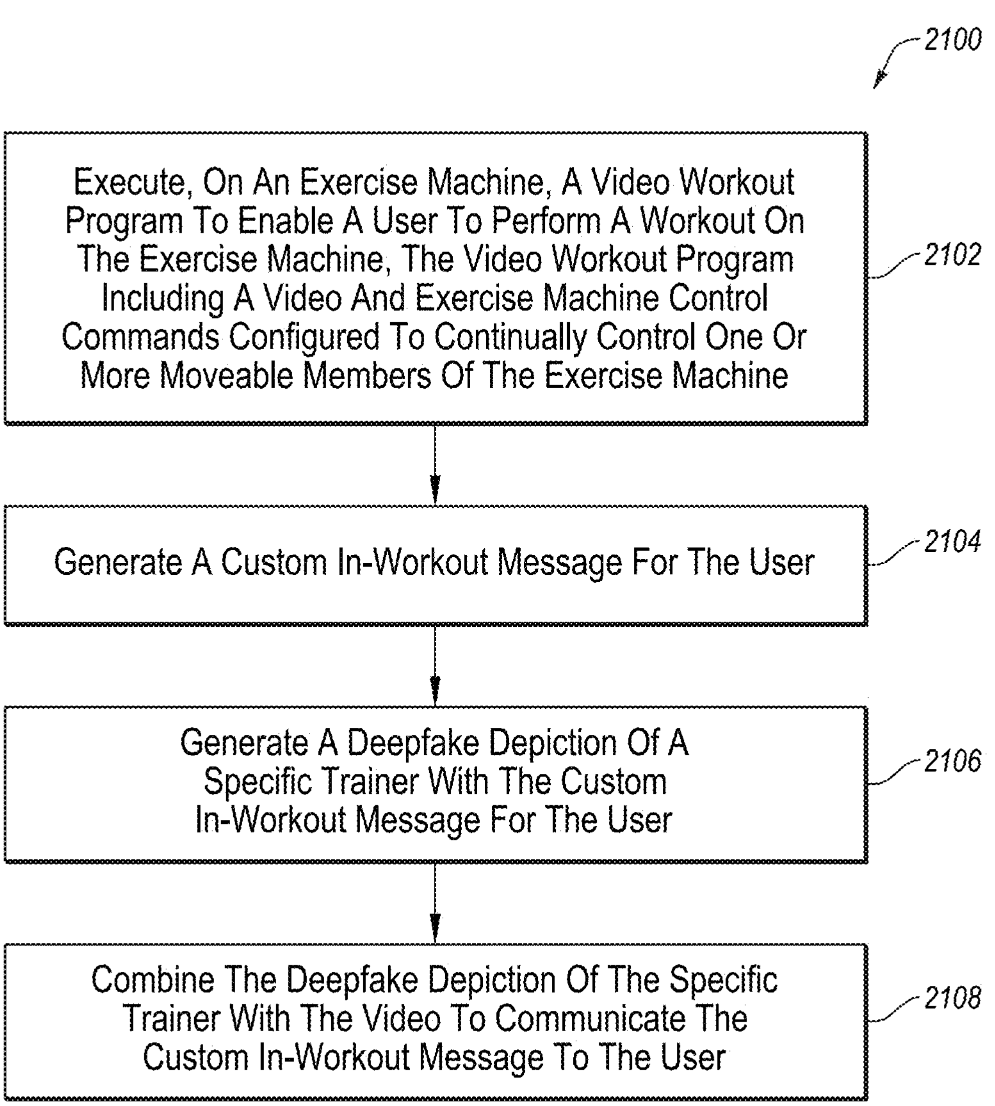
FIG. 21 illustrates a flowchart of an example method to personalize a video workout program.

FIG. 21 illustrates a flowchart of an example method 2100 to personalize a video workout program. The method 2100 may be performed, in some embodiments, by one or more applications, devices, or systems, such as by the exercise machines 120*a*-120*d*, the local server 116, the remote server 112, or some combination thereof, and/or other applications, devices, or systems herein. In these and other embodiments, the method 2100 may be performed by one or more processors based on one or more computer-readable instructions stored on one or more non-transitory computer-readable media. The method 2100 will now be described in connection with FIGS. 1, 2, and 16.

The method 2100 may include, at action 2102, executing, on an exercise machine, the video workout program to enable a user to perform a workout on the exercise machine. The video workout program may include a video and exercise machine control commands configured to continually control one or more moveable members of the exercise machine. For example, action 2102 may include executing the video workout program on any of the exercise machines 120*a*-120*d* to enable the user 109 to perform the workout on the exercise machine. The video of the video workout program may be devoid of a trainer or may include a depiction of a trainer performing the workout without communicating any custom in-workout messages to the user.

The method 2100 may include, at action 2104, generating a custom in-workout message for the user. The custom in-workout message may be generated based on an explicit or inferred objective of the user or the workout, one or more performance parameters of the user while performing the workout, a user profile of the user, and/or other information. For example, the one or more performance parameters of the user may be compared to a target and if the one or more performance parameters are outside the target, the generated custom in-workout message may state the relationship between the one or more performance parameters and the target and/or inform that the user that the difficulty of the workout should be or will be adjusted accordingly.

The method 2100 may include, at action 2106, generating a deepfake depiction of a specific trainer with the custom in-workout message for the user. The deepfake depiction may be generated in any suitable manner.

The method 2100 may include, at action 2108, combining the deepfake depiction of the specific trainer with the video to communicate the custom in-workout message to the user. As an example, FIG. 17 shows a deepface depiction of the trainer 108 combined with a video of a video workout program, where the deepfake depiction of the trainer 108 may tell the user "Your heart rate is under target. Let's pick up the pace".

In some embodiments, the method 2100 may further include monitoring, at the exercise machine, a performance parameter of the user during the execution of the video workout program on the exercise machine. The method 2100 may further include determining that the performance parameter is outside a predetermined range. The custom in-workout message may include one of: a message indicating that an operating parameter of the exercise machine will be altered to bring the performance parameter within the predetermined range; or a message instructing the user to alter the operating parameter of the exercise machine to bring the performance parameter within the predetermined range. The performance parameter of the user may include a heart rate of the user or other performance parameter. The operating parameter of the exercise machine may include one of: an incline, a speed, a resistance, or other operating parameter.

Figure 22:
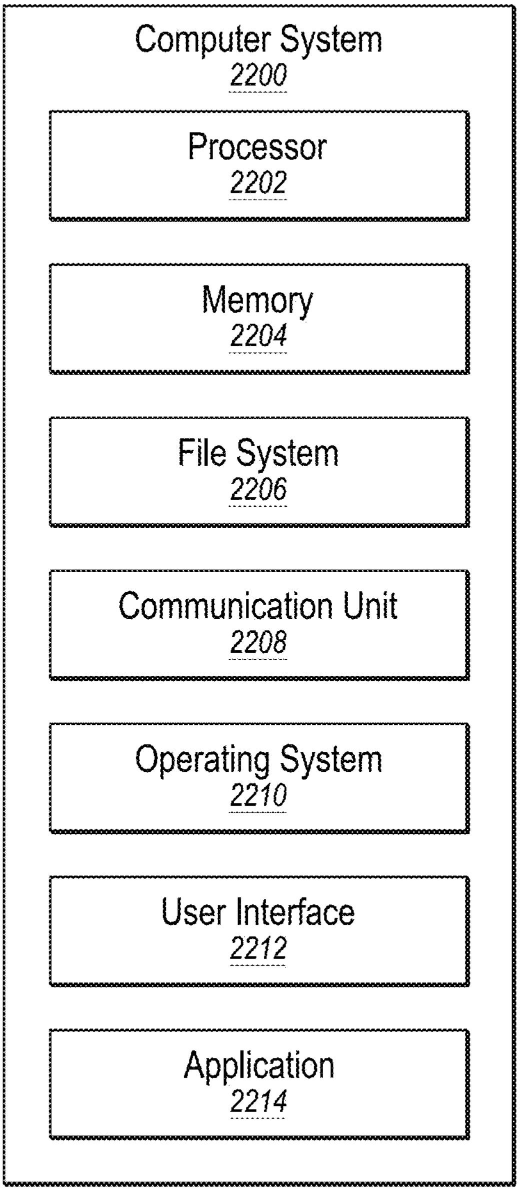
FIG. 22 illustrates an example computer system that may be employed in generating a video workout program, altering a background of a user on an exercise machine, executing a video workout program at an exercise machine to enable a user to perform a workout on the exercise machine, personalizing a video workout program, and/or in other methods described herein.

FIG. 22 illustrates an example computer system 2200 that may be employed in generating a video workout program, altering a background of a user on an exercise machine, executing a video workout program at an exercise machine to enable a user to perform a workout on the exercise machine, personalizing a video workout program, and/or in other methods described herein. In some embodiments, the computer system 2200 may be part of any of the systems or devices described in this disclosure. For example, the computer system 2200 may be part of any of the video cameras 106*a*-106*h*, the computer 114, the remote server 112, the local server 116, the exercise machines 120*a*-120*d*, the consoles 122*a*-122*d*, or the tablet 124 of FIG. 1.

The computer system 2200 may include a processor 2202, a memory 2204, a file system 2206, a communication unit 2208, an operating system 2210, a user interface 2212, and an application 2214, which all may be communicatively coupled. In some embodiments, the computer system may be, for example, a desktop computer, a client computer, a server computer, a mobile phone, a laptop computer, a smartphone, a smartwatch, a tablet computer, a portable music player, an exercise machine console, a video camera, or any other computer system.

Generally, the processor 2202 may include any suitable special-purpose or general-purpose computer, computing entity, or processing device including various computer hardware or software applications and may be configured to execute instructions stored on any applicable computer-readable storage media. For example, the processor 2202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 2202 may interpret and/or execute program instructions and/or process data stored in the memory 2204 and/or the file system 2206. In some embodiments, the processor 2202 may fetch program instructions from the file system 2206 and load the program instructions into the memory 2204. After the program instructions are loaded into the memory 2204, the processor 2202 may execute the program instructions. In some embodiments, the instructions may include the processor 2202 performing one or more actions of one or more of the methods 1800, 1900, 2000, 2100 of FIGS. 18-21 or other actions herein.

The memory 2204 and the file system 2206 may include computer-readable storage media for carrying or having stored thereon computer-executable instructions or data structures. Such computer-readable storage media may be any available non-transitory media that may be accessed by a general-purpose or special-purpose computer, such as the processor 2202. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 2202 to perform a certain operation or group of operations, such as one or more actions of one or more of the methods 1800, 1900, 2000, 2100 of FIGS. 18-21 or other actions herein. These computer-executable instructions may be included, for example, in the operating system 2210, in one or more applications, or in some combination thereof.

The communication unit 2208 may include any component, device, system, or combination thereof configured to transmit or receive information over a network, such as the network 118 of FIG. 1. In some embodiments, the communication unit 2208 may communicate with other devices at other locations, the same location, or even other components within the same system. For example, the communication unit 2208 may include a modem, a network card (wireless or wired), an infrared communication device, a wireless communication device (such as an antenna), and/or chipset (such as a Bluetooth device, an 802.6 device (e.g., Metropolitan Area Network (MAN)), a Wi-Fi device, a WiMAX device, a cellular communication device, etc.), and/or the like. The communication unit 2208 may permit data to be exchanged with a network and/or any other devices or systems, such as those described in the present disclosure.

The operating system 2210 may be configured to manage hardware and software resources of the computer system 2200 and configured to provide common services for the computer system 2200.

The user interface 2212 may include any device or software configured to allow a user to interface with the computer system 2200. For example, the user interface 2212 may include a display, such as an LCD, LED, or other display, that is configured to present video, text, application user interfaces, and other data as directed by the processor 2202. The user interface 2212 may further include a mouse, a track pad, a keyboard, a touchscreen, volume controls, other buttons, a speaker, a microphone, a camera, any peripheral device, or other input or output device. The user interface 2212 may include a graphical user interface such as the user interfaces 608, 610 of FIGS. 6B and 6C and/or the user interface 1200 of FIG. 12. The user interface 2212 may receive input from a user and provide the input to the processor 2202. Similarly, the user interface 2212 may present output to a user.

The application 2214 may be one or more computer-readable instructions stored on one or more non-transitory computer-readable media, such as the memory 2204 or the file system 2206, that, when executed by the processor 2202, is configured to perform one or more actions of one or more of the methods 1800, 1900, 2000, 2100 of FIGS. 18-21 or other actions herein. In some embodiments, the application 2214 may be part of the operating system 2210 or may be part of an application of the computer system 2200, or may be some combination thereof.

INDUSTRIAL APPLICABILITY

Various modifications to the embodiments illustrated in the drawings will now be disclosed.

In general, some example methods disclosed herein may enable video workout programs to be produced on a stage or set showing a trainer in any location, whether real or fictional and whether easily accessible or difficult or impossible to access. Producing video workout programs in this manner may be much more time- and cost-effective than those that involving filming a trainer on location.

The example methods herein may alternatively or additionally be used to produce commercials or advertisements for exercise machines, interactive fitness platform, or other goods or services. Video of one or more exercise machines and/or trainers on a stage or set may be captured and combined with any virtual background according to the methods described herein. In this regard, the commercial or advertisement may be akin to a video workout program. The commercial or advertisement may be of different duration, e.g., shorter, and/or may omit exercise machine control commands and/or environmental control commands. Alternatively or additionally, the commercial or advertisement may be run in an advertising campaign on broadcast media, the Internet, or other advertising campaign. In some embodiments, some or all of the combined video of a video workout program may be used as or included in the commercial or advertisement.

Various examples of environments depicted in video that may be combined with a depiction of a trainer and/or a user have already been mentioned, including the Moon, the center or interior of the Earth, the Mariana Trench, Proxima b, Tattoine, and Hogwarts School of Witchcraft and Wizardry. Alternatively or additionally, the environment may include the rim of the Grand Canyon, Iceland, Thailand, or a beach, among potentially many other environments.

In some embodiments, the video of the environment may be displayed on a display panel as the trainer or other individual performs the workout or otherwise uses the exercise machine. This may facilitate the trainer or other individual calling out interesting facts or points of interest in the video or otherwise acting as a tour guide. For example, if the video of the environment travels along a route or path through the Redwood National and State Parks (RNSP) that passes by a tree that is more than 2,000 years old, the trainer may point out the tree and state "that redwood tree is over 2,000 years old".

Some embodiments of the video workout programs herein have been described as including videos that travel along routes or paths with branch points and different branches that a user may follow. More generally, embodiments herein may include choose-your-own adventure style video workout programs where users can choose routes or paths the user wants to follow in an environment. Embodiments herein may permit the user to follow any of the routes or paths followed by the trainer or to deviate therefrom. For example, the video of the video workout program may be rendered, e.g., in real time, by the game engine 115 as the user navigates within the environment depicted in the video without following the trainer. In this and other embodiments, the exercise machine in use by the user may include one or more input devices to navigate within the environment.

Some embodiments of the video workout programs herein may depict historical or fictional events or figures. An example historical video may depict Paul Revere's 1775 midnight ride, including a depiction of the route as it would have appeared in 1775 and a depiction of Paul Revere and his horse traveling along the route. Another example historical video may depict Howard Carter's 1922 exploration and entry into/discovery of King Tut's tomb, including a depiction of the route, tunnels, tomb, etc. as they would have appeared in 1922 and a depiction of Howard Carter moving along the route. An example fictional video may depict one or more members of J. R. R. Tolkien's fellowship of the ring or other characters of Tolkien's The Lord of the Rings traveling through Moria or other locations in Tolkien's Middle Earth. Another example fictional video may depict some or all of Ali Baba's adventures in the folk tale Ali Baba and the Forty Thieves. Video workout programs such as these that depict historical or fictional events or figures may provide entertainment and/or educational value in addition to providing users with a workout.

Characters in video workout programs that depict historical or fictional events or figures or other video workout programs may be portrayed by actors, may include deepfakes of actors, and/or may be computer-generated. In some embodiments, users may interact with the environment or characters depicted in these and other videos. For example, users may select different routes or paths to follow in the depicted environments and/or may talk with the characters (e.g., the characters may have a few pre-recorded or pre-generated responses or may have natural language AI capabilities).

In some embodiments, an actual environment in a vicinity of the users may be controlled, e.g., by one or more environmental control commands in the video workout program and one or more environmental control devices in a vicinity of the user and/or the exercise machine, to enhance a feeling of immersion in the depicted environment. For example, if the route followed through the depicted environment passes in and out of shade, a heat lamp may be turned on by the environmental control commands when the route is unshaded and may be turned off by the environmental control commands when the route is shaded. As another example, if the route passes near a waterfall, a mist dispenser may be controlled by the environmental control commands to mist the user as the route passes near the waterfall. As another example, if the route passes through an orange grove, a scent dispenser may be controlled by the environmental control commands to dispense a citrus scent as the route passes through the orange grove. As another example, if the speed of the exercise machine varies during the workout, a fan may be controlled by the environmental control commands to blow faster when the speed of the exercise machine increases and to blow slower when the speed of the exercise machine decreases. The foregoing examples may generally involve controlling the environmental control devices to simulate the environment depicted in the video or performance of the workout in the depicted environment, which may enhance the user's feeling of immersion in the depicted environment.

Some embodiments herein describe exercise machine control commands and/or environmental control commands as being input into a video workout program by a producer or other individual. Alternatively or additionally, an AI may input the exercise machine control commands and/or the environmental control commands into the video workout program.

Some example methods disclosed herein may enable generating images or video of users with virtual backgrounds. In these and other embodiments, a chroma key screen or a display may be placed behind the user on the exercise machine with a video camera placed in front of the user so that the chroma key screen or display is in the background of the user. The video camera in front of the user may capture and image or video of the user that may be combined with another image or video in the background, e.g., using chroma keying or by displaying the other image or video on the display behind the user while first image or video of the user is captured. The combined image or video may thereby show the user as an actor in a created space rather than as an avatar in a created space. For example, the combined image or video may show the user within the same environment as shown in the combined video of a video workout program being executed at the exercise device by combining the image or video of the user with the video used to create the video of the video workout program. Thus, as the user performs the workout and the combined video of the video workout program moves through an environment and passes one or more landmarks or other visible features, the combined image or video may show the user passing the one or more landmarks or other visible features.

In some embodiments, the user may select the image or video to use as the user's virtual background. The user may select the image or video from a limited set, e.g., that may be provided by or available from an interactive fitness platform or other source. Alternatively or additionally, the user may upload or provide personal images or video from a personal device of the user (e.g., a smart phone, laptop, or other personal device) or images or video from the Internet or other repository to use as the user's virtual background.

The image or video used as the user's background may include a logo, a leaderboard, tallies of other users that have passed the user or been passed by the user in performance of the same workout competition (whether simultaneously for a live video workout program or asynchronously for an archived video workout program), a current time or distance or speed of the user in performance of the workout, one of multiple background colors to indicate the user's place within or performance of the workout competition (e.g., green may indicate users that are ahead of pace, yellow may indicate users that are on pace, and red may indicate users that are behind pace), or one or more alterations input or selected by the user.

The virtual monster 1106 and the virtual wings 1108 of FIG. 11B are examples of alterations that may be made to the environment depicted in the image or video used as the user's background. As another example, the depicted environment may be altered to include virtual dragons, virtual zombies, virtual cougars, or other virtual beings to chase the user. In some embodiments, the user may select the virtual being from a limited set. Alternatively or additionally, the user may upload or provide images or video of a person or being, such as a personal friend, enemy, competitor, ex-spouse, or other person or being that the user would like to have as the virtual being that chases the user, and a deepfake of the person or being may be generated as the virtual being to chase the user. As another example, the depicted environment may be altered to include virtual confetti or fireworks or other visual effects, e.g., if the user wins a workout competition or finishes it before a predetermined number or percentage of other users or finishes it under a predetermined amount of time, or completes some other goal. As another example, the depicted environment may be altered to include virtual objects (e.g., projectiles) "thrown" or otherwise placed in the environment, such as virtual burgers or tacks. or other virtual objects or visual effects. In some embodiments, virtual objects thrown at or in front of another user may interact or interfere with the other user and the other user may have their workout paused and they may have to perform some additional task before their workout can be resumed. For example, if the workout is being performed on a stationary bike and the virtual item includes one or more virtual tacks placed in the environment in front of the other user, the other user's stationary bike may get a virtual flat tire and the other user may have to do some jumping jacks, burpies, or other task to "fix" the virtual flat tire before they can continue the workout. A video camera, smart watch or other device with an accelerometer bourne by the other user, or other system or device may be used to confirm that the other user completes the task.

Some example methods disclosed herein may enable users of exercise machines to monitor their form while exercising. In these and other embodiments, a video camera and/or a display may be movable relative to the user and the exercise machine to capture images and/or video of the user performing workouts from one or more viewpoints. For example, images and/or video of the user running on a treadmill may be captured from the front, sides, and/or a rear of the user and displayed to the user, which may allow the user to see whether, e.g., the user pronates, supinates, inverts, or everts one or more of their feet while running. The user may then attempt to correct any issues they may notice by, e.g., mentally focusing on the correction while running, purchasing corrective orthotics, performing physical therapy, seeing a specialist, or taking some other action.

The monitor arm 1602 of FIG. 16 is one example of a structure to adjustably position a display and/or video camera relative to an exercise machine, e.g., to enable a user to monitor their form while exercising. Other structures may be implemented instead, such as, e.g., a circular, semicircular, elliptical, or semielliptical track coupled to the exercise machine, wall, ceiling, floor, or other structure and positioned at least partially around the exercise machine to permit the display and/or video camera to be adjustably positioned relative to the exercise machine. The display and video camera may be packaged together in an integrated form or implemented as discrete devices with each movable relative to the exercise machine independently or together and/or only one or the other of the display or the video camera may be movable relative to the exercise machine.

Some example methods disclosed herein may enable custom in-workout messages to be provided to users performing workouts on exercise machines via deepfake depictions of trainers. In some embodiments, the user may select a particular trainer or a workout that includes a particular trainer and the deepfake depiction may be generated of the particular trainer. The user may select the particular trainer or workout with the particular trainer from a limited set, e.g., that may be provided by or available from an interactive fitness platform or other source. Alternatively or additionally, the user may upload or provide personal images or video of a particular person or other being from a personal device of the user or images or video of a particular person or other being from the Internet or other repository that the user would like to have as their trainer in the video workout program. The images or video of the particular person or being may then be used to create a deepfake depiction of the particular person or being to provide the user one or more custom in-workout messages during the workout.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

A. A method to generate a video workout program, the method comprising:
- capturing a first video that includes a depiction of a trainer performing a workout;
- combining the depiction of the trainer in the first video with a second video that moves through an environment to form a combined video in which the trainer appears to move through the environment;
- encoding exercise machine control commands to accompany the combined video to create the video workout program, the video workout program configured such that execution of the video workout program on a first exercise machine displays the combined video and continually controls one or more moveable members of the first exercise machine according to the exercise machine control commands.

B. The method of example A, wherein:
- the trainer performs the workout using a second exercise machine; and
- the method further comprises:
  - monitoring operating parameters of the second exercise machine during performance of the workout by the trainer; and
  - generating the exercise machine control commands to correspond to the depiction of the workout by the trainer, including generating the exercise machine control commands to cause the first exercise machine to implement at least some of the operating parameters of the second exercise machine during execution of the video workout program on the first exercise machine.

C. The method of example A or B, wherein:
- the trainer performs the workout using a second exercise machine and the second video that moves through the environment comprises a rendered video that moves through a virtual environment; and
- the method further comprises:
  - monitoring a speed of the second exercise machine during performance of the workout by the trainer; and
  - synchronizing a speed at which the rendered video moves through the virtual environment with the speed of the second exercise machine.
  - monitoring a camera angle of a camera that captures the first video during capture of the first video; and
  - synchronizing a view angle of the virtual environment with the camera angle.

D. The method of example C, wherein the synchronizing the speed at which the rendered video moves through the virtual environment with the speed of the second exercise machine comprises:
- aligning a start time of the rendered video to a start time of the first video;
- setting a first speed at which the rendered video moves through the virtual environment at a first time that is after the start time to match a first speed of the second exercise machine at the first time; and
- setting a second speed at which the rendered video moves through the virtual environment at a second time that is after the first time to match a second speed of the second exercise machine at the second time, wherein the second speed at which the rendered video moves through the virtual environment is different than the first speed.

E. The method of one of examples A-D, wherein the capturing of the first video that includes the depiction of the trainer performing the workout comprises capturing the first video of the trainer performing the workout on a second exercise machine in front of a chroma key screen of a stage or set.

F. The method of example E, wherein:

the stage or set includes a practical floor on which the exercise machine is positioned; and the practical floor includes one or more physical objects that blend in with the environment of the combined video.

G. The method of example E, wherein the second exercise machine comprises a practical exercise machine having an appearance configured to at least one of obscure its nature as an exercise machine or blend in with the environment of the combined video.

H. The method of example E, wherein the second exercise machine comprises a treadmill with a running platform configured to mimic at least one of an appearance or give of a ground of the environment of the combined video.

I. The method of one of examples A-D, wherein:

the method further comprises displaying the second video in view of a camera that captures the first video of the trainer performing the workout and in view of the trainer; and the combining of the depiction of the trainer in the first video with the second video comprises capturing the first video of both the trainer performing the workout and the second video displayed in the view of the camera.

J. The method of example I, wherein the capturing the first video includes capturing commentary of the trainer with respect to one or more objects depicted in the second video.

K. The method of example I, further comprising receiving input effective to at least one of: control weather or natural phenomena depicted in the second video or add, delete, move, or resize an object in the environment.

L. The method of one of examples A-K, wherein:

the combining of the depiction of the trainer in the first video with the second video comprises combining the depiction of the trainer in the first video with the second video in real-time as the trainer performs the workout; and the method further comprises:

streaming the combined video live to the first exercise machine;

reaching a branch point in a path traveled in the second video, the path splitting into multiple branches at the branch point;

receiving feedback from a first user of the first exercise machine including a selection by the first user of one of the multiple branches of the path to travel down from the branch point; and causing the second video in real-time to travel down the selected branch from the branch point such that the trainer appears to travel down the selected path from the branch point.

M. The method of one of examples A-J, further comprising capturing the second video by a camera moving through a real-world environment, the environment of the second video including a depiction of the real-world environment captured by the camera.

N. The method of one of examples A-J, wherein:

the method further comprises reaching a branch point in a path traveled in the second video, the path splitting into a first branch and a second branch at the branch point;

the combining of the depiction of the trainer in the first video with the second video comprises:

combining the depiction of the trainer in the first video with the second video as the second video travels along the first branch to form a first selectable portion of the combined video; and combining the depiction of the trainer in the first video with the second video as the second video travels along the second branch to form a second selectable portion of the combined video;

the method further comprises executing, at the first exercise machine, the video workout program to enable a first user to perform a workout on the first exercise machine, including playing the combined video to the user;

the method further comprises receiving a selection by the user of the first selectable portion or the second selectable portion of the combined video; and the method further comprises after play of the combined video reaches the branch point, playing the selected one of the first selectable portion or the second selectable portion.

O. The method of one of examples A-J, further comprising:

executing, at the first exercise machine, the video workout program to enable a first user to perform a workout on the first exercise machine, including playing the combined video to the user;

reaching a branch point in a path traveled in the environment of the combined video during playback of the combined video, the path splitting into a first branch and a second branch at the branch point; and receiving a selection by the user of the first branch or the second branch of the combined video;

wherein after play of the combined video reaches the branch point, play of the combined video follows the selected one of the first branch or the second branch.

P. The method of one of examples A-J, further comprising:

executing, at the first exercise machine, the video workout program to enable a first user to perform a workout on the first exercise machine, including playing the combined video to the user; and moving the combined video through the environment via a route selected by the first user.

Q. The method of example P, further comprising, prior to the moving the combined video through the environment:

displaying to the user a map of a real or virtual area that includes the environment; and receiving input from the first user effective to select the route via the map.

R. The method of one of examples A-Q, further comprising encoding environmental control commands to accompany the combined video, the environmental control commands configured to control one or more environmental control devices in a vicinity of the first exercise machine.

S. The method of example R, wherein the one or more environmental control devices comprise at least one of: a heat lamp, a fan, an oil diffuser, a scent dispenser, or a light.

T. The method of one of examples A-S, wherein:

the combined video includes multiple viewpoints; and the method further comprises:

executing, at the first exercise machine, the video workout program to enable a first user to perform a workout on the first exercise machine, including playing the combined video to the first user; and changing from one viewpoint of the combined video to another responsive to input from the first user.

U. The method of one of examples A-S, wherein:
the combined video is a 360-degree video; and
the method further comprises:
executing, at the first exercise machine, the video workout program to enable a first user to perform a workout on the first exercise machine, including playing the combined video to the first user; and
changing a viewpoint of the combined video responsive to input from the first user.

V. The method of one of examples A-S, wherein:
the combined video includes multiple viewpoints; and
the method further comprises:
executing, at the first exercise machine, the video workout program to enable a first user to perform a workout on the first exercise machine;
displaying a first viewpoint of the combined video to the first user on a first display in front of the first user; and
displaying a second viewpoint of the combined video to the first user on a second display to a side or rear of the first user.

W. A method to alter a virtual background of a user on an exercise machine, the method comprising:
capturing, by a camera, a first image or video of a user of an exercise machine with a chroma key screen as an actual background for the user of the exercise machine;
combining a depiction of the user in the first image or video with a second image or video to form a combined image or video with a virtual background in place of the actual background; and
displaying the combined image or video to at least one of the user or a viewer.

X. The method of example W, further comprising providing the chroma key screen to the user with the exercise machine.

Y. The method of example W or X, wherein the user is positioned facing forward on the exercise machine and the chroma key screen is positioned behind the user.

Z. The method of one of examples W-Y, wherein the chroma key screen comprises a blue sheet.

AA. The method of one of examples W-Z, wherein:
the combined image or video is the combined video;
the method further comprises establishing a video conference between the user of the exercise machine and another user of another exercise machine; and
the displaying of the combined video to the at least one of the user or the viewer comprises displaying the combined video to the user and the other user.

BB. The method of one of examples W-Z, wherein:
the method further comprises displaying a leaderboard with an entry for the user and another entry for another user, the leaderboard ranking performance indicators of the user and the other user with respect to performance of a workout by the user and the other user; and
the displaying of the combined image or video to the at least one of the user or the viewer comprises displaying the combined image or video within the entry of the user in the leaderboard.

CC. The method of one of examples W-Z, wherein:
the method further comprises executing, at the exercise machine, a video workout program to enable the user to perform a workout on the exercise machine, including displaying a workout video to the user that depicts an environment;
the second image or video depicts the environment; and
the combined image or video shows the user in the environment.

DD. The method of example CC, wherein:
a display on which the workout video is displayed is positioned in front of the user;
the chroma key screen is positioned behind the user;
the camera is positioned in front of the user facing the user and the chroma key screen;
the workout video follows a route through the environment that passes one or more objects or landmarks that appear to get closer as a position of the workout video along the route approaches the one or more objects or landmarks; and
as the position of the workout video along the route moves away from the one or more objects or landmarks, the combined image or video shows the user moving along the route and the one or more objects or landmarks receding behind the user.

EE. The method of example CC or DD, further comprising:
receiving input from the user effective to interact with the environment; and
altering the environment in the workout video or the combined image or video responsive to the input.

FF. The method of example EE, wherein the altering of the environment in the workout video or the combined image or video comprises at least one of:
displaying a virtual item within the environment to interfere with a depiction of another user or avatar of the other user in the workout video or the combined image or video; or
displaying a visual effect within the environment to indicate achievement by the user of a performance goal.

GG. The method of one of examples W-FF, wherein the user performs a workout on the exercise machine and the combined image or video shows the user and one or more performance indicators in the virtual background.

HH. The method of one of examples W-GG, further comprising receiving input from the user effective to select the virtual background.

II. The method of one of examples W-Z, wherein:
the user performs a workout on the exercise machine and other users perform the workout on other exercise machines;
the displaying the combined image or video comprises displaying the depiction of the user and the virtual background in a first block of a multi-user grid where the virtual background displayed in the first block includes a performance indicator of the user in performing the workout; and
the method further comprises displaying the grid with the block for the user and a different block for each of the other users, each block of the other users including a combined image or video of a depiction of the corresponding user and a corresponding virtual background, each corresponding virtual background including a performance indicator of the corresponding user performing the workout.

JJ. The method of one of examples W-II, wherein the second image or video is a pre-recorded video of a real-world event.

KK. The method of one of examples W-II, wherein the second image or video is a rendered video of a virtual event.

LL. The method of one of examples W-KK, wherein the second image or video includes one or more virtual beings and the combined image or video shows the one or more virtual beings chasing the user.

MM. A method to execute a video workout program at an exercise machine to enable a user to perform a workout on the exercise machine, the method comprising:

continually controlling one or more moveable members of the exercise machine according to exercise machine control commands of the video workout program; and displaying a video to the user that depicts an environment, the video including multiple viewpoints of the environment, including:

displaying a first viewpoint of the video to the user on a first display located in a first position relative to the user; and displaying a second viewpoint of the video to the user on a second display located in a second position relative to the user, the second position different than the first position.

NN. The method of example MM, wherein the first display is located in front of the user and the second display is located behind the user.

OO. The method of example MM or NN, wherein at least one of the first display or the second display is movable relative to the exercise machine.

PP. The method of one of examples MM-OO, further comprising capturing a depiction of the user performing the workout by a camera integrated within the first display or the second display to monitor a form of the user in performing the workout.

QQ. The method of one of examples MM-PP, wherein:

the video is a first video; and the method further comprises:

capturing, by a camera, a second video of the user of the exercise machine with the second viewpoint of the first video on the second display device as a background of the user; and displaying the second video to at least one of the user or a viewer.

RR. The method of one of examples MM-QQ, wherein the second display is located behind the user and the second viewpoint of the video includes one or more virtual beings that appear to be chasing the user.

SS. A method to personalize a video workout program, the method comprising:

executing, on an exercise machine, the video workout program to enable a user to perform a workout on the exercise machine, the video workout program comprising a video and exercise machine control commands configured to continually control one or more moveable members of the exercise machine;

generating a custom in-workout message for the user;

generating a deepfake depiction of a specific trainer with the custom in-workout message for the user; and combining the deepfake depiction of the specific trainer with the video to communicate the custom in-workout message to the user.

TT. The method of example SS, wherein:

the method further comprises:

monitoring, at the exercise machine, a performance parameter of the user during the execution of the video workout program on the exercise machine; and determining that the performance parameter is outside a predetermined range; and the custom in-workout message includes one of:

a message indicating that an operating parameter of the exercise machine will be altered to bring the performance parameter within the predetermined range; or a message instructing the user to alter the operating parameter of the exercise machine to bring the performance parameter within the predetermined range.

UU. The method of example TT, wherein:

the performance parameter of the user comprises a heart rate of the user; and the operating parameter of the exercise machine comprises one of: an incline, a speed, or a resistance.

The invention claimed is:

1. A method to generate a video workout program, the method comprising:

capturing a first video that includes a depiction of a trainer performing a workout;

combining the depiction of the trainer in the first video with a second video that moves through an environment comprising a path, to form a combined video in which the trainer appears to travel along the path of the environment, wherein the combining of the depiction of the trainer in the first video with the second video comprises combining, in real time, the depiction of the trainer in the first video with the second video as the trainer performs the workout;

encoding exercise machine control commands to accompany the combined video to create the video workout program, the video workout program configured such that execution of the video workout program on a first exercise machine displays the combined video and continually controls one or more moveable members of the first exercise machine according to the exercise machine control commands;

streaming the combined video live to the first exercise machine and a second exercise machine;

reaching a branch point in the path of the environment in the combined video, the path splitting into multiple branches at the branch point;

receiving feedback from a first user of the first exercise machine including a selection, by the first user, of a first branch of the multiple branches to travel along from the branch point;

causing, in response to the received feedback from the first user, the second video, in real-time, to move along the selected first branch from the branch point such that combining the depiction of the trainer in the first video with the second video, as the second video moves along the selected first branch, forms a first selectable portion of the combined video in which the trainer appears to travel along the selected first branch in the combined video on the first exercise machine;

receiving feedback from a second user of the second exercise machine including a selection, by the second user, of a second branch of the multiple branches to travel along from the branch point, the second branch being different from the first branch; and causing, in response to the received feedback from the second user, the second video, in real-time, to move along the selected second branch from the branch point such that combining the depiction of the trainer in the first video with the second video, as the second video moves along the selected second branch, forms a second selectable portion of the combined video in which the trainer appears to travel along the selected second branch in the combined video on the second exercise machine, wherein the first selectable portion of the combined video is different from the second selectable portion of the combined video.

2. The method of claim 1, further comprising:

presenting, to each of the first user and the second user and prior to reaching the branch point, a message instructing each of the first user and the second user to select a desired branch of the multiple branches.

3. The method of claim 2, wherein presenting the message comprises:

presenting the message a pre-determined time prior to reaching the branch point.

4. The method of claim 1, wherein the trainer performs the workout using a trainer exercise machine, the method further comprising:

monitoring operating parameters of the trainer exercise machine during performance of the workout by the trainer; and generating the exercise machine control commands to correspond to the depiction of the workout by the trainer and to cause the first exercise machine to implement at least some of the monitored operating parameters of the trainer exercise machine during execution of the video workout program on the first exercise machine.

5. The method of claim 1, wherein the trainer performs the workout using a trainer exercise machine and the second video that moves through the environment comprises a rendered video that moves through a virtual environment, the method further comprising:

monitoring a speed of the trainer exercise machine during performance of the workout by the trainer; and synchronizing a speed at which the rendered video moves through the virtual environment with the speed of the trainer exercise machine.

6. The method of claim 1, wherein the capturing of the first video that includes the depiction of the trainer performing the workout comprises:

capturing the first video of the trainer performing the workout on a trainer exercise machine in front of a chroma key screen of a stage or a set.

7. The method of claim 1, further comprising:

encoding environmental control commands into a subtitle stream of the combined video, the environmental control commands configured to control one or more environmental control devices in a vicinity of the first exercise machine.

* * * * *